US011030554B2

(12) United States Patent
Polli et al.

(10) Patent No.: US 11,030,554 B2
(45) Date of Patent: **\*Jun. 8, 2021**

(54) SYSTEMS AND METHODS FOR DATA-DRIVEN IDENTIFICATION OF TALENT

(71) Applicant: PYMETRICS, INC., New York, NY (US)

(72) Inventors: Frida Polli, New York, NY (US); Julie Yoo, New York, NY (US)

(73) Assignee: Pymetrics, Inc., New York, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/013,784

(22) Filed: Jun. 20, 2018

(65) Prior Publication Data
US 2019/0026681 A1    Jan. 24, 2019

Related U.S. Application Data

(63) Continuation of application No. PCT/US2016/068454, filed on Dec. 22, 2016.
(Continued)

(51) Int. Cl.
*G06Q 10/10* (2012.01)
*G06Q 10/06* (2012.01)
(Continued)

(52) U.S. Cl.
CPC ...... *G06Q 10/063112* (2013.01); *A63F 13/46* (2014.09); *A63F 13/80* (2014.09);
(Continued)

(58) Field of Classification Search
CPC ...... G06Q 10/105; G06Q 50/22; G06Q 30/02; G06Q 30/0204; G06Q 50/01; G06Q 10/00;
(Continued)

(56) References Cited

U.S. PATENT DOCUMENTS 6,093,119 A    7/2000  Tipton
7,457,764 B1  11/2008  Bullock et al.
(Continued)

FOREIGN PATENT DOCUMENTS

JP    2002072848 A    3/2002
JP    2002140558 A    5/2002
(Continued)

OTHER PUBLICATIONS

White; et al., "Test-Retest Characteristics of the Balloon Analogue Risk Task (BART). Experimental and Clinical Psychopharmacology, 2008, vol. 1, No. 6, 565-570." (Year: 2008).*
(Continued)

*Primary Examiner* — Jamie H Austin
(74) *Attorney, Agent, or Firm* — Perkins Coie LLP

(57) ABSTRACT

The present disclosure describes talent-identification systems and methods that can be used by companies to assist in the recruitment process for new employees. Additionally, the systems and methods can be used by job seekers to determine ideal career fields and industries. The systems and methods may employ an array of neuroscience-based tests to assess a user's career propensities, after which the systems and methods can provide career recommendations to the user or report on employment suitability of the user to a company.

28 Claims, 42 Drawing Sheets

Related U.S. Application Data

(60) Provisional application No. 62/387,440, filed on Dec. 23, 2015.

(51) Int. Cl.

| | | |
|---|---|---|
| *G09B 7/02* | (2006.01) | |
| *A63F 13/46* | (2014.01) | |
| *G09B 7/00* | (2006.01) | |
| *G06Q 50/20* | (2012.01) | |
| *A63F 13/80* | (2014.01) | |
| *G06F 16/904* | (2019.01) | |

(52) U.S. Cl.
CPC ..... *G06F 16/904* (2019.01); *G06Q 10/06393* (2013.01); *G06Q 10/06398* (2013.01); *G06Q 10/10* (2013.01); *G06Q 50/20* (2013.01); *G09B 7/00* (2013.01); *G09B 7/02* (2013.01)

(58) Field of Classification Search
CPC .......... G06Q 10/0635; G06Q 10/1053; G06Q 30/0201; G06Q 30/0643; G06Q 10/06; G06Q 10/06311; G06Q 10/063112; G06Q 10/063116; G06Q 10/06316; G06Q 10/0637; G06Q 10/06398; G06Q 10/10; G06Q 30/0242
See application file for complete search history.

(56) References Cited

U.S. PATENT DOCUMENTS

| | | |
|---|---|---|
| 7,751,878 B1 | 7/2010 | Merkle et al. |
| 8,628,331 B1 | 1/2014 | Wright |
| 9,842,314 B2 | 12/2017 | Polli et al. |
| 2002/0042786 A1 | 4/2002 | Scarborough et al. |
| 2003/0050816 A1 | 3/2003 | Givens et al. |
| 2003/0061600 A1 | 3/2003 | Bates et al. |
| 2004/0083195 A1 | 4/2004 | McCord et al. |
| 2005/0114203 A1 | 5/2005 | Savitsky et al. |
| 2006/0036153 A1 | 2/2006 | Laken |
| 2007/0143167 A1 | 6/2007 | Cohen |
| 2007/0185757 A1 | 8/2007 | Subramanian |
| 2008/0003553 A1 | 1/2008 | Stark et al. |
| 2008/0183585 A1 | 7/2008 | Vianello |
| 2009/0006178 A1 | 1/2009 | Taylor et al. |
| 2009/0157482 A1 | 6/2009 | Jung et al. |
| 2010/0010317 A1 | 1/2010 | De Lemos |
| 2010/0082356 A1 | 4/2010 | Verma et al. |
| 2010/0100496 A1 | 4/2010 | Baldwin et al. |
| 2010/0160013 A1 | 6/2010 | Sanders |
| 2011/0020778 A1 | 2/2011 | Forbes |
| 2011/0166773 A1 | 7/2011 | Raz |
| 2012/0023031 A1 | 1/2012 | Galya |
| 2012/0075119 A1 | 3/2012 | Dorneich et al. |
| 2012/0173445 A1 | 7/2012 | Asaimuthu |
| 2012/0214143 A1 | 8/2012 | Severson et al. |
| 2012/0258436 A1 | 10/2012 | Lee |
| 2012/0271675 A1 | 10/2012 | Christensen et al. |
| 2013/0066769 A1 | 3/2013 | Trenchard et al. |
| 2013/0101976 A1 | 4/2013 | Roots et al. |
| 2013/0164712 A1 | 6/2013 | Hunt et al. |
| 2013/0185218 A1 | 7/2013 | Hermsdorff et al. |
| 2013/0216986 A1* | 8/2013 | Goldman ................ G09B 7/00 434/236 |
| 2013/0260357 A1* | 10/2013 | Reinerman-Jones ....................... G06Q 10/1053 434/362 |
| 2013/0290207 A1* | 10/2013 | Bonmassar ...... G06Q 10/06311 705/321 |
| 2013/0311416 A1 | 11/2013 | Liu et al. |
| 2014/0015749 A1 | 1/2014 | Bigham et al. |
| 2014/0107429 A1 | 4/2014 | Simkovich et al. |
| 2014/0129330 A1 | 5/2014 | Fuller |
| 2014/0129462 A1 | 5/2014 | Mehta et al. |
| 2014/0195310 A1 | 7/2014 | Mcquade |
| 2014/0214709 A1 | 7/2014 | Greaney |
| 2014/0278633 A1 | 9/2014 | Daly et al. |
| 2014/0279635 A1 | 9/2014 | Bramlett, Jr. et al. |
| 2014/0279636 A1 | 9/2014 | Bramlett, Jr. et al. |
| 2014/0317079 A1 | 10/2014 | Obernikhin et al. |
| 2014/0330734 A1 | 11/2014 | Sung et al. |
| 2014/0351156 A1 | 11/2014 | Orban |
| 2015/0046357 A1 | 2/2015 | Danson et al. |
| 2015/0079578 A1 | 3/2015 | Nardi |
| 2015/0154564 A1 | 6/2015 | Moon et al. |
| 2015/0379454 A1 | 12/2015 | Polli et al. |
| 2016/0275431 A1* | 9/2016 | Gouvernel ....... G06Q 10/06393 |

FOREIGN PATENT DOCUMENTS

| | | |
|---|---|---|
| JP | 2004524572 T | 8/2004 |
| JP | 2004348517 A | 12/2004 |
| JP | 2006127387 A | 5/2006 |
| JP | 2007041878 A | 2/2007 |
| KR | 101495672 B1 | 2/2015 |
| WO | 2011084470 A1 | 7/2011 |
| WO | 2012071544 A2 | 5/2012 |
| WO | WO-2015200880 A1 | 12/2015 |
| WO | WO-2017112914 A2 | 6/2017 |

OTHER PUBLICATIONS

Abdel-Khalek, A. Egyptian Results on the Standard Progressive Matrices. Person. Individ. Diff. vol. 9, No. 1, pp. 193-195, 1988.

Amanatullah, et al. Negotiators Who Give Too Much: Unmitigated Comunion, Relational Anxieties, and Economic Costs in Distributive and Integrative Bargaining. Journal of Personality and Social Psychology, 2008, vol. 95, No. 3, 723-738.

Amengual, et al. Tracking Post-Error Adaptation in the Motor System by Transcranial Magnetic Stimulation. Neuroscience 250 (2013): 342-351.

Austin, E.J., Emotional intelligence and emotional information processing. Personality and individual differences, 2005; 39: 403-414.

Austin, et al. Measuring Motor Speed Through Typing: A Surrogate for the Finger Tapping Test. Behav Res Methods. Dec. 2011; 43(4): 903-909.

Baker, et al. Delay Discounting in Current and Never-Before Cigarette Smokers: Similarities and Differences Across Commodity, Sign, and Magnitude. Journal of Abnormal Psychology, 2003, vol. 112, No. 3, 382-392.

Baron-Cohen, et al. Another Advanced Test of Theory of Mind: Evidence from Very High Functioning Adults with Autism or Asperger Syndrome. J. Child Psychol. Psychiat. vol. 38, No. 7, pp. 813-822, 1997.

Beck, et al. Test-Retest Reliability of a Group-Administerd Paper-Pencil Measure of Delay Discounting. Experimental and Clinical Psychopharmacology, 2009, vol. 17, No. 5, 345-355.

Bekkers, R. Measuring Altruistic Behavior in Surveys: The All-or-Nothing Dictator Game. Survey Research Methods (2007), vol. 1, No. 3, pp. 139-144.

Berg, et al. Trust, Reciprocity, and Social History. Games and Economic Behavior 10, 122-142 (1995).

Bogdan, et al. Corticotropin-Releasing Hormone Receptor Type 1 (CRHR1) Genetic Variation and Stress Interact to Influence Reward Learning. J Neurosci. Sep. 14, 2011; 31(37): 13246-13254.

Bornstein, et al. Short-Term Retest Reliability of the Halstead-Reitan Battery in a Normal Sample. The Journal of Nervous and Mental Disease, vol. 175, No. 4, 229-232.

Bors, et al. Raven's Advanced Progressive Matrices: Norms for First-Year University Students and the Development of a Short Form. Educational and Psychological Measurement, vol. 58, No. 3, Jun. 1998, 382-398.

Carroll, et al. Do Facial Expression Signal Specific Emotions? Judging Emotion From the Face in Context. Journal of Personality and Social Psychology, 1996, vol. 70, No. 2, 205-218.

Dikmen, et al. Test-Retest Reliability and Practice Effects of Expanded Halstead-Reitan Neuropsychological Test Battery. Journal of the International Neuropsychological Society (1999), 5, 346-356.

(56) References Cited

OTHER PUBLICATIONS

Eckardt, et al. Test-Retest Reliability of the Halstead Impairment Index in Hospitalized Alcoholic and Nonalcoholic Males with Mild to Moderate Neuropsychological Impairment. Journal of Clinical Neuropsychology, 3:3, 257-269.
Engel, C. Dictator Games: A Meta Study. Preprints of the Max Planck Institute for Research on Collective Goods, Mar. 2010, pp. 1-43.
EP15811285.4 Extended Search Report dated Nov. 17, 2017.
Fan, et al. Assessing the Heritability of Attentional Networks. BMC Neuroscience 2001, 2:14.
Fan, et al. Testing the Efficiency and Independence of Attentional Networks. Journal of Cognitive Neuroscience, 14:3, pp. 340-347.
Galli, J.A., Measuring validity and reliability of computer adaptive online skills assessments. Brainbench. Sep. 24, 2001. Retrieved from [URL: https://www.brainbench.com/xml/bb/mybrainbench/community/whitepaper.xml?contentId=938].
Gevins, et al. Neurophysiological Measures of Working Memory and Individual Differences in Cognitive Ability and Cognitive Style. Cerebral Cortex Sep. 2000; 10:829-839.
Gnys, et al. Validation of Executive Function Tasks With Young Children. Developmental Neuropsychology, 1991, 7(4), 487-501.
Golafshani, N. Understanding Reliability and Validity in Qualitative Research. The Qualitative Report, vol. 8, No. 4, Dec. 2003, 597-607.
Green, et al. Connecting Long Distance: Semantic Distance in Analogical Reasoning Modulates Frontopolar Cortex Activity. Cerebral Cortex, Jan. 2010; 20: 70-76.
Green, et al. Neural Correlates of Creativity in Analogical Reasoning. Journal of Experimental Psychology: Learning, Memory, and Cognition. 2012, vol. 38, No. 2, 264-272.
Green, et al. The Micro-Category Account of Analogy. Cognition 106 (2008): 1004-1016.
Green, et al. Using Genetic Data in Cognitive Neuroscience: From Growing Pains to Genuine Insights. Nature Reviews, Neuroscience, vol. 9, Sep. 2008, 710-720.
Gualtieri, et al. Reliability and Validity of a Computerized Neurocognitive Test Battery, CNS Vital Signs. Archives of Clinical Neuropsychology 21 (2006): 623-643.
Gunnthorsdottir, et al. Using the Machiavellianism Instrument to Predict Trustworthiness in a Bargaining Game. Journal of Economic Psychology, 23 (2002): 49-66.
Hahn, et al. Test-retest Reliability of Attention Network Test Measures in Schizophrenia. Schizophrenia Research 133 (2011): 218-222.
Hallerback, et al. The Reading the Mind in the Eyes Test: Test-retest reliability of a Swedish version. Cognitive Neuropsychiatry, 2009 14(2): 127-143.
Hockey, et al. The Concurrent Validity and Test-Retest Reliability of a Visuospatial Working Memory Task. Intelligence 32 (2004): 591-605.
International search report and written opinion dated Sep. 15, 2015 for PCT/US2015/038162.
Jaeggi, et al. The Concurrent Validity of the N-back Task as a Working Memory Treasure. Memory, 2010, 18 (4): 394-412.
John, et al. Measurement: Reliability, Construct Validation, and Scale Construction. Handbook of Research Methods in Social and Personality Psychology, edited by H.T. Reis and C.M. Judd. New York: Cambridge University Press, 2000, pp. 339-369.
Johnson, et al. Trust Games: A Meta-Analysis. Journal of Economic Psychology, 32 (2011): 865-889.
Kalbfleisch, et al. The Influences of Task Difficulty and Response Correctness on Neural Systems Supporting Fluid Reasoning. Cogn. Neurodyn. (2007), 1:71-84.
Kaller, et al. Assessing Planning Ability With the Tower of London Task: Psychometric Properties of a Structurally Balanced Problem Set. Psychological Assessment, 2012, vol. 24, No. 1, 46-53.
Kindlon, et al. Psychometric Properties of Impulsivity Measures: Temporal Stability, Validity, and Factor Structure. J. Child Psychol., vol. 36, No. 4, pp. 645-651, 1995.

King-Casas, et al. Getting to Know You: Reputation and Trust in a Two-Person Economic Exchange. Science, New Series, vol. 308, No. 5718 (Apr. 1, 2005), pp. 78-83.
Kirby, et al. Modeling Myopic Decisions: Evidence for Hyperbolic Delay-Discounting within Subjects and Amounts. Organizational Behavior and Human Decision Processes, vol. 64, No. 1, October, pp. 22-30, 1995.
Krueger, et al. Neural Correlates of Trust. PNAS, Dec. 11, 2007, vol. 104, No. 50, pp. 20084-20089.
Kuntsi, et al. Testing Assumptions for Endophenotype Studies in ADHD: Reliability and Validity of Tasks in a General Population Sample. BMC Pssychiatry, Nov. 1, 2005; 5:40.
Lamers, et al. Attentional control adjustments in Eriksen and Stroop task performance can be independent of response conflict. The Quarterly journal of experimental psychology, 2011; 64(6): 1056-1081.
Langenecker, et al. A Task to Manipulate Attentional Load, Set-Shifting, and Inhibitory Control: Convergent Validity and Test-Retest Reliability of the Parametric Go/No-Go Test. Journal of Clinical and Experimental Neuropsychology, 2007, 29(8): 842-853.
Lejuez, et al. Evaluation of a Behavioral Measure of Risk Taking: The Balloon Analogue Risk Task (BART). Journal of Experimental Psychology: Applied. 2002, vol. 8, No. 2, pp. 75-84.
Lejuez, et al. Reliability and Valididty of the Youth Version of the Balloon Analogue Risk Taks (BART-Y) in the Assessment of Risk-Taking Behavior Among Inner-City Adolescents. Journal of Clinical Child and Adolescent Psychology, 2007, vol. 36, No. 1, 106-111.
Lemay, et al. Practice Effect and Test-Retest Reliability of Attentional and Executive Tests in Middle-Aged to Elderly Subjects. The Clinical Nueropsychologist, 2004, vol. 18, No. 2, pp. 284-302.
Mills, et al. The Raven's Progressive Matrices: Its Usefulness for Identifying Gifted/Talented Students. Roeper Review, 1993, 15:3, 183-186.
Mishra, et al. Gambling as a Form of Risk-Taking: Individual Differences in Personality, Risk-Accepting Attitudes, and Behavioral Preferences for Risk. Personality and Individual Differences, 49 (2010): 616-621.
Mishra, et al. Individual Differences in Risk-Propensity: Associations Between Personality and Behavioral Measures of Risk. Personality and Individual Differences, 50 (2011): 869-873.
Miu, et al. Anxiety impairs decision-making: Psychophysiological evidence from an Iowa Gambling Task. Biological Psychology, 2008; 77:353-358.
Notice of Allowance dated Oct. 12, 2017 for U.S. Appl. No. 15/181,322.
Office Action dated Apr. 21, 2017 for U.S. Appl. No. 15/181,322.
Ohmura, et al. Three-Month Stability of Delay and Probability Discounting Measures. Experimental and Clinical Psychopharmacology, 2006, vol. 14, No. 3, 318-328.
PCT/US2016/068454 International Search Report and Written Opinion dated Jun. 7, 2017.
Pizzagalli, et al. Reduced Hedonic Capacity in Major Depressive Disorder: Evidence from a Probalistic Reward Task. J. Psychiatr. Res. Nov. 2008; 43(1): 76-87.
Pizzagalli, et al. Single Dose of a Dopaine Agonist Impairs Reinforcement Learning in Humans: Behavioral Evidence From a Laboratory-Based Measure of Reward Responsiveness. Psychopharmacology (2008), 196: 221-232.
Pizzagalli, et al. Toward an Objective Characterization of an Anhedonic Phenotype: A Signal-Detection Approach. Biol Psychiatry 2005; 57:319-327.
Rooney, et al. Methodology is Destiny: The Effect of Survey Prompts on Reported Levels of Giving and Volunteering. Nonprofit and Voluntary Sector Quarterly, vol. 33, No. 4, Dec. 2004, 628-654.
Ruff, et al. Gender and Age-Specific Changes in Motor Speed and Eye-Hand Coordination in Adults: Normative Values for the Finger Tapping and Grooved Pegboard Tests. Perceptual and Motor Skills, 1993, 76, 1219-1230.
Sakong, et al. Evaluation of Reliability of Traditional and Computerized Neurobehavioral Tests. NeuroToxicology 28, (2007): 235-239.

(56) References Cited

OTHER PUBLICATIONS

Salinsky, et al. Test-Retest Bias, Reliability, and Regression Equations for Neuropsychological Measure Repeated Over a 12-16-Week Period. Journal of the International Neuropsychological Society (2001), 7, 597-605.
Salthouse, et al. Decomposing Adult Age Differences in Working Memory. Developmental Psychology, 1991, vol. 27, No. 5, 763-776.
Schnirman, et al. Development of the Tower of London-Revised. Assessment, 1998, vol. 5, No. 4, 335-360.
Schroder, et al. When the Rules are Reversed: Action-Monitoring Consequences of Reversing Stimulus-Response Mappings. Cogn. Affect Behav. Neurosci. (2012), 12: 629-643.
Simpson, et al. Reliability of a Measure of Temporal Discounting. The Pyschological Record, 2000, 50, 3-16.
Smith, et al. Methodological Considerations in the Study of Delay Discounting in Intertemporal Choice: A Comparison of Tasks and Modes. Behavior Research Methods, 2008, 40(4): 940-953.
Sullivan, et al. Concurrent Validity of the Tower Tasks as Measures of Executive Function in Adults: A Meta-Analysis. Applied Neuropsychology, 16: 62-75, 2009.
Summary of the Standards for Educational and Psychological Testing, Appendix F. California State Personnel Board Merit Selection Manual: Policy and Practices. Oct. 2003.
Treadway, et al. Worth the 'EEfRT'? The Effort Expenditure for Rewards Task as an Objective Measure of Motivation and Anhedonia. PLoS One, Aug. 2009, vol. 4, Issue 8, e6598.
Umebayashi, et al. An ERP Investigation of Task Switching Using a Flanker Paradigm. Brain Research 1346 (2010): 165-173.
U.S. Appl. No. 14/751,943 Office Action dated Jan. 23, 2018.
Van Bochove, et al. Blinking Predicts Enhanced Cognitive Control. Cogn. Affect Behav. Neurosci. (2013), 13: 346-354.
White, et al. Test-Retest Characteristics of the Balloon Analogue Risk Task (BART). Experimental and Clinical Psychopharmacology, 2008, vol. 1, No. 6, 565-570.
Williams, et al. The Test-Retest Reliability of a Standardized Neurocognitive and Neurophysiological Test Battery: "Neuromaker". Intern. J. Neuroscience, 155: 1605-1630, 2005.
Yildirim, et al. Investigation of the Reliability of the "Reading the Mind in the Eyes Test" in a Turkish Population. Turkish Journal of Psychiatry 2011; 22: 1-8.
Zak, et al. Oxytocin is Associated with Human Trustworthiness. Hormones and Behavior 48 (2005): 522-527.
Zook, et al. Performance of Healthy, Older Adults on the Tower of Long-Revised: Associations with Verbal and Nonverbal Abilities. Aging, Neuropsychology, and Cognition, 13:1-19, 2006.
Oniszczuk, H., "Reliability and validity of career assessment instrumentation." (2010 p. 1-37 (Year: 2010).

\* cited by examiner

Contact

Sourcing   Models   Demo: Company vs Baseline   Candidates   Candidate A   Contact Candidate [ Contact ] Resume
                    902

Company A Demo
Thu Oct 15, 2015 at 10:41 am

Candidate A Love to speak with you about coming in to interview for an engineering position with our company. We have hourly slots available between 12-5pm all of next week. Looking forward to meeting you. Best, Jessica

Candidate A
Thu Oct 15, 2015 at 10:52 am

Hi Jessica, Thank you for the inquiry. It would be great to connect. How about 2pm next Tuesday? Looking forward to speaking and learning more about the position. Best, Fedor

Company A Demo
Mon Oct 19, 2015 at 7:57 am

Hi Candidate A  It was great speaking with you! Really looking forward to ahving you come in to mee the team.  Please le me know if Friday at 11am will work for you.  Best, Jessica Contact us!

Participation Snapshot
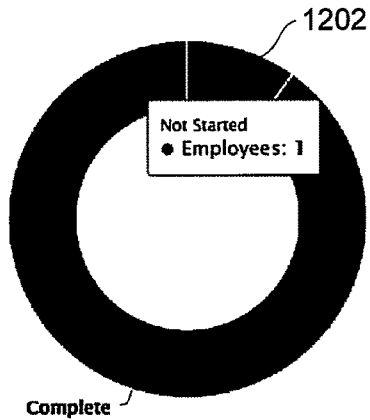
Part A
Participation Snapshot
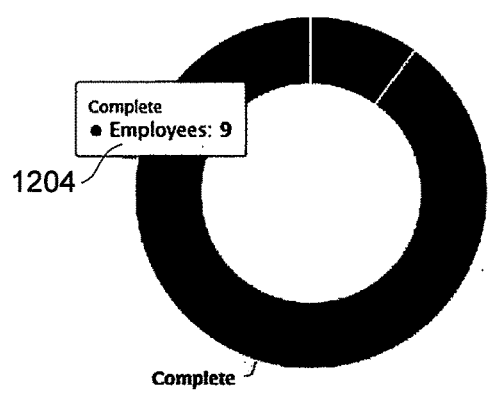
Part B
Participation Snapshot
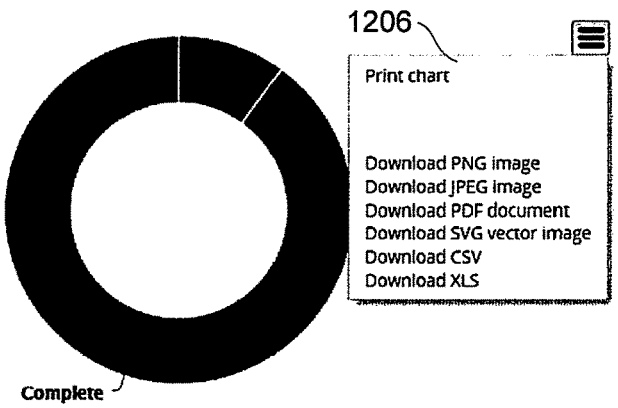
Part C
FIG. 12

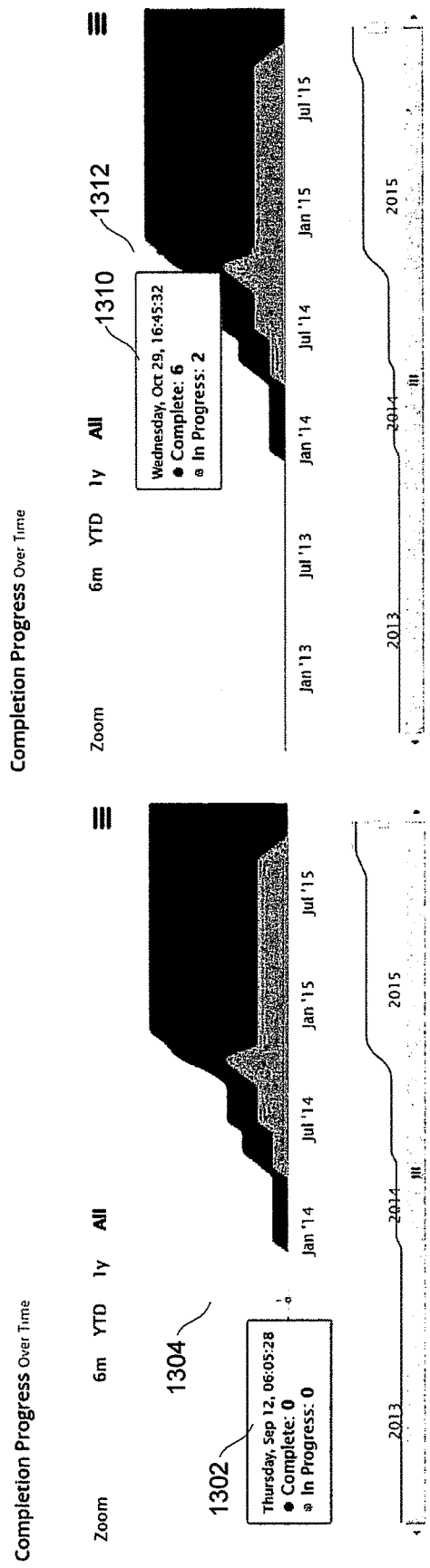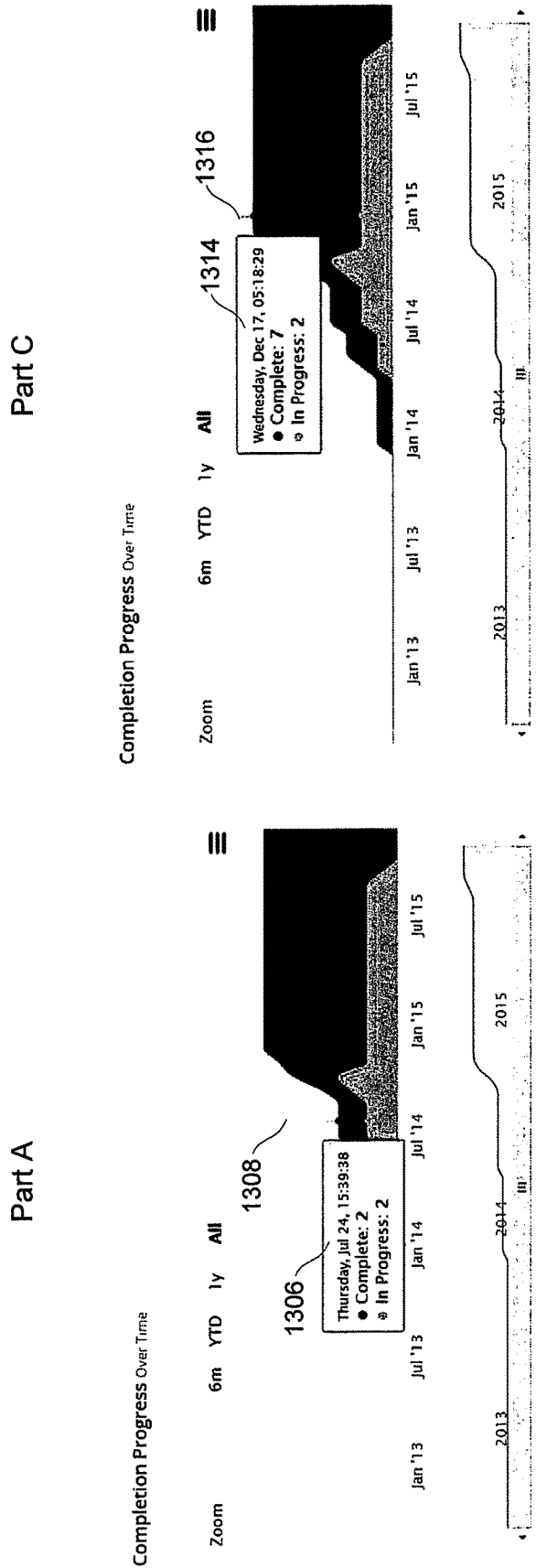
FIG. 13

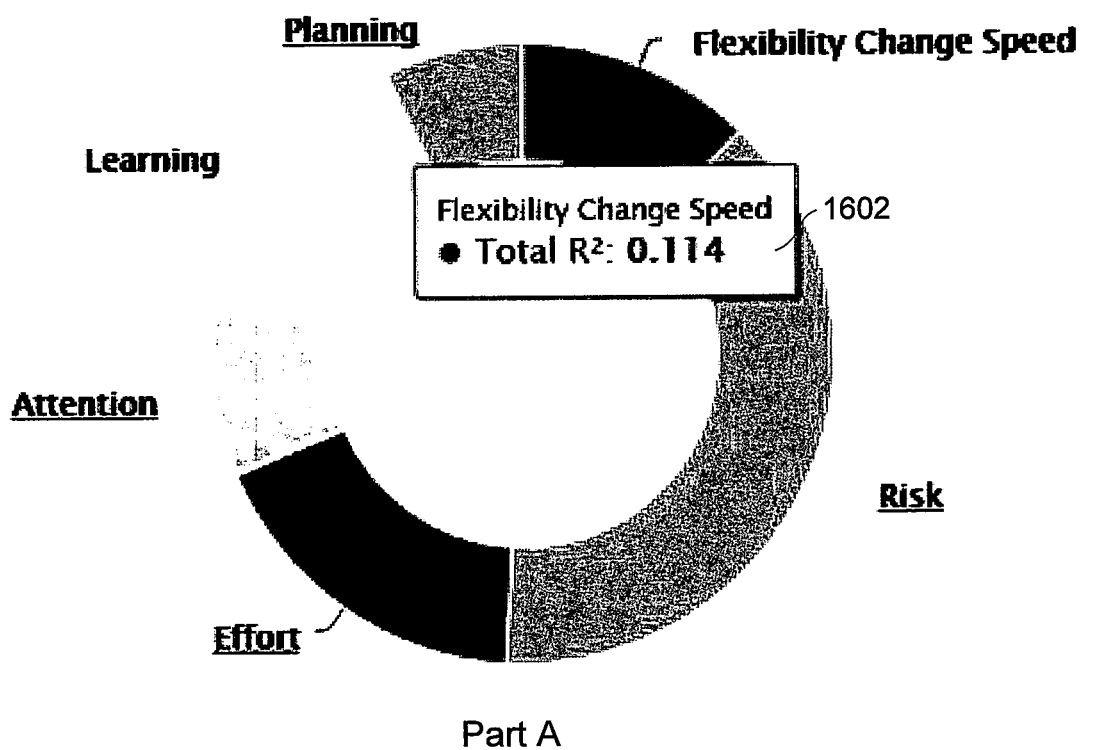
Part A
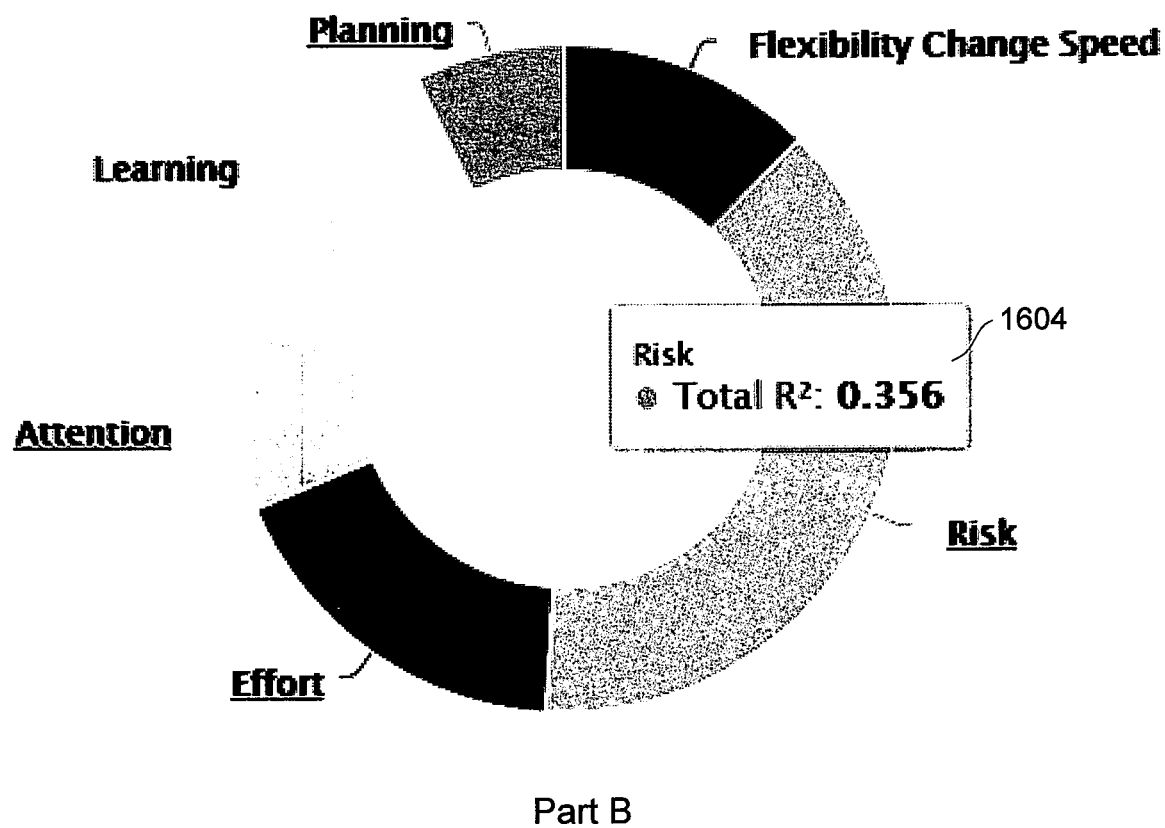
Part B
FIG. 16

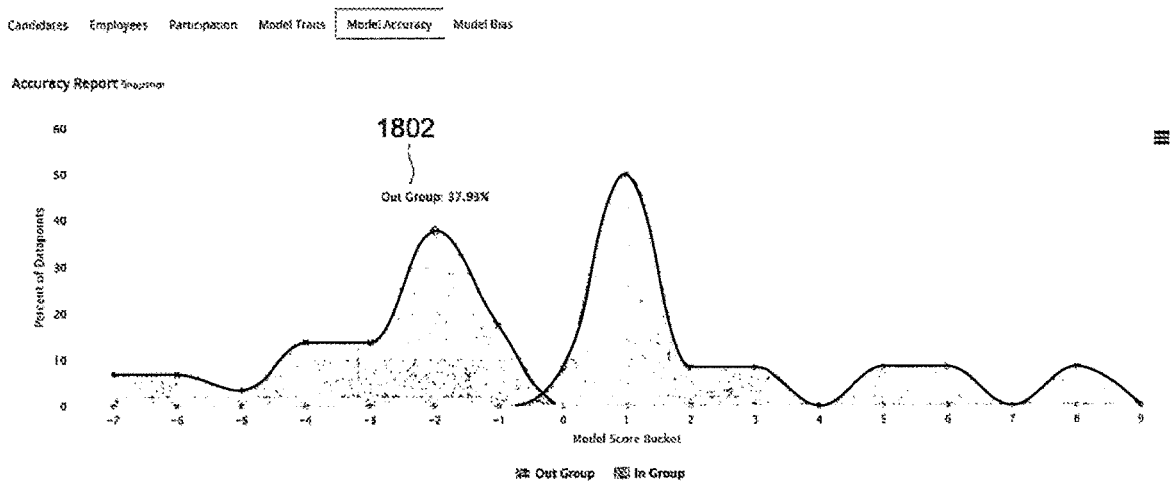
Part A
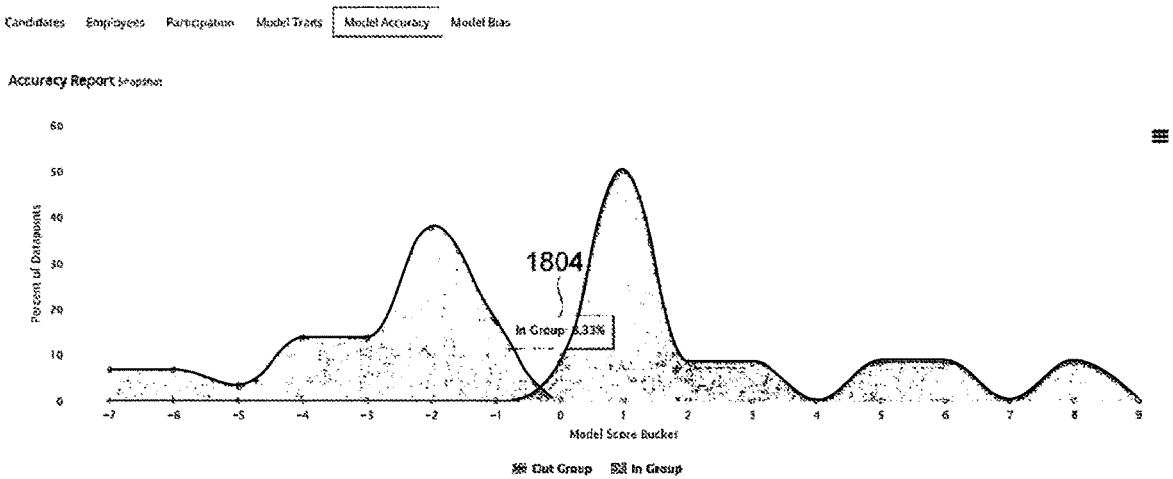
Part B
FIG. 18

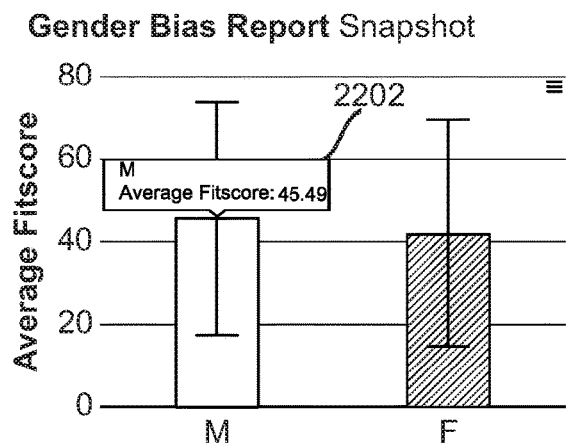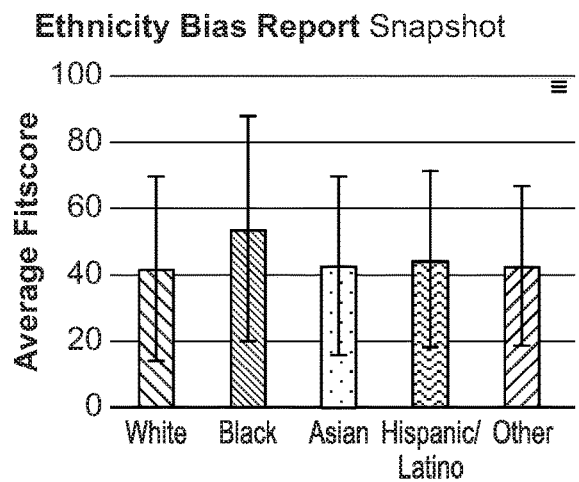
Part A
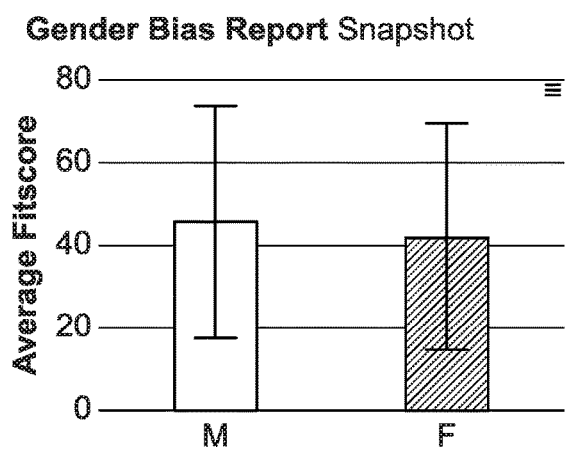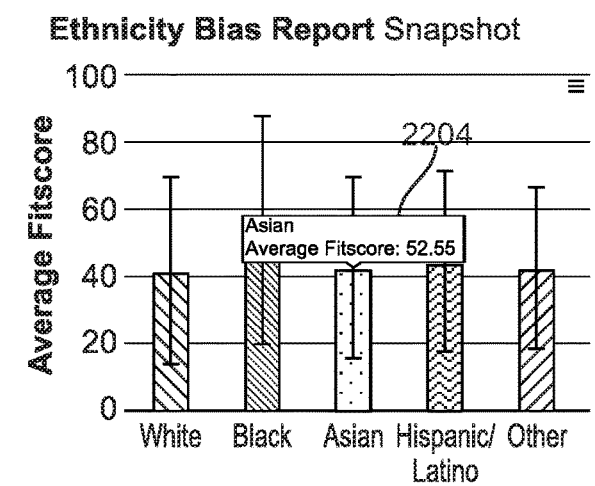
Part B
FIG. 22

Frequently Asked Questions

Frequently Asked Questions

If you don't find the answer to your question
add your question by clicking  + Add question

Where does ___ fit in with current recruiting processes? — 2902    THE PROCESS
Added by ⊙ Tue Nov 03 2015 12:03:03 GMT-0500 (EST)

What is the demographic of your candidates?    THE CANDIDATES
Added by ⊙ Tue Nov 03 2015 12:03:03 GMT-0500 (EST)

How will I be able to search through the candidates?    THE CANDIDATES
Added by ⊙ Fri Dec 04 2015 11:15:49 GMT-0500 (EST)

It seems like ___ would increase homogeneity in our company, but it doesn't. How is this the case?    THE CANDIDATES
Added by ⊙ Fri Dec 04 2015 11:16:10 GMT-0500 (EST)

How will employee scores be used?    THE PROCESS
Added by ⊙ Fri Dec 04 2015 11:19:19 GMT-0500 (EST)

Sidebar: demo, Sourcing, Screening, Internal Mobility, Downloads, Mailbox, Account, FAQ

FIG. 29

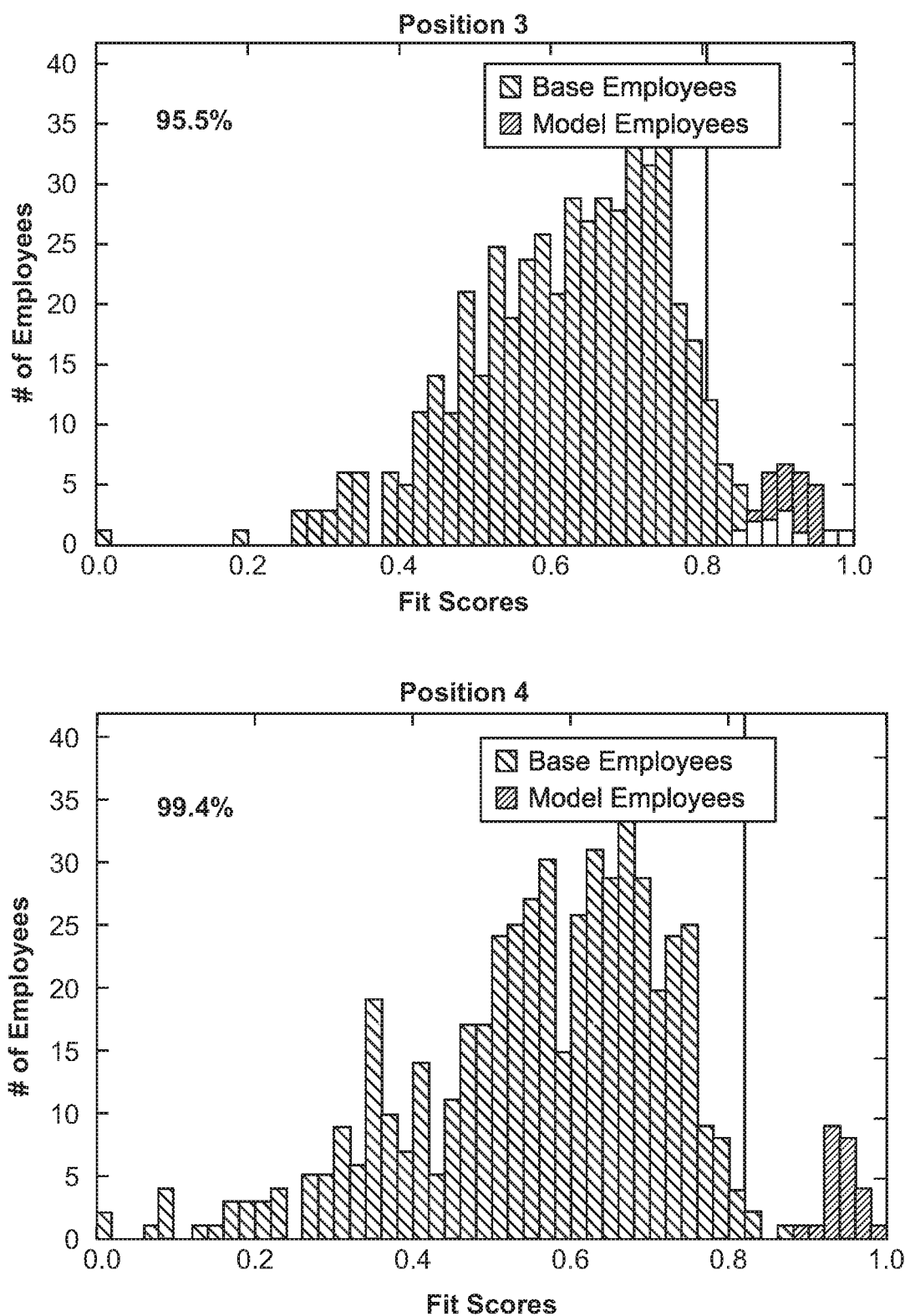
FIG. 34 (Con't)

SYSTEMS AND METHODS FOR DATA-DRIVEN IDENTIFICATION OF TALENT

CROSS-REFERENCE TO RELATED APPLICATION

This application is a continuation of PCT/US2016/068454, filed on Dec. 22, 2016, which application claims priority to U.S. Provisional Application No. 62/387,440, filed on Dec. 23, 2015, the content of which is incorporated herein in their entirety.

BACKGROUND

Recruiting suitable candidates for a position can be a challenging task for companies. Generally, companies can rely on recruiters and interviews to determine if an applicant would be an ideal fit for their team. However, finding new employees can be a time-consuming, costly, and, in some cases, futile process, especially if the pool of applicants is large. Conversely, determining a suitable career path can be a daunting task for new job-seekers, and existing job search resources are often not tailored to an individual. A platform to find an ideal employee or job, based on a desired characteristic profile, remains unavailable.

SUMMARY

There is a need for systems and methods that can be used by companies and different entities to: (1) identify talent that is tailored to a company's needs for a specific job position, and (2) identify top employees and recommend placement of those employees in positions that optimize their potential.

The systems and methods disclosed herein can address at least the above needs. In some embodiments, the systems and methods can match candidates with companies, based on the candidates' behavioral output obtained from one or more neuroscience-based tasks (or tests). The candidates' behavioral output may be compared against an employee model that is representative of an ideal employee for a specific position in the company. The plurality of neuroscience-based tasks may be provided in the form of performance-based games that are designed to test/measure a wide array of emotional and cognitive traits. The use of neuroscience-based games, and the analysis of results from these games against the employee model, can help a company to optimize its recruiting and candidate sourcing process. In addition to being a useful recruiting tool for companies, the systems and methods disclosed herein can assist individuals in career-planning and talent identification. By using tests that measure a wide array of emotional and cognitive traits, the system and methods can ascertain the strengths and weaknesses of a test subject and apply that information to recommend which field(s) are suitable for the test subject.

According to one aspect, a system for implementing a game-based personnel recruitment method is provided. The system may comprise a server in communication with a plurality of computing devices associated with a plurality of participants. The server may comprise a memory for storing interactive media and a first set of software instructions, and one or more processors configured to execute the first set of software instructions to provide interactive media to a plurality of computing devices associated with a plurality of participants. The interactive media may comprise at least one recruiting game that is designed to measure one or more emotional and cognitive traits of the participants. The recruiting game may include a plurality of predefined sets of graphical visual objects associated with a plurality of selected neuroscience-based computerized tasks. The plurality of predefined sets of visual objects may be displayed to the participants on graphical displays of the computing devices.

The one or more processors may also be configured to execute the first set of software instructions to receive input data from the computing devices when the participants play the recruiting game on the graphical displays of the computing devices by manipulating one or more of the graphical visual objects on the graphical displays using one or more input devices to complete the plurality of selected neuroscience-based computerized tasks.

The one or more processors may be further configured to execute the first set of software instructions to analyze the input data derived from the participants' manipulation of the one or more graphical visual objects within the recruiting game to (1) extract measurements of the participants' emotional and cognitive traits based on the degree of degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model.

The system may further comprise at least one computing device comprising a memory for storing a second set of software instructions, and one or more processors configured to execute the second set of software instructions to receive the analyzed input data from the server, and display the analyzed input data visually as a set of graphical visual objects on a graphical display of the at least one computing device. The set of graphical visual objects may comprise: (i) a first density function plot corresponding to participants that are classified to be out-of-group, (ii) a second density function plot corresponding to participants that are classified to be in-group, and (iii) a decision boundary defined relative to each of the first density function plot and the second density function plot. The decision boundary may be usable by an entity to determine a candidate's suitability for recruitment into a target position based on the candidate's measured performance in the recruiting game.

In some embodiments, the one or more processors may be configured to measure the candidate's performance in the recruiting game by comparing measurements of the candidate's emotional and cognitive traits to the statistical model.

In some embodiments, the one or more processors may be configured to generate a fit score for the candidate based on the comparison of the measurements of the candidate's emotional and cognitive traits to the statistical model. The fit score may be indicative of a level of match of the candidate with a select group of the participants. The one or more processors may also be configured to display a point indicative of the fit score on a graphical display of at least one computing device. The point may be displayed by superimposing the point over the first and second density function plots on the graphical display. The one or more processors may be further configured to classify the candidate to be: (1) out-of-group when the point lies in a first region relative to the decision boundary, or (2) in-group when the point lies in a second region relative to the decision boundary.

In some embodiment, the decision boundary may be defined in an overlapping region between the first and second density function plots. The first region may overlap with the first density function plot and the second region may overlap with the second density function plot. The candidate may be determined to be more similar to the participants that are classified to be out-of-group, and less similar to the participants that are classified to be in-group, when the point lies in the first region. Conversely, the candidate may be determined to be more similar to the participants that are classified to be in-group, and less similar to the participants that are classified to be out-of-group, when the point lies in the second region.

In some embodiments, a probability of the candidate being correctly classified to be out-of-group may increase as a distance of the point from the decision boundary into the first region increases. Conversely, a probability of the candidate being correctly classified to be in-group may increase as a distance of the point from the decision boundary into the second region increases.

In some embodiments, the candidate may be determined to be less suitable for the target position when the point lies in the first region, and the candidate may be determined to be more suitable for the target position when the point lies in the second region. A suitability of the candidate for the target position may be determined to decrease as a distance of the point from the decision boundary into the first region increases. Conversely, a suitability of the candidate for the target position may be determined to increase as a distance of the point from the decision boundary into the second region increases.

In some embodiments, a position of the decision boundary relative to the first and second density plots on the graphical displays may be adjustable by the entity, and the number of participants that are classified to be in-group or out-of-group may change when the position of the decision boundary is adjusted. For example, the position of the decision boundary may be adjustable in a first direction on the graphical display such that a higher number of participants are classified to be out-of-group and a lower number of participants are classified to be in-group. Conversely, the position of the decision boundary may be adjustable in a second direction on the graphical display such that a higher number of participants are classified to be in-group and a lower number of participants are classified to be out-of-group. The second direction may be opposite to the first direction. A higher number of candidates may be classified to be out-of-group and a lower number of candidates may be classified to be in-group when the position of the decision boundary is adjusted in the first direction. Conversely, a higher number of candidates may be classified to be in-group and a lower number of candidates are classified to be out-of-group when the position of the decision boundary is adjusted in the second direction.

In some embodiments, the one or more processors may be configured to generate a plurality of fit scores for a plurality of candidates based on comparisons of measurements of the candidates' emotional and cognitive traits to the statistical model. The fit scores may be indicative of a level of match of the candidates with the select group of the participants. The one or more processors may also be configured to effect display of a plurality of points indicative of the plurality of fit scores on the graphical display. The plurality of points may be displayed by superimposing the points over the first and second density function plots.

In some embodiments, the plurality of computing devices may be in communication with one another, and in communication with the server configured to provide the interactive media, as the recruiting game is being played by the plurality of participants on the plurality of computing devices. The input data may be stored in the memory of the server. The input data may comprise each participant's historical and/or current performance data in performing the plurality of selected neuroscience-based computerized tasks in the recruiting game. The one or more processors may be configured to predict each participant's future performance in performing the plurality of selected neuroscience-based computerized tasks in the recruiting game, based on each participant's historical and/or current performance data.

In some embodiments, the historical and/or current performance data may include: (1) an amount of time each participant spends on one or more of the selected neuroscience-based computerized tasks, (2) a number of attempts each participant takes to complete one or more of the selected neuroscience-based computerized tasks, (3) different actions that each participant takes to complete one or more of the selected neuroscience-based computerized tasks, (4) an amount of time each participant takes to perform one or more of the different actions, (5) each participant's accuracy in performing one or more of the different actions, and/or (6) weights that each participant applies when making certain decisions or judgment to complete one or more of the selected neuroscience-based computerized tasks.

In some embodiments, the one or more processors may be configured to analyze the input data to determine whether each participant has correctly selected, placed, and/or used different visual objects to complete the plurality of selected neuroscience-based computerized tasks in the recruiting game. The processors may also be configured to analyze the input data to assess each participant's learning, cognitive skills, and ability to learn from previous mistakes made in playing the recruiting game. In some instances, the processors may be configured to pair two or more participants of the plurality of participants in a random manner in the recruiting game such that each participant does not know an identity of the other paired participant(s), and at least one of the plurality of selected neuroscience-based computerized tasks may be designed to test a trust level and/or generosity level between the paired participants.

In some embodiments, the statistical model may be configured to dynamically factor in changes in the measurements of the participants' emotional and cognitive traits as the plurality of participants play multiple rounds of a same recruiting game, and/or as the plurality of participants play a plurality of different recruiting games.

In some embodiments, the one or more processors may be configured to de-identify the input data by masking identities of the participants that are playing the recruiting game, and store the de-identified input data in the memory of the server prior to the analyzing of the input data.

In some embodiments, the plurality of participants may be employed by the entity. The select group of participants may correspond to a group of employees of the entity who at least meet a set of job-performance metrics that are predefined by the entity. The statistical model may be correlated with the set of job-performance metrics.

In some embodiments, the manipulation of the one or more graphical visual objects may be effected by the participants selecting and/or spatially manipulating the one or more graphical visual objects on the graphical displays using one or more input devices to complete the plurality of selected neuroscience-based computerized tasks. The plurality of emotional and cognitive traits of the participants may be measured based on the participants' speed, accuracy, and/or judgment in completing the plurality of selected neuroscience-based computerized tasks.

In some embodiments, the recruiting game may be configured to allow the plurality of participants to interact with one another through the one or more graphical visual objects on the graphical displays, in order to complete the plurality of selected neuroscience-based computerized tasks. In some cases, different statistical models may be generated for a plurality of different fields, functions, industries and/or entities.

A computer-implemented game-based personnel recruitment method is provided in another aspect of the invention. The method may comprise providing interactive media to a plurality of computing devices associated with a plurality of participants. The interactive media may comprise at least one recruiting game that is designed to measure one or more emotional and cognitive traits of the participants. The recruiting game may include a plurality of predefined sets of graphical visual objects associated with a plurality of selected neuroscience-based computerized tasks. The plurality of predefined sets of visual objects may be displayed to the participants on graphical displays of the computing devices.

The method may also comprise receiving input data from the computing devices when the participants play the recruiting game on the graphical displays of the computing devices by manipulating one or more of the graphical visual objects on the graphical displays to complete the plurality of selected neuroscience-based computerized tasks.

The method may further comprise analyzing the input data derived from the participants' manipulation of the one or more graphical visual objects within the recruiting game to (1) extract measurements of the participants' emotional and cognitive traits based on the degree of degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model.

Additionally, the method may comprise displaying the analyzed input data visually as a set of graphical visual objects comprising: (i) a first density function plot corresponding to participants that are classified to be out-of-group, (ii) a second density function plot corresponding to participants that are classified to be in-group, and (iii) a decision boundary defined relative to each of the first density function plot and the second density function plot. The decision boundary may be usable by an entity to determine a candidate's suitability for recruitment into a target position based on the candidate's measured performance in the recruiting game.

In a further aspect of the invention, a tangible computer readable medium storing instructions that, when executed by one or more servers, causes the one or more servers to perform a computer-implemented neuroscience-based personnel recruitment method, is provided. The method may comprise providing interactive media to a plurality of computing devices associated with a plurality of participants. The interactive media may comprise at least one recruiting game that is designed to measure one or more emotional and cognitive traits of the participants. The recruiting game may include a plurality of predefined sets of graphical visual objects associated with a plurality of selected neuroscience-based computerized tasks. The plurality of predefined sets of visual objects may be displayed to the participants on graphical displays of the computing devices.

The method may also comprise receiving input data from the computing devices when the participants play the recruiting game on the graphical displays of the computing devices by manipulating one or more of the graphical visual objects on the graphical displays using one or more input devices to complete the plurality of selected neuroscience-based computerized tasks.

The method may further comprise analyzing the input data derived from the participants' manipulation of the one or more graphical visual objects within the recruiting game to (1) extract measurements of the participants' emotional and cognitive traits based on the degree of degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model.

Additionally, the method may comprise storing the analyzed input data for use by an entity. The analyzed input data may comprise a set of graphical visual objects configured to be visually displayed on a graphical display of at least one computing device. The set of graphical visual objects may comprise: (i) a first density function plot corresponding to participants that are classified to be out-of-group, (ii) a second density function plot corresponding to participants that are classified to be in-group, and (iii) a decision boundary defined in an overlapping region between the first density function plot and the second density function plot. The decision boundary may be usable by the entity to determine a candidate's suitability for recruitment into a target position based on the candidate's measured performance in the recruiting game.

In some embodiments, a computer program product comprising a computer-readable medium having computer-executable code encoded therein is provided. The computer-executable code may be adapted to be executed to implement a method comprising: a) providing a recruitment system, wherein the recruitment system comprises: i) a task module; ii) a measurement module; iii) an assessment module; and iv) an identification module; b) providing by the task module a computerized task to a subject; c) measuring by the measurement module a performance value demonstrated by the subject in performance of the task; d) assessing by the assessment module a trait of the subject based on the measured performance value; and e) identifying to a hiring officer by the identification module based on the assessed trait that the subject is suitable for hiring by an entity.

In some embodiments, a computer program product comprising a computer-readable medium having computer-executable code encoded therein is provided. The computer-executable code may be adapted to be executed to implement a method comprising: a) providing a talent identification system, wherein the talent identification system comprises: i) a task module; ii) a measurement module; iii) an assessment module; iv) an identification module; and v) an output module; b) providing by the task module a computerized task to a subject; c) measuring by the measurement module a performance value demonstrated by the subject in performance of a task; d) assessing by the assessment module a trait of the subject based on the measured performance value; e) identifying by the identification module a career propensity based on the assessing of the trait of subject; and f) outputting by the output module the identified career propensity to a hiring officer.

In some embodiments, a computer-implemented method may comprise: a) providing a computerized task to a subject; b) measuring a performance value demonstrated by the subject in performance of the task; c) assessing a trait of the subject based on the performance value; d) comparing by a processor of a computer system the trait of the subject with a database of test subjects; e) determining based on the comparing that the subject is suitable for hiring by an entity; and f) reporting to a hiring officer at the entity that the subject is suitable for hiring.

In some embodiments, a computer-implemented method may comprise: a) providing a computerized task to a subject; b) measuring a performance value demonstrated by the subject in performance of the task; c) assessing a trait of the subject based on the performance value; d) identifying by a processor of a computer system a career propensity of the subject based on a comparison of the assessed trait of the subject with a database of test subjects; and e) outputting a result of the comparison to a hiring officer.

In one aspect of the invention, a computer-implemented neuroscience-based personnel recruitment method is provided. The method may comprise: providing interactive media to a plurality of computing devices associated with a plurality of participants, wherein the interactive media comprises at least one recruiting game created with a set of selected neuroscience-based tasks that are designed to measure a plurality of emotional and cognitive traits of the participants, wherein the recruiting game includes a predefined set of visual objects associated with the set of selected neuroscience-based tasks, and wherein the predefined set of visual objects are presented on graphical displays of the computing devices; receiving input data from the computing devices when the participants play the recruiting game on the graphical displays of the computing devices by interacting with the predefined set of visual objects to complete the set of selected neuroscience-based tasks; analyzing the input data derived from the participants' interaction with the predefined set of visual objects within the recruiting game to (1) extract measurements of the participants' emotional and cognitive traits, (2) generate a statistics model based on the measurements of the participants' emotional and cognitive traits, wherein the statistics model is representative of a select group of participants, and (3) classify whether each participant is in-group or out-of-group by comparing the measurements of the participants' emotional and cognitive traits to the statistics model; and displaying the analyzed input data visually on the graphical display as a plurality of density function plots, wherein the plurality of density function plots comprise a first density function plot corresponding to the participants classified to be out-of-group and a second density function plot corresponding to the participants classified to be in-group, and wherein a decision boundary is defined in an overlapping region between the first density function plot and the second density function plot.

In some embodiments, the plurality of participants may further comprise at least one candidate, and the method may further comprise: comparing measurements of the candidate's emotional and cognitive traits to the statistics model, and generating a score for the candidate based on the comparison; displaying a point indicative of the score on the graphical display over the plurality of density function plots; and classifying the candidate to be: (1) in-group when the point lies in a first region relative to the decision boundary, or (2) out-of-group when the point lies in a second region relative to the decision boundary.

Another aspect of the invention may provide for a system for implementing a neuroscience-based personnel recruitment method. The system may comprise: a server in communication with a plurality of computing devices associated with a plurality of participants, wherein the server comprises a memory for storing a first set of software instructions, and one or more processors configured to execute the first set of software instructions to: provide interactive media to a plurality of computing devices associated with a plurality of participants, wherein the interactive media comprises at least one recruiting game created with a set of selected neuroscience-based tasks that are designed to measure a plurality of emotional and cognitive traits of the participants, wherein the recruiting game includes a predefined set of visual objects associated with the set of selected neuroscience-based tasks, and wherein the predefined set of visual objects are presented on graphical displays of the computing devices; receive input data from the computing devices when the participants play the recruiting game on the graphical displays of the computing devices by interacting with the predefined set of visual objects to complete the set of selected neuroscience-based tasks; analyze the input data derived from the participants' interaction with the predefined set of visual objects within the recruiting game to (1) extract measurements of the participants' emotional and cognitive traits, (2) generate a statistics model based on the measurements of the participants' emotional and cognitive traits, wherein the statistics model is representative of a select group of participants, and (3) classify whether each participant is in-group or out-of-group by comparing the measurements of the participants' emotional and cognitive traits to the statistics model. The plurality of computing devices may comprise a memory for storing a second set of software instructions, and one or more processors configured to execute the second set of software instructions to: receive the analyzed input data from the server; and display the analyzed input data visually on the graphical displays as a plurality of density function plots, wherein the plurality of density function plots comprise a first density function plot corresponding to the participants classified to be out-of-group and a second density function plot corresponding to the participants classified to be in-group, and wherein a decision boundary is defined in an overlapping region between the first density function plot and the second density function plot.

According to a further aspect of the invention, a tangible computer readable medium storing instructions that, when executed by one or more servers, causes the one or more servers to perform a computer-implemented neuroscience-based personnel recruitment method, is provided. The method may comprise: providing interactive media to a plurality of computing devices associated with a plurality of participants, wherein the interactive media comprises at least one recruiting game created with a set of selected neuroscience-based tasks that are designed to measure a plurality of emotional and cognitive traits of the participants, wherein the recruiting game includes a predefined set of visual objects associated with the set of selected neuroscience-based tasks, and wherein the predefined set of visual objects are presented on graphical displays of the computing devices; receiving input data from the computing devices when the participants play the recruiting game on the graphical displays of the computing devices by interacting with the predefined set of visual objects to complete the set of selected neuroscience-based tasks; analyzing the input data derived from the participants' interaction with the predefined set of visual objects within the recruiting game to (1) extract measurements of the participants' emotional and cognitive traits, (2) generate a statistics model based on the measurements of the participants' emotional and cognitive traits, wherein the statistics model is representative of a select group of participants, and (3) classify whether each participant is in-group or out-of-group by comparing the measurements of the participants' emotional and cognitive traits to the statistics model; and displaying the analyzed input data visually on the graphical display as a plurality of density function plots, wherein the plurality of density function plots comprise a first density function plot corresponding to the participants classified to be out-of-group and a second density function plot corresponding to the participants classified to be in-group, and wherein a decision boundary is defined in an overlapping region between the first density function plot and the second density function plot.

It shall be understood that different aspects of the invention can be appreciated individually, collectively, or in combination with each other. Various aspects of the invention described herein may be applied to any of the particular applications set forth below.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

FIG. 9 illustrates an exemplary communications window, in accordance with some embodiments;

FIGS. 12 and 13 illustrate the display of employee participation information as a user navigates within the window of FIG. 11, in accordance with some embodiments;

FIG. 16 illustrates the display of trait statistics as a user navigates within the window of FIG. 14, in accordance with some embodiments;

FIG. 18 illustrates the display of group characteristics as a user navigates within the window of FIG. 17A, in accordance with some embodiments;

FIG. 22 illustrates the display of bias fit scores as a user navigates within the window of FIG. 21, in accordance with some embodiments;

FIGS. 29 and 30 illustrate an exemplary frequently-asked questions (FAQ) window in a FAQ folder, in accordance with some embodiments;

DETAILED DESCRIPTION

Figure 1:
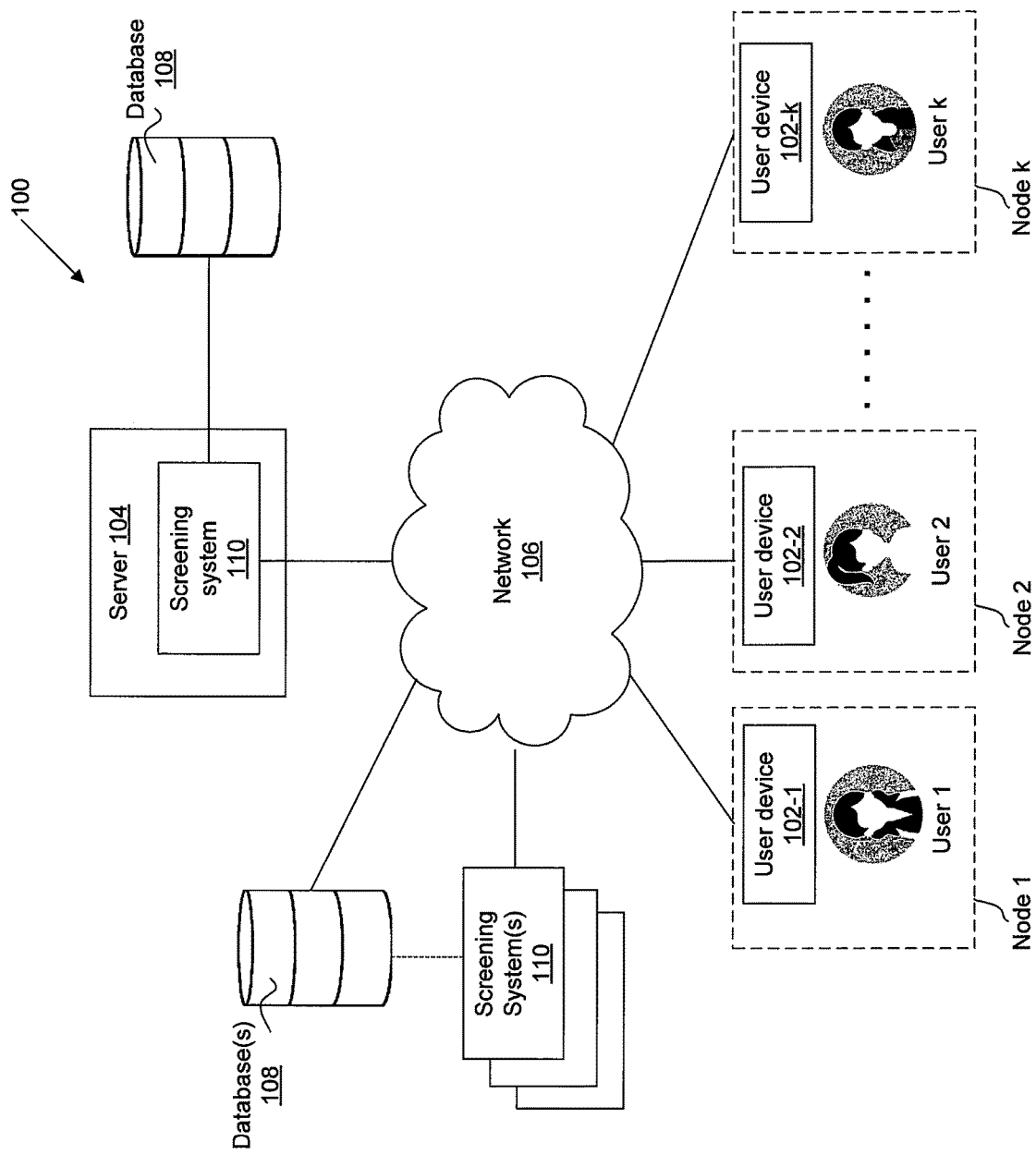
FIG. 1 illustrates an exemplary network layout comprising one or more screening systems, in accordance with some embodiments.

Companies often rely on inefficient recruiting practices, which can lead to the hiring of weak applicants, and ultimately, lower employee retention. Further, because the recruiting process can be expensive, employers can be reluctant to acquire new talent. This reluctance can lead to company stagnation and to the departure of top employees to pursue better opportunities. Thus, companies are faced with the difficult task of cost-effective, but accurate hiring. Conversely, new graduates or job seekers face challenges in finding a career that is most suited to their talents and inclinations not only owing to an unpredictable job market, but also to the difficulty of initially determining what career path to pursue.

In some cases, an employee may desire to switch to a different job role within a company, but may lack the opportunity to do so because of internal transfer guidelines that focus more on skillsets or experience, instead of the employee's aptitude or potential to excel in that role. The foreclosure of opportunities internally within a company may lead to the departure of top employees to pursue better opportunities elsewhere.

Accordingly, there is a need for systems and methods that can be used by companies to (1) identify talent that is tailored to a company's needs for a specific job position, and (2) identify top employees and recommend placement of those employees in positions that optimize their potential.

The systems and methods disclosed herein can address at least the above needs. In some embodiments, the systems and methods can match candidates with companies, based on the candidates' behavioral output obtained from one or more neuroscience-based tasks (or tests). The candidates' behavioral output may be compared against an employee model that is representative of an ideal employee for a specific position in the company. The plurality of neuroscience-based tasks may be provided in the form of performance-based games that are designed to test/measure a wide array of emotional and cognitive traits. The use of neuroscience-based games, and the analysis of results from these games against the employee model, can help a company to optimize its recruiting and candidate sourcing process. In addition to being a useful recruiting tool for companies, the systems and methods disclosed herein can assist individuals in career-planning and talent identification. By using tests that measure a wide array of emotional and cognitive traits, the system and methods can ascertain the strengths and weaknesses of a test subject and apply that information to recommend which field(s) are suitable for the test subject.

As described above, neuroscience-based games can be used to collect information about a person's cognitive and emotional traits. In some embodiments, the systems and methods disclosed herein can create an employee model for a company by evaluating a group of employees' performance on the neuroscience-based games. The group of employees may include current employees of the company. Optionally, the group of employees may also include former employees of the company. The group of employees may comprise some or all of the employees of the company. In some embodiments, the group of employees may comprise a select group of employees in the company (e.g., those employees in a specific geographical location or office). The employee model may be representative of an ideal employee for a specific position in the company, and may be generated based on the results of the neuroscience-based games and job performance data of the employees. Candidates may be asked to complete the same neuroscience-based games. The systems and methods can be used to analyze the candidates' results to the employee model to determine the candidates' suitability for a specific position. The systems and methods can also compare candidates across multiple positions to determine which position(s), if any, are suitable for the candidates based on the employee model.

Methods and Systems of the Invention

A wide range of rigorous methods can be used by a system of the invention to discover pertinent information for predicting factors about subjects that are of interest to a company. The system's assessment can comprise collecting objective data using the system's assessment module, and then modeling learning behavior dynamics. A strength of modeling learning behavior dynamics is that instead of examining behavior with a static score, for example, the average score, the system can instead examine behavior over time. This method can allow the system to ascertain metrics of learning, for example, how test takers learn from errors or how rewards affect the test-takers' learning. These metrics of learning are often neglected in human capital analytics, but can be valuable in determining important employee characteristics.

The system can use scores generated by the individual assessments within the system to create a fit score for a subject. The fit score can be an aggregation of the scores of the individual tasks. The fit score can range from 0-100% and predict the likelihood that a subject would be suitable for a specific position or career industry. Prior to performing prediction analyses, the system can quantify the relationships in existing data, and the quantification can identify the main features of the data and provide a summary of the data. For example, before the system can predict whether a particular candidate can succeed at a specific company as a management consultant, the system can build a descriptive model of the relationship between the current employees' traits and their success as management consultants. The system's analytics engine can implement various data mining and clustering algorithms for unsupervised classification to generate these descriptive models. To create descriptive models, the system can take assessment data from current employees and correlate the data with ratings of the employees provided to the system by the company. These ratings can be objective metrics, such as those used in performance reviews, and of particular interest to the company.

The systems and methods disclosed herein may be configured to determine emotional and cognitive traits of top/successful employees or professionals within various fields and within companies in a similar field, by collecting and analyzing neuroscience-based game performance data of a representative sample of employees in those companies. For example, by analyzing the neuroscience-based game performance data, the systems and methods herein can determine the emotional and cognitive traits of top/successful employees or professionals (1) within a company, (2) across different companies in a same field, (3) within a field or industry, (4) across different fields, and/or (5) across different companies in different fields. The emotional and cognitive traits of those top/successful employees may be analyzed for similarities and/or differences in each of the above (1) through (5) scenarios. In some cases, a first subset of traits of top/successful employees may be consistent across diverse fields, which may lead to a candidate's success in careers in diverse fields. In other cases, a second subset of traits of top/successful employees may be consistent across different companies within a same field, which may lead to a candidate's success in different companies within that field. In some other cases, a third subset of traits of top/ successful employees may be consistent within a company, which may lead to a candidate's success in that particular company. The abovementioned first, second, and third subsets of traits may comprise at least some overlapping traits and/or some different traits. Accordingly, the systems and methods disclosed herein can generate models of top employees at different organizational levels, for example (1) within a company, (2) across different companies in a same field, (3) within a field or industry, (4) across different fields, and/or (5) across different companies in different fields. One or more candidates may be compared against the traits of the top employees in one or more models, to determine the candidate's likelihood of success in a specific job position.

FIG. 1 illustrates an exemplary network layout comprising one or more screening systems, in accordance with some embodiments. In one aspect, network layout 100 may include a plurality of user devices 102, a server 104, a network 106, one or more databases 108, and one or more screening systems 110. Each of the components 102, 104, 108, and 110 may be operatively connected to one another via network 106 or any type of communication links that allows transmission of data from one component to another.

A user device may be, for example, one or more computing devices configured to perform one or more operations consistent with the disclosed embodiments. For example, a user device may be a computing device that is capable of executing software or applications provided by the screening system. In some embodiments, the software may provide neuroscience-based games that are designed to collect information about a person's cognitive and emotional traits. A company can use this information to optimize its recruiting and candidate sourcing process. The games may be hosted by the server on one or more interactive webpages, and played by one or more users. The one or more users may comprise employees of a company, job candidates, jobseekers, etc. In some embodiments, the software or applications may include a client side web-based portal configured to receive and analyze information collected from the neuroscience-based games, and to report results to one or more end users. The end users may include recruiters, human resource personnel of a company, managers, supervisors, etc.

A user device can include, among other things, desktop computers, laptops or notebook computers, mobile devices (e.g., smart phones, cell phones, personal digital assistants (PDAs), and tablets), or wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data.

In some embodiments, the network layout may include a plurality of user devices. Each user device may be associated with a user. Users may include employees of a company, candidates for a job position, jobseekers, recruiters, human resource personnel, students, teachers, instructors, professors, company administrators, game developers, or any individual or groups of individuals using software or applications provided by the screening system. In some embodiments, more than one user may be associated with a user device. Alternatively, more than one user device may be associated with a user. The users may be located geographically at a same location, for example employees working in a same office, or job candidates at a particular geographical location. In some instances, some or all of the users and user devices may be at remote geographical locations (e.g., different cities, countries, etc.), although this is not a limitation of the invention.

The network layout may include a plurality of nodes. Each user device in the network layout may correspond to a node. If a "user device 102" is followed by a number or a letter, it means that the "user device 102" may correspond to a node sharing the same number or letter. For example, as shown in FIG. 1, user device 102-1 may correspond to node 1 which is associated with user 1, user device 102-2 may correspond to node 2 which is associated with user 2, and user device 102-$k$ may correspond to node k which is associated with user k, where k may be any integer greater than 1.

A node may be a logically independent entity in the network layout. Therefore, the plurality of nodes in the network layout can represent different entities. For example, each node may be associated with a user, a group of users, or groups of users. For example, in one embodiment, a node may correspond to an individual entity (e.g., an individual). In some particular embodiments, a node may correspond to multiple entities (e.g., a group of individuals having different roles/responsibilities for recruiting or talent placement). An example of those particular embodiments may be recruiters and human resource personnel sharing a common node.

A user may be registered or associated with an entity that provides services associated with one or more operations performed by the disclosed embodiments. For example, the user may be a registered user of an entity (e.g., a company, an organization, an individual, etc.) that provides one or more of servers 104, databases 108, and/or screening systems 110 for data-driven identification of talent consistent with certain disclosed embodiments. The disclosed embodiments are not limited to any specific relationships or affiliations between the users and an entity, person(s), or entities providing server 104, databases 108, and screening systems 110.

A user device may be configured to receive input from one or more users. A user may provide an input to a user device using an input device, for example, a keyboard, a mouse, a touch-screen panel, voice recognition and/or dictation software, or any combination of the above. The input may include performing various virtual actions in a neuroscience game environment (for example, as performed by an employee or a job candidate). The input may also include an end user's instruction to the screening system to analyze an employee or job candidate's performance against an employee model stored in one or more databases. Different users may provide different input, depending on their roles and responsibilities (e.g., employees, job candidates, recruiters, and human resource personnel may provide different inputs).

In the embodiment of FIG. 1, two-way data transfer capability may be provided between the server and each user device. The user devices can also communicate with one another via the server (i.e., using a client-server architecture). In some embodiments, the user devices can communicate directly with one another via a peer-to-peer communication channel. The peer-to-peer communication channel can help to reduce workload on the server by utilizing resources (e.g., bandwidth, storage space, and/or processing power) of the user devices.

A server may comprise one or more server computers configured to perform one or more operations consistent with disclosed embodiments. In one aspect, a server may be implemented as a single computer, through which a user device is able to communicate with other components of the network layout. In some embodiments, a user device may communicate with the server through the network. In other embodiments, the server may communicate on behalf of a user device with the screening system(s) or the database through the network. In some embodiments, the server may embody the functionality of one or more screening system(s). In some embodiments, the screening system(s) may be implemented inside and/or outside of the server. For example, the screening system(s) may be software and/or hardware components included with the server or remote from the server.

In some embodiments, a user device may be directly connected to the server through a separate link (not shown in FIG. 1). In certain embodiments, the server may be configured to operate as a front-end device configured to provide access to one or more screening system(s) consistent with certain disclosed embodiments. The server may, in some embodiments, utilize the screening system(s) to process input data from a user device in order to determine the user's neuroscience-based gameplay performance, and to analyze the user's gameplay performance to determine a match between the user and an employee model. The server may be configured to store employees' and candidates' gameplay performance data in the database. The server may also be configured to search, retrieve, and analyze data and information stored in the database. The data and information may include a user's historical performance in one or more neuroscience-based games, as well as the user's current performance in one or more neuroscience-based games.

A server may include a web server, an enterprise server, or any other type of computer server, and can be computer programmed to accept requests (e.g., HTTP, or other protocols that can initiate data transmission) from a computing device (e.g., a user device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. While FIG. 1 illustrates the server as a single server, in some embodiments, multiple devices may implement the functionality associated with the server.

The network may be configured to provide communication between various components of the network layout depicted in FIG. 1. The network may be implemented, in some embodiments, as one or more networks that connect devices and/or components in the network layout for allowing communication between them. For example, as one of ordinary skill in the art will recognize, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired, or a combination thereof.

The screening system(s) may be implemented as one or more computers storing instructions that, when executed by one or more processor(s), process neuroscience-based gameplay performance data in order to determine a user's emotional and cognitive traits, and to compare the user's traits against one or more models (e.g., an employee model representative of an ideal employee for a specific job position in a company) to determine the user's match/compatibility with the one or more models. The screening system(s) may also search, retrieve, and analyze neuroscience-based gameplay performance data and job performance data of employees/candidates that is stored in the database. The neuroscience-based gameplay performance data may, for example, include: (1) an amount of time a user spends playing a game, (2) a number of attempts a user takes to complete the game, and (3) different actions that the user performs during the game, (4) an amount of time the user takes to perform each action, (5) the user's accuracy in performing certain actions, and (6) weights that the user applies when making certain decisions/judgment during the game. In some embodiments, the server may be the computer in which the screening system(s) are implemented.

However, in some embodiments, at least some of the screening system(s) may be implemented on separate computers. For example, a user device may send a user input to the server, and the server may connect to other screening system(s) over the network. In some embodiments, the screening system(s) may comprise software that, when executed by processor(s), perform processes for data-driven identification of talent.

The server may access and execute the screening system(s) to perform one or more processes consistent with the disclosed embodiments. In certain configurations, the screening system(s) may be software stored in memory accessible by the server (e.g., in a memory local to the server or remote memory accessible over a communication link, such as the network). Thus, in certain aspects, the screening system(s) may be implemented as one or more computers, as software stored on a memory device accessible by the server, or a combination thereof. For example, one screening system may be computer hardware executing one or more data-driven talent identification techniques, and another screening system may be software that, when executed by the server, performs one or more data-driven talent identification techniques.

The screening system(s) can be used to match candidates with companies in a variety of different ways. For example, the screening system(s) may store and/or execute software that performs an algorithm for processing employees' neuroscience-based gameplay data to generate an employee model representative of an ideal employee for a specific job position in a company. The screening system(s) may also store and/or execute software that performs an algorithm for dynamically modifying the employee model based on changes in the employees' neuroscience-based gameplay data and/or job performance ratings. The screening system(s) may further store and/or execute software that performs an algorithm for comparing candidates' neuroscience-based gameplay data against the employee model to determine how well the candidates' behavior matches the behavior of employees in the employee model, and the likelihood of the candidates succeeding in a specific job position.

The disclosed embodiments may be configured to implement the screening system(s) such that a variety of algorithms may be performed for performing one or more data-driven talent identification techniques. Although a plurality of screening systems have been described for performing the above algorithms, it should be noted that some or all of the algorithms may be performed using a single screening system, consistent with disclosed embodiments.

The user devices, the server, and the screening system(s) may be connected or interconnected to one or more database(s). The database(s) may be one or more memory devices configured to store data (e.g., neuroscience-based gameplay data and employee models). Additionally, the database(s) may also, in some embodiments, be implemented as a computer system with a storage device. In one aspect, the database(s) may be used by components of the network layout to perform one or more operations consistent with the disclosed embodiments. In certain embodiments, one or more the database(s) may be co-located with the server, or may be co-located with one another on the network. One of ordinary skill will recognize that the disclosed embodiments are not limited to the configuration and/or arrangement of the database(s).

Any of the user devices, the server, the database(s), and/or the screening system(s) may, in some embodiments, be implemented as a computer system. Additionally, while the network is shown in FIG. 1 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the server and the screening system Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Figure 2:
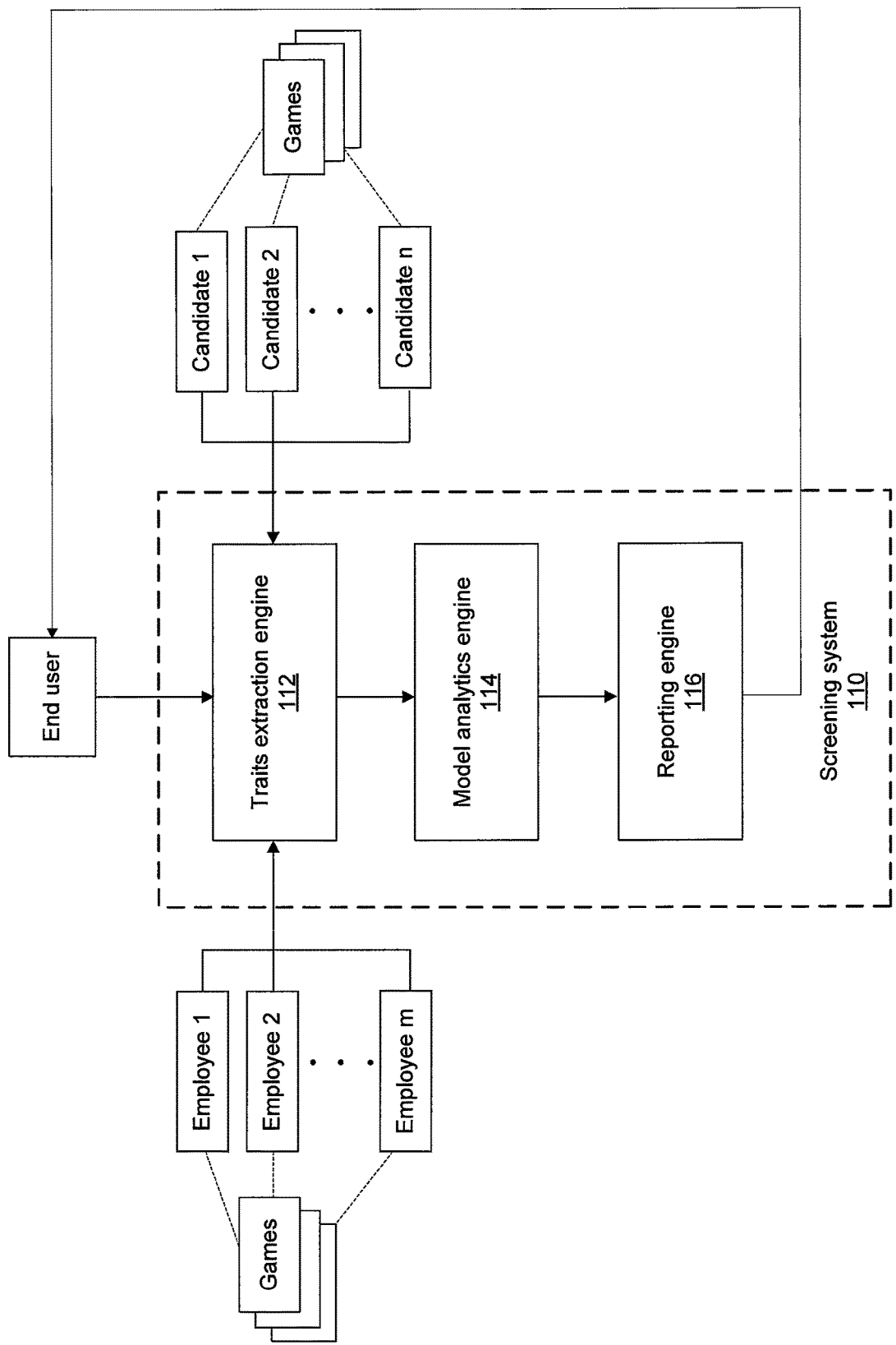
FIG. 2 illustrates a schematic block diagram of exemplary components in a screening system and inputs/output of the screening system, in accordance with some embodiments.

FIG. 2 illustrates a schematic block diagram of exemplary components in a screening system and inputs/output of the screening system, in accordance with some embodiments. As previously described, the screening system may be implemented inside and/or outside of a server. For example, the screening system may be software and/or hardware components included with the server, or remote from the server.

Referring to FIG. 2, a screening system 110 may include a traits extraction engine 112, a model analytics engine 114, and a reporting engine 116. The screening system may be configured to receive input from a plurality of users. The users may include one or more end users, employees, or job candidates. An end user may be a recruiter for a company or human resource personnel with a company. The group of employees may include current employees of the company. Optionally, the group of employees may include former employees of the company. The group of employees may comprise some or all of the employees of the company. In some embodiments, the group of employees may comprise a select group of employees in the company. A group of employees may be selected based on geographical location, job functions, job performance, or any other factors. Job candidates may include users who are applying for a specific position in the company, active job-seekers, users whose resumes/profiles are in a database and who may be potential matches for the company, recent college graduates, students, etc.

An end user may submit a request (e.g., via a user device) to the screening system to identify top candidates who may be tailored to a company's needs for a specific position. An end user may use the screening system to match candidates with the company, by analyzing the candidates' behavioral output using an employee model. The employee model may be representative of ideal (or exemplary) employee for a specific position in the company. The employee model may be generated based on the results of a plurality of neuroscience-based games and job performance data of the employees. The games may be designed to test/measure a wide array of emotional and cognitive traits of the employees, by having the employees complete a plurality of neuroscience-based tasks. Those traits may be indicative of, and may translate to an employee's success in the company/workplace in his/her role. The job performance data may include ratings of the employees provided by the company (e.g., from the human resource personnel, managers, supervisors, etc.). The ratings may be objective metrics, such as those used in performance reviews, and of particular interest to the company. The screening system may be configured to determine the correlation between the employer-provided ratings and the employees' performance on the neuroscience-based games.

As shown in FIG. 1, the traits extraction engine may be configured to receive gameplay data of a plurality of employees (Employee 1, Employee 2, to Employee m, where m may be any integer greater than 2). In some cases, the traits extraction engine may receive gameplay performance data directly from a user device associated with an employee. Alternatively, the traits extraction engine may receive gameplay data of the employees from a database or a server. The database or server (on which employees' gameplay data is stored or transmitted from) may be local or remote to a server on which the screening system is implemented. The games may be administered to the employees by the company. Alternatively, the games may be administered to the employees by a third party that may or may not be affiliated with the company. In some embodiments, the games may be provided by the screening system using one or more interactive webpages or through mobile applications. Optionally, the games need not be provided by the screening system, and may be hosted on a server that is remote from the screening system. The traits extraction engine may be configured to extract a plurality of emotional and cognitive traits of the employees from the employees' gameplay data.

Examples of tasks in the neuroscience-based games may include Analogical Reasoning, Balloon Analogue Risk Task, Choice Task, Dictator Task, Digit Span, EEfRT, Facial Affect Task, Finger Tapping, Future Discounting, Flanker Task, Go/No-Go, Mind in the Eyes, N-Back, Pattern Recognition, Reward Learning Task, Tower of London, or the Trust Task. Details of each of the above task will be described later in the specification.

After the emotional and cognitive traits of the employees have been extracted, the traits extraction engine may input the traits to the model analytics engine. The model analytics engine may be configured to determine the correlation between the traits and employer-provided ratings of the employees, and to generate the employee model based on the correlated traits. For example, the model analytics engine can apply data mining and clustering algorithms to the correlated employees' gameplay data and employer-provided ratings, to generate and fine-tune the employee model. As previously described, the employee model comprises characteristics that an ideal employee is likely to possess for a specific position at the company. Accordingly, the employee model may be based upon a target group of top employees out of all employees who are taking the neuroscience-based tests (playing the games). The employee model may be contrasted against an appropriate baseline group. The baseline group may be selected from a database comprising of employees from other fields, who may be similar to the target group of employees taking the neuroscience-based tests in terms of demographic factors such as gender, age, ethnicity, educational background, but who do not work in in the same field as the target group of employees. The model analytics engine can determine whether an employee taking the neuroscience-based tests is classified as in-group or out-of-group, by contrasting the employee's gameplay data with the baseline group.

In some embodiments, the model analytics engine can methodically identify certain traits and establish their relationships with the employees' job performance ratings, by analyzing the employees' behavioral output and job performance ratings using machine learning algorithms. The machine learning algorithms may utilize support vector machines (SVMs) but are not limited thereto. In some embodiments, random forests and other analysis techniques may be used. The machine learning algorithms may be based on statistical inference. The model analytics engine may be configured to automatically identify certain traits and their correlations from the employees' gameplay performance data and job performance ratings. In some embodiments, the model analytics engine may be configured to learn new traits that contribute to success in a company or a specific job role, by analyzing large corpora of real-world neuroscience-based gameplay data stored in one or more databases. The model analytics engine may include statistical models capable of making soft, probabilistic decisions that are based on attaching real-valued weights to each trait. In some embodiments, natural language processing (NLP) may be used to parse through candidates' and/or employees' resumes and demographic data.

In some embodiments, the model analytics engine can identify characteristics of interest from the employees' gameplay data and job performance ratings, without requiring knowledge of the underlying probability distribution between those characteristics, and determine specific relationships between observed variables. An advantage of machine learning is automatic recognition of complex patterns and intelligent decisions based on analysis of gameplay data and job performance ratings. In some embodiments, the model analytics engine can use non-linear, non-parametric classification techniques, which can perform better than traditional pattern classification algorithms in data sets having many attributes with a small training dataset.

After the model analytics engine has been adequately 'trained' using the above-described data, the employee model can be used by an end user (e.g., a recruiter or human resource personnel of a company) to predict the likelihood of a candidate's success in a specific job position with the company. The neuroscience-based games (that were previously played by employees to generate the employee model) may now be provided to one or more candidates. The screening system may be configured to obtain the candidates' behavioral output from their performance on the neuroscience-based games. For example, the traits extraction engine may be configured to extract emotional and cognitive traits about each candidate based on each candidate's gameplay data. In some embodiments, a profile may be generated for each candidate. The profile may contain a list of traits that are unique or specific to the candidate.

Next, the traits extraction engine may input the candidate traits to the model analytics engine. The model analytics engine may be configured to analyze the candidate traits by comparing them against the employee model, so as to generate a fit score for each candidate. The fit score can be used to determine the likelihood of each candidate succeeding in a particular role at the company. The scoring of candidates using the employee model can provide a quantitative assessment of each candidate's emotion or cognition associated with success in a specific job position. By comparing the traits of the candidates with the traits of employees (e.g., top employees) in the company, an end user (e.g., a recruiter or human resource personnel) can determine whether a candidate is suitable for hiring to fill a specific job position. In some embodiments, the candidate traits may be compared across multiple positions to determine which position(s), if any, are suitable for the candidates based on one or more employee models.

The fit score for a candidate may be an aggregate of the scores of the candidate on the neuroscience-based tasks. A fit score can range from 0-100%, and can be used to predict the likelihood that a candidate would be suitable for a specific position or career industry. A fit score can be, for example, about 0%, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 60%, about 70%, about 80%, about 90%, or about 100%.

Next, the reporting engine may receive the fit score for each candidate from the model analytics engine, and provide the fit score and a recommendation to the end user. The recommendation may include whether a particular candidate is suitable for hiring to fill a specific job position, and the likelihood of the candidate's success in that position.

Accordingly, by using the above-described screening system and methods, pertinent information about candidates can be extracted and analyzed to predict/identify factors that are of interest to a company. The screening system can be used to collect objective data derived from neuroscience-based gameplay data and employees' job performance ratings, and create a dynamic model that is capable of identifying different traits that contribute to success for a specific job position in the company. The dynamic nature of the model allows employee/candidate behavior to be examined over time, instead of examining behavior using a one-time static score. The screening system can also ascertain performance metrics associated with different traits, for example, how employees/candidates learn from errors made while playing the games, and how rewards affect their learning and performance. These metrics of learning are often neglected in human capital analytics, but can be valuable in determining employee characteristics that are associated with success.

A business entity can use the screening system of FIG. 2 to identify and recruit talented candidates. Non-limiting examples of a business entity may include a corporation, a cooperative, a partnership, a company, a public limited company, a private company, a public company, a limited liability company, a limited liability partnership, a charter corporation, an organization, a non-profit organization, a staffing agency, an academic institution, a government facility, a government agency, a military department, or a charitable organization. End users of the screening system may include, for example, recruiters, human resources personnel, managers, supervisors, hiring officers, career advisors, career placement professionals, or employment agencies.

Non-limiting examples of subjects who can work on behalf of a business entity include an employee, a full-time employee, a part-time employee, a statutory employee, a temporary employee, a contractor, an independent contractor, a subcontractor, an emeritus employee, a consultant, and an advisor.

A system of the invention can also be used by a subject to determine the subject's career propensities. Subjects who can use the invention include, for example, students, post-graduates, job seekers, and individuals seeking assistance regarding career planning. A subject can complete the tasks of the system, after which the system can create a profile for the subject based upon identified traits of the subject. A user can access a system of the invention from a computer system. The user can then complete the computerized tasks of the system using, for example, a computer, a laptop, a mobile device, or a tablet.

A subject's profile can be compared to a database of test subjects to score the subject and generate a model for the subject based on reference models. The test subjects can, for example, work for a business entity. The system can additionally generate a fit score for the subject based on the test subjects who work for a business entity and the test subjects' specific positions at the business entity. A system of the invention can recommend various industries to a subject based upon the subject's determined career propensity. Non-limiting examples of the industries that can be recommended by the system include consulting, education, healthcare, marketing, retail, entertainment, consumer products, entrepreneurship, technology, hedge funds, investment management, investment banking, private equity, product development, and product management.

In some embodiments, the model analytics engine can identify a subject's career propensity by comparing the subject's traits against a plurality of models. The subject may be a job-seeker, someone seeking to switch to a different field, a recent college graduate, post-graduates, a student, or individuals seeking assistance regarding career planning. The models may be associated with employees who work for different business entities. The models may be associated with different fields (e.g., banking, management consulting, engineering, etc.). Alternatively, the models may be associated with different job functions within a same field (e.g., software engineer, process engineer, hardware engineer, sales or marketing engineer, etc.). An end user (e.g., a recruiter or a career advisor) may use the results of the traits comparison to recommend one or more suitable careers to the subject.

A subject may be asked to complete one or more neuroscience-based games, after which the screening system can create a profile for the subject based on the identified traits of the subject. The games may be provided to the subject on a user device, and the subject may play the games on the user device. Upon completion of the games, the user device may transmit the subject's gameplay data to the screening system for analysis. The screening system can generate a fit score for the subject by comparing the subject's traits against a plurality of models. The screening system can use the fit score to determine the subject's career propensity and recommend suitable career fields to the subject. Non-limiting examples of the fields (or industries) that can be recommended by the screening system may include consulting, education, healthcare, marketing, retail, entertainment, consumer products, entrepreneurship, technology, hedge funds, investment management, investment banking, private equity, product development, or product management.

As described above, the screening system can extract emotional and cognitive traits from a candidate or a subject's neuroscience-based gameplay data, to determine the candidate's likelihood of succeeding in a specific job position, as well as the subject's career propensity in different fields.

Emotional traits can be important factors in determining whether a candidate or a subject is suitable for a company, and for fulfilling a specific role within the company. The screening system can assess a variety of emotional traits to assist an end user of the system in making hiring decisions. The emotional traits that can be extracted and measured by the system may include, for example, trust, altruism, perseverance, risk profile, learning from feedback, learning from mistakes, creativity, tolerance for ambiguity, ability to delay gratification, reward sensitivity, emotional sensitivity, or emotional identification, and are described below.

Trust can be evaluated as a willingness to rely upon another's actions without knowledge of the other's actions. Trust can demonstrate whether the subject can work effectively in a group setting, and rely on others' opinions and actions.

Altruism can be assessed as selflessness, or the willingness to perform actions for the welfare of others. Altruism can demonstrate that the subject can be more willing to serve the needs of the company than the needs of the self.

Perseverance can be described as continuing on a course of action without regard to discouragement. Perseverance can demonstrate that even in times of failure or opposition, the subject can find a solution and focus on assigned tasks.

Creativity can demonstrate that the subject can have unconventional approaches for solving problems and performing tasks.

A risk profile for a candidate can identify the willingness of a subject to take risks. A subject who is more willing to take risks can be more favorable for a company that deals with high-risk, high-pressure situations.

Learning from feedback can measure whether a subject can use suggestions from others to modify behaviors or actions while performing a function of a job. Learning from mistakes can assess whether a subject can use mistakes made on a task to modify future behavior to perform the same task.

A tolerance for ambiguity can assess a subject's comfort level with uncertain or incomplete situations, and stimuli, and the subject's reactions to the same. A subject with a tolerance for ambiguity can be more creative and resourceful when faced with incomplete or questionable data.

A subject with an inclination toward delayed gratification can appeal to a company because the subject can work harder, and for a longer period time, in expectation of a raise or bonus.

Reward sensitivity is related to delayed gratification in that reward sensitivity can measure how motivated a subject is by the promise of a reward. A company can desire a subject who is not only intrinsically motivated, but also sensitive to rewards, such as raises and bonuses.

Emotional sensitivity and identification can describe whether a subject is able to respond to another's emotions in an appropriate manner, and whether the subject is able to identify correctly the emotions of another. Subjects with higher emotional sensitivity and identification abilities can be better team players and leaders.

In addition to the above-described emotional traits, cognitive traits can also be assessed and used by a business entity to determine whether a subject is suitable for employment. The cognitive traits that can be extracted or measured by the screening system may include, for example, processing speed, pattern recognition, continuous attention, ability to avoid distraction, impulsivity, cognitive control, working memory, planning, memory span, sequencing, cognitive flexibility, or learning, and are described below.

Processing speed relates to the ability to process information thoroughly and speedily, without the need for intentional thought. A subject with a higher processing speed can be desirable to a company in that the subject can think and react to situations quickly.

Pattern recognition can refer to the ability to recognize a set of stimuli arranged in a certain manner that is characteristic of that set of stimuli. A subject with higher pattern recognition skills can demonstrate better critical thinking skills and identify trends in data.

A subject with a higher continuous attention score can demonstrate a higher ability to sustain attention on a single task. A subject can also be assessed for the ability to avoid distraction, and focus on specific tasks.

Impulsivity can be evaluated as performing actions without foresight, reflection, or consideration of consequences. A subject who is impulsive can be viewed unfavorably by a potential employer, as the subject can make rash decisions that can prove disadvantageous for the company. An impulsive subject can also be viewed favorably if the company desires a subject more willing to take risks, think creatively, and act quickly.

Cognitive control can describe a variety of cognitive processes including working memory, learning, cognitive flexibility, and planning. Working memory is the active part of the memory system and can involve both short-term memory and attention. A subject with high working memory can display more focused attention to a task and the ability to multi-task.

Cognitive flexibility can be described as the ability to switch from different tasks and to think about multiple tasks simultaneously and effectively. A subject with cognitive flexibility can balance many tasks efficiently.

Planning demonstrates an ability to organize actions to achieve a goal, and can demonstrate foresight in the execution of tasks.

Memory span is a measure of short-term memory and can be assessed by having a subject recite a series of numbers or words presented previously. A subject with a greater memory span can remember instructions and perform a specific task better than someone with a short memory span.

Sequence learning is the ability to sequence actions and thoughts, without conscious awareness that such sequencing is occurring. Sequence learning can comprise four sequencing problems. First, sequence prediction can attempt to predict elements of a sequence based on the preceding elements. Second, sequence generation can attempt to piece together elements of the sequence one-by-one as the elements naturally occur. Third, sequence recognition can attempt to ascertain whether the sequence is legitimate based on a pre-determined criteria. Finally, sequence decision-making can involve selecting a sequence of actions to achieve a goal, to follow a trajectory, or to maximize or minimize a cost function.

A system of the invention can be used to match an individual or group of individuals to another individual or group of individuals for the purposes of recommending compatibility within the professional or personal realm.

The use of neuroscience-based games, and the analysis of results from these games against one or more employee models, can help a company to optimize its recruiting and candidate sourcing process. In addition to being a useful recruiting tool for companies, the systems and methods disclosed herein can assist individuals in career-planning and talent identification. By using tests that measure a wide array of emotional and cognitive traits, the systems and methods can ascertain the strengths and weaknesses of a subject and apply that information to recommend which field(s) is suitable for the subject.

In some embodiments, the screening system may comprise a data hub that serves as a central communications hub for the screening system. The data hub may be configured to control and direct communications between game portals for employees, game portals for candidates, game portals for subjects, one or more databases, the traits extraction engine, the model analytics engine, and the reporting engine. In some cases, the data hub may be configured to provide one or more neuroscience-based games to one or more users (e.g., employees, candidates, etc.). An application programming interface (API) can be used to connect the games with the data hub and one or more user devices. The games may be software that is executable on a user device. In some embodiments, the games may be web-based, and may comprise a plurality of interactive webpages that can be displayed using a web-browser on a user device. In some embodiments, the games may be a mobile application that is executable on a user device (e.g., on a mobile device).

The games may be designed to measure emotional or cognitive traits of employees and candidates. The games may be designed by game developers, psychologists, recruiters, human resource personnel, managers, supervisors, and/or an entity specializing in designing such games. The games may be provided in a virtual environment configured to be displayed on a user device. In some embodiments, the virtual environment may comprise a plurality of objects that can be manipulated by a user. A user can manipulate the objects through a variety of different actions in the virtual environment. Examples of those actions may include selecting one or more objects, drag-and-drop, translate, rotate, spin, push, pull, zoom-in, zoom-out, etc. Any type of movement action of the objects in the virtual space may be contemplated. The user's manipulation of the objects may be indicative of certain emotional or cognitive traits.

In some embodiments, the game portals may be configured to receive real-time gameplay data of each user (e.g., employee and/or candidate) from a user device as the user plays the game, and to transmit the gameplay data to the data hub. The gameplay data may be indicative of the user's performance in various neuroscience-based tasks. The actions that the users perform in the virtual environment may be encoded in time-stamped signals that are provided to the data hub through the game portals. As previously described, those actions may include manipulating one or more objects in the virtual environment to complete specific tasks as required by the games. The data hub may be configured to collect, through the game portals, gameplay data pertaining to a length of time a user spends playing each game, a number of attempts a user takes to complete each game, a user's accuracy in performing certain actions during a game, etc.

The traits extraction engine may be configured to process and analyze the gameplay data to determine at least the following. For example, the traits extraction engine can determine whether a user has correctly selected, placed, and/or used different objects in the game to complete a required neuroscience-based task. The traits extraction engine can also assess the user's learning, cognitive skills, and ability to learn from previous mistakes.

In some embodiments, the screening system may include a user portal that allows end users to access gameplay data provided to the screening system. Different end users may access different sets of data in different domains. For example, human resource personnel may be able to access game results/performance for a group of employees in a first domain, and recruiters may be able to access game results/performance for a group of candidates in a second domain. In some cases, human resource personnel for a company may not be permitted to access game results/performance for employees of other companies. In some instances, recruiters may be able to access game results/performance for employees of different companies. Any form of rights or data privileges may be contemplated for different end users and entities.

The user portal may be configured to authenticate the end users before allowing the end users to assess the data. In some embodiments, the user portal may generate a log-in window prompting an end user to fill in authentication credentials (e.g., a username and a password) before the end user can access the data. The user portal may be configured to receive and compare the end user's log-in data with pre-existing user data that is stored in an end user database. The end user data may include names, authentication information, user rights/privileges, types of users, etc. User rights/privileges may be defined depending on the user type. Examples of end users may include recruiters, human resource personnel, managers, supervisors, teachers, instructors, administrators, game developers, etc. In some instances, system administrators and game developers may possess certain rights/privileges that allow them to modify the data and neuroscience-based games.

In some embodiments, after the data hub has received the gameplay data, the data hub may store the gameplay data in a gameplay database. The gameplay data can be stored in traditional relational tables. The gameplay data can also be stored in non-relational name-value pairs for data unique to a single game. In some embodiments, the data hub may be configured to de-identify the gameplay data and store the de-identified gameplay data in the gameplay database. The gameplay data may be de-identified by masking the identities of the employees and candidates playing the games, using descriptors such as Employee 1, Employee 2, Candidate 1, Candidate 2, and so forth. Accordingly, a recruiter or human resource personnel can review the gameplay data based solely on the analysis and recommendation provided through the reporting engine, without extrinsic factors and/or external biases affecting their review. In some embodiments, the de-identified gameplay data may be unmasked (unlocked) using a shared key that may be generated by certain stakeholders (e.g., administrators, managers, supervisors, etc.).

The model analytics engine may be configured to compare the candidates' traits with those in the employee model, and to provide the results of the comparison to the reporting engine. The reporting engine may be configured to generate an overview of each candidate's suitability for a specific job position, based on assessments of the candidates' traits against the employee model. The reporting engine can generate visual indicators identifying certain traits and fit scores for each candidate based on their performance in the neuroscience-based games. In some embodiments, the reporting engine may be configured to generate one or more windows containing visual indicators that allow a recruiter or a human resource personnel to identify, at a glance, the likelihood of a candidate succeeding in a specific job position. Based on the indicators, the recruiter or human resource personnel can then reach out to the top candidates.

In some embodiments, the reporting engine can use either identified or de-identified gameplay data to provide performance comparisons of the candidates. For example, the performance of a candidate may be compared against the performance of one or more other candidates. A recruiter or human resource personnel can use those comparisons to determine how each candidate's performance compares with other candidates.

The reporting engine may be configured to generate a plurality of graphical user interfaces (GUIs) for displaying data on a user device. Examples of such GUIs are illustrated in FIGS. 3 through 31. As previously described, a user device may be a computing device that can display one or more webpages. A user device can include, among other things, desktop computers, laptops or notebook computers, mobile devices (e.g., smart phones, cell phones, personal digital assistants (PDAs), and tablets), and wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in a software, a software application, a web browser, etc. Links may be generated through an application programming interface (API) which is a set of routines, protocols, and tools for building software applications.

Figure 3:
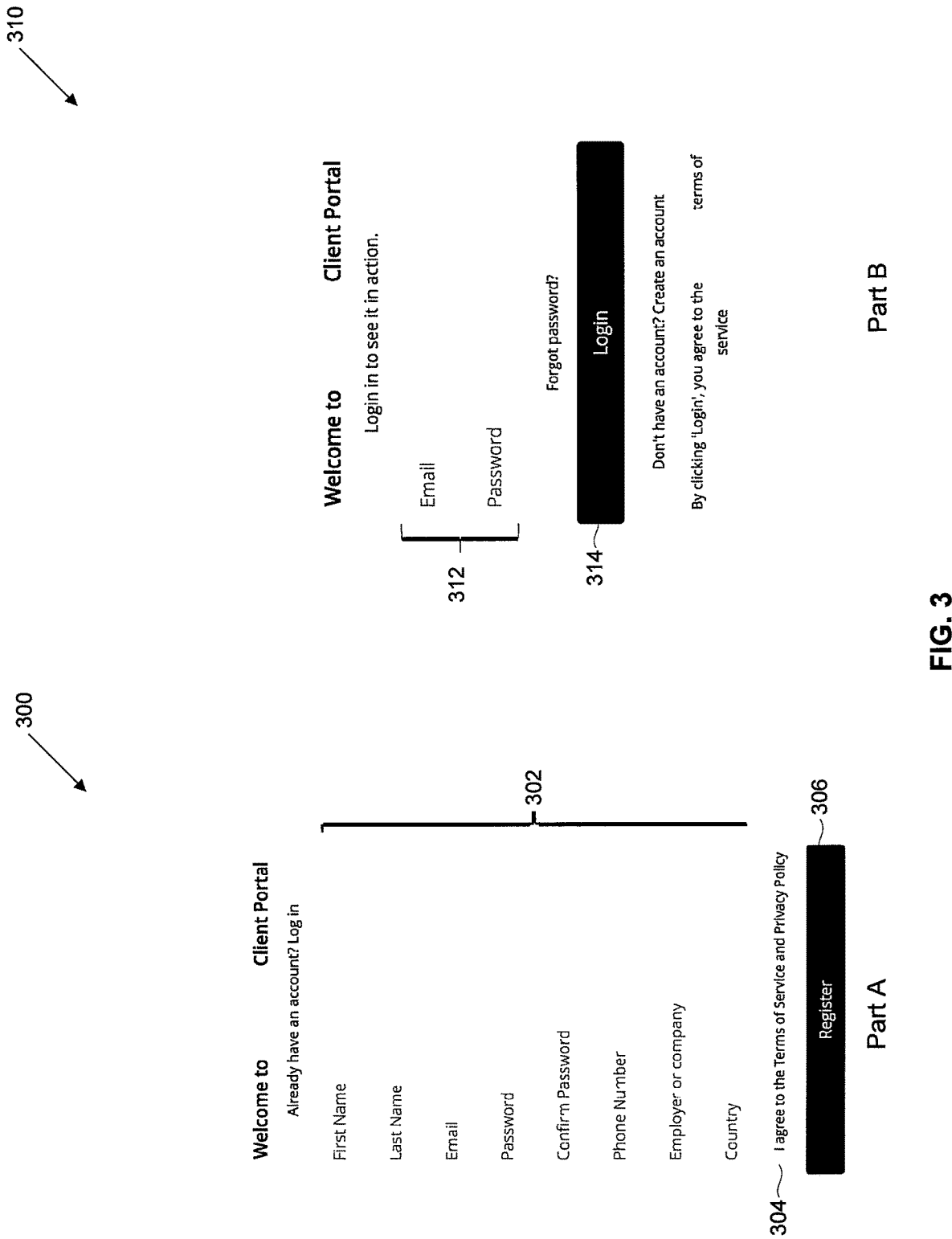
FIG. 3 illustrates an exemplary sign-up window and a log-in window, in accordance with some embodiments.

FIG. 3 illustrates an exemplary sign-up window and a log-in window, in accordance with some embodiments. Part A of FIG. 3 illustrates a sign-up window 300, and part B of FIG. 3 illustrates a log-in window 310.

A user may be required to sign up for an account or log in to an account administered by the screening system. A user may be an end user, such as a recruiter or human resource personnel of a company. A user may sign up an account by filling in the relevant information (e.g., first name, last name, email, password, confirm password, phone number, employer or company, and country) 302, agree to the Terms of Service and Privacy Policy 304, and select the Register button 306. After the user has signed up for an account, window 310 may be generated. A user may log in to the account by entering the user's email address and password associated with the account 312. In some embodiments, after the user selects the Login button 314, window 400 of FIG. 4 may be displayed. In some embodiments, window 400 may be the landing page (or home page) that a user sees when the user logs in to his/her account. However, the invention is not limited thereto. Any type of landing page (or home page) may be contemplated.

Figure 4:
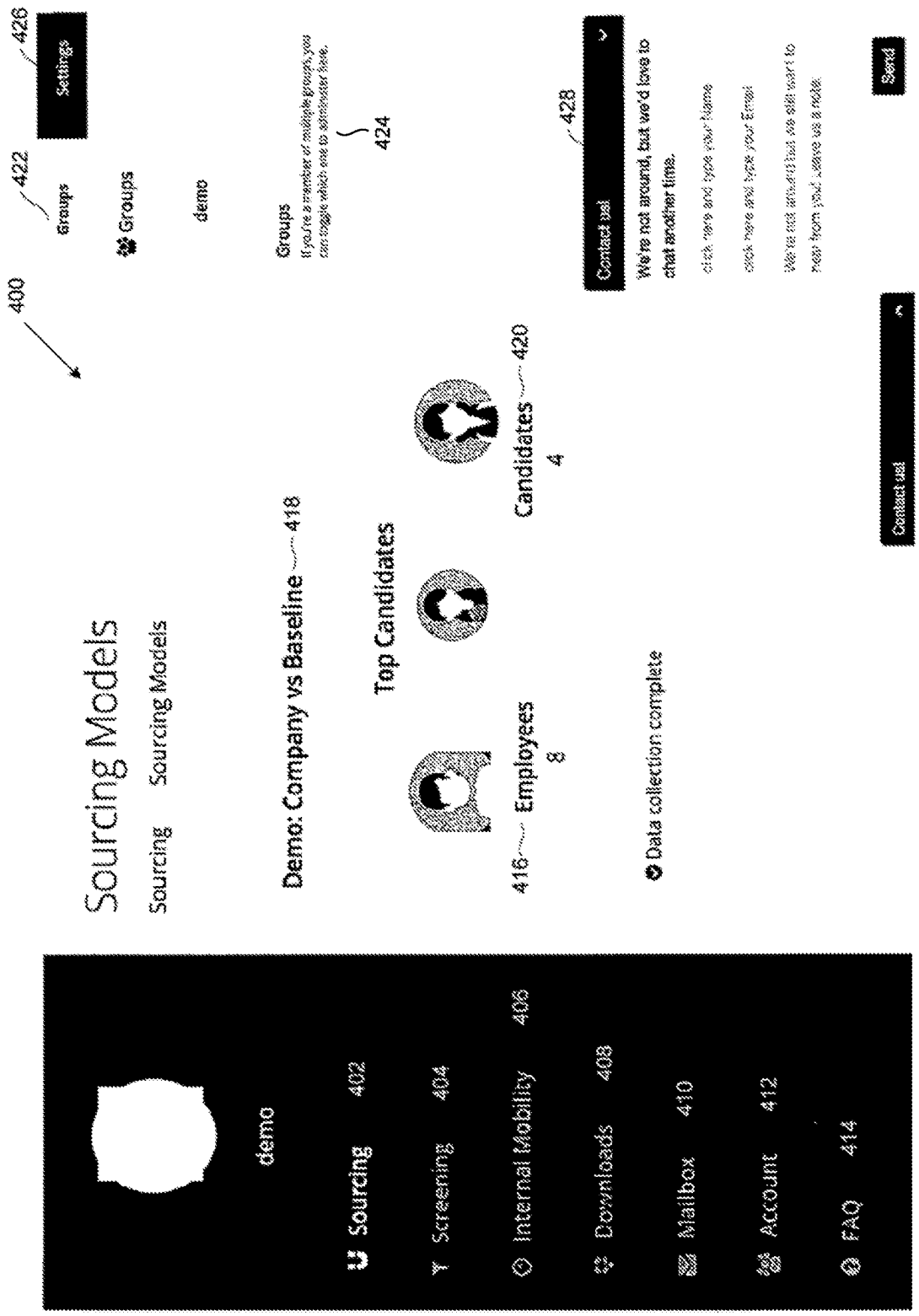
FIG. 4 illustrates an exemplary sourcing model window, in accordance with some embodiments.

Referring to FIG. 4, window 400 may comprise a plurality of links to different applications/functions provided by the screening system. For example, window 400 may include a link 402 to sourcing models, a link 404 to screening models, a link 406 to internal mobility models, a link 408 to downloads, a link 410 to a mailbox, a link 412 to a user's account settings, and a link 414 to a frequently asked questions (FAQ) section.

FIG. 4 illustrates an exemplary sourcing model window, in accordance with some embodiments. A user may access one or more sourcing models using the sourcing model window. A user may use the sourcing models to identify candidates who are most similar to a target group of individuals (i.e., candidates who match closely to an employee model). Accordingly, sourcing models can be used by companies and recruiters to 'source' for talent. A user may use the sourcing models to identify candidates who meet a cut-off threshold, and present those candidates to a company for its hiring needs.

A sourcing model may use one or more employee models. As previously described, an employee model may comprise characteristics that an ideal employee is likely to possess for a specific job position at the company. The employee model may be representative of a target group of top employees of the company. The employee model may be contrasted against a baseline group. The baseline group may be selected from a database comprising of employees from other fields, who may be similar to the target group of employees taking the neuroscience-based tests in terms of demographic factors such as gender, age, ethnicity, educational background, but who do not work in in the same field as the target group of employees. Candidates may be compared to the employee model to determine their match/compatibility for a specific job position in the company.

As shown in FIG. 4, a target group 416 of top employees of a company may include eight employees, and an employee model of the target group may be contrasted against a baseline group 418. A number of candidates (e.g., four) 420 may be compared against the employee model to determine how well the candidates fit or match the employee model.

As shown on the right of window 400, a groups function 422 may be active. A group may be associated with a company or a group of companies, a career field, etc. A user may be associated with different groups. For example, a user may be a third party recruiter who has been contracted by different companies to identify candidates to fill different positions. Alternatively, a user may be human resource personnel who are associated with different groups within a company. Optionally, a user may be a recruiter who looks for top talent in a plurality of interdisciplinary fields. Accordingly, if a user is a member of multiple groups, the user can toggle 424 between the different groups to access different models/data.

A user may toggle between the groups function 422 and a settings function 426. The settings function will be described in more detail later in the specification with reference to FIGS. 26, 27, and 28.

In some instances, a chat window 428 may be provided in window 400. A user may communicate in real-time with a help representative using the chat window. The help representative may be associated with an entity that provides the screening system. Alternatively, a user may leave a message for the help representative in the chat window.

Figure 5:
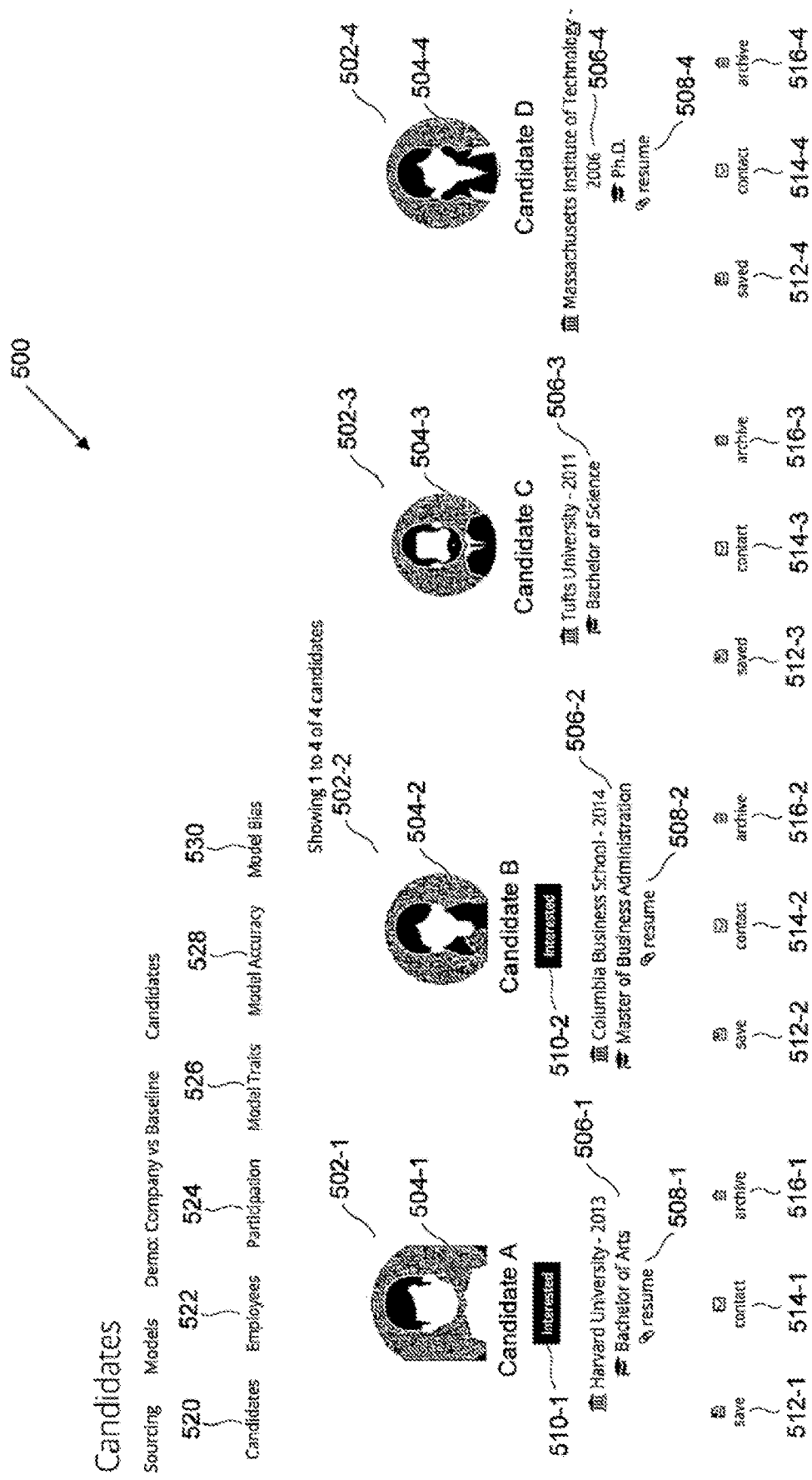
FIG. 5 illustrates an exemplary candidates window, in accordance with some embodiments.

When a user selects Candidates 420 in window 400, window 500 of FIG. 5 may be generated. Window 500 illustrates an exemplary candidates window, in accordance with some embodiments. A general profile 502 of each candidate may be displayed in the candidates window. For example, the general profiles 502-1, 502-2, 502-3, and 502-4 of respective Candidates A, B, C, and D may be displayed in window 500. Each general profile may include a picture 504 of the candidate (e.g., 504-1, 504-2, 504-3, and 504-4), educational background 506 of the candidate (e.g., 506-1, 506-2, 506-3, and 506-4), links to the candidate's resume (e.g., 508-1, 508-2, and 508-4), and indicate whether the candidate has expressed interest (e.g., 510-1 and 510-2) in a specific job position posted by a company. A user (e.g., a recruiter) may save 512 a candidate's profile, contact 514 a candidate, or archive 516 a candidate's profile, by selecting one or more buttons in each profile. As shown in window 500, Candidates A and B have expressed interest in a specific job position (510-1 and 510-2), while Candidates C and D have yet to express interest in the job position. Candidates A, B, and D have uploaded their resumes (508-1, 508-2, and 508-4), while Candidate C has yet to upload his resume. The profiles of Candidates C and D have been saved by a user (512-3 and 513-4), while the profiles of Candidates A and B have yet to be saved.

In the example of FIG. 4, candidates link 520 is active since window 400 corresponds to a candidates window. Window 400 may further comprise an employees link 522, a participation link 524, a model traits link 526, a model accuracy link 528, and a model bias link 530. Each of the links will be described in detail elsewhere in the specification.

Figure 6:
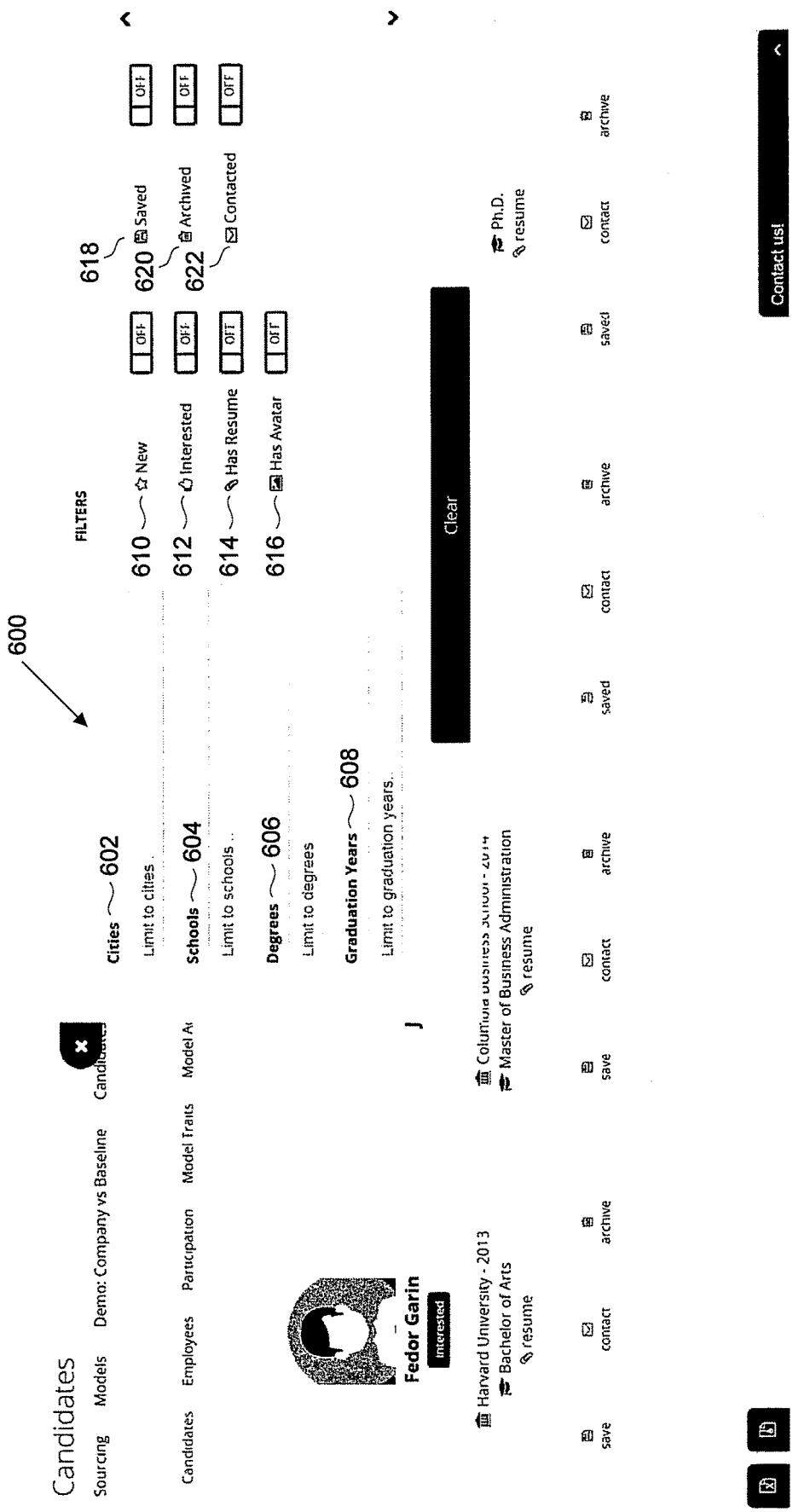
FIG. 6 illustrates an exemplary filtering window within the candidates window of FIG. 5, in accordance with some embodiments.

In some embodiments, a user may filter candidates based on a set of criteria. FIG. 6 illustrates an exemplary filtering window within the candidates window of FIG. 5, in accordance with some embodiments. A user can use filtering window 600 to filter candidates based on geographical location (e.g., cities) 602, schools that the candidates attended 604, degrees obtained by the candidate 606, and/or number of years since the candidates graduated 608. The filters may further include whether the candidate has been newly added to the system 610, whether the candidate is interested in a job position 612, whether the candidate has uploaded a resume 614, whether the candidate is using an avatar (masked identity) in the system 616, whether the profile has been saved 618 and/or archived 620 by a recruiter, and whether the candidate has been contacted by a recruiter 622. It should be noted that the filters are not limited to the above, and may include additional filters that can help a user to filter a list of candidates.

Figure 7:
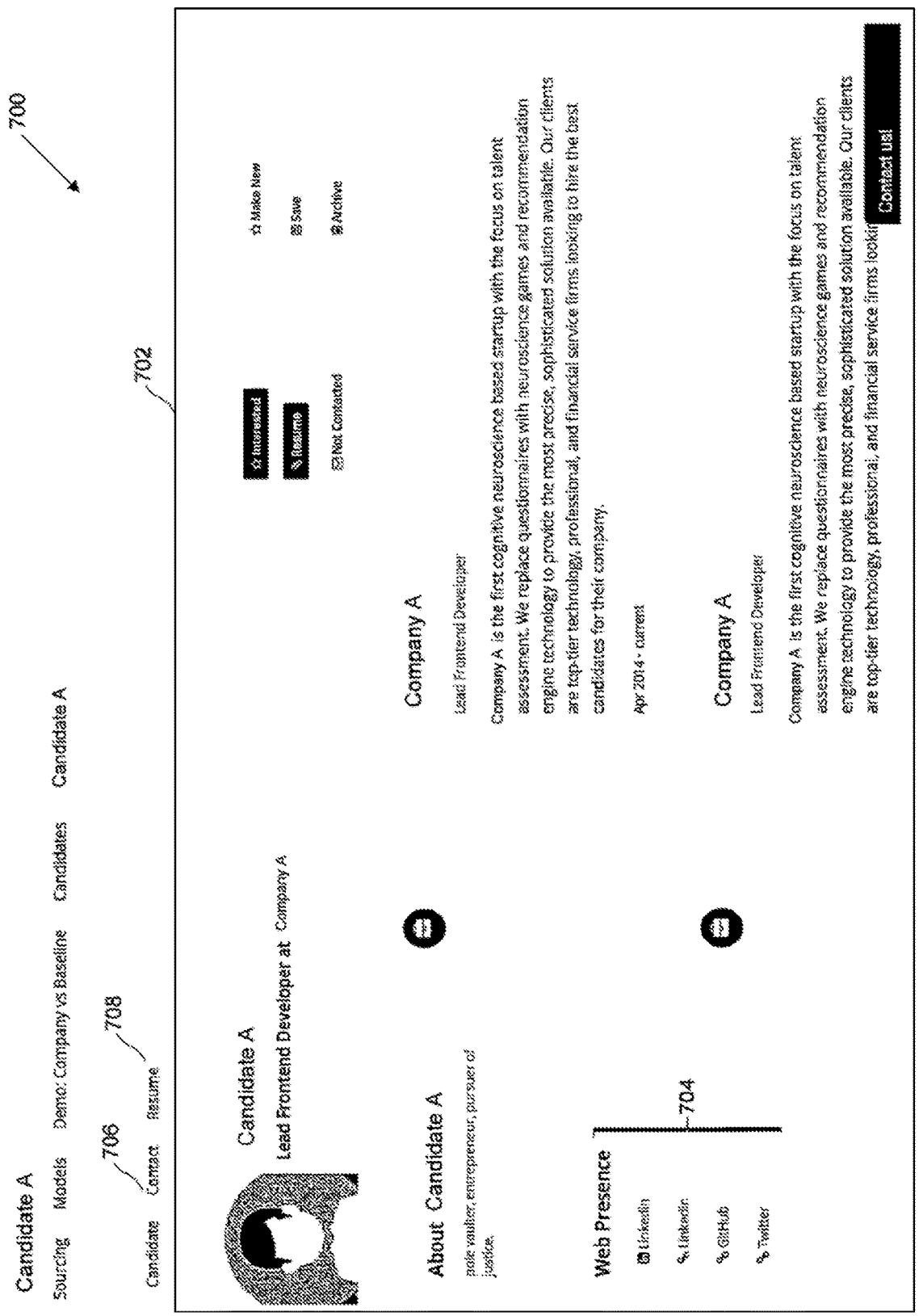
FIGS. 7 and 8 illustrate an exemplary candidate profile window, in accordance with some embodiments.
Figure 8:
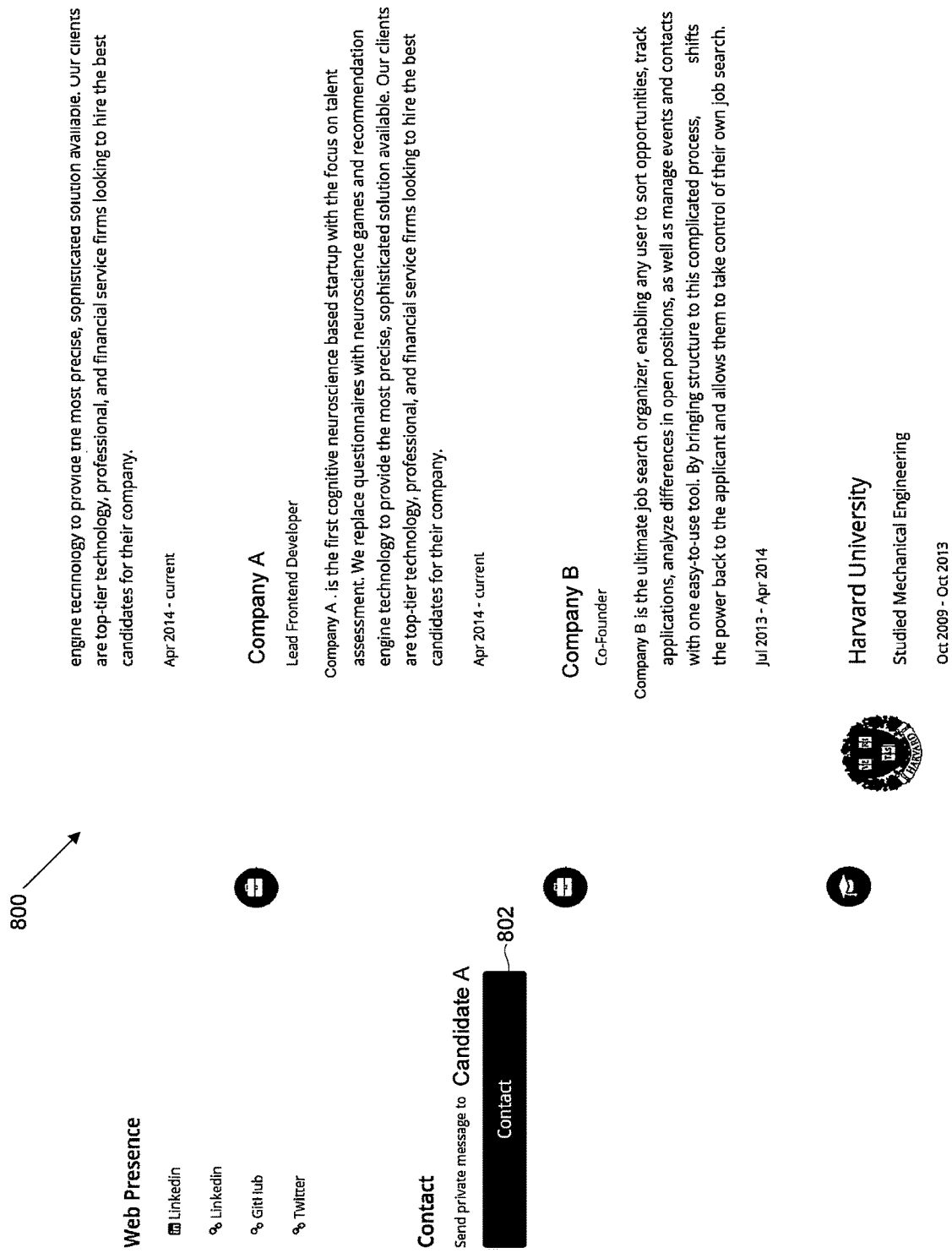

Referring back to FIG. 5, when a user clicks on the general profile 502-1 of Candidate A, window 700 of FIG. 7 may be generated. Window 700 may correspond to a specific profile of Candidate A 702. When a user scrolls down window 700, window 800 of FIG. 8 may be generated. As shown in FIGS. 7 and 8, the work experience and educational experience of Candidate A may be listed in detail in chronological order. As previously mentioned, Candidate A may have expressed interest in a specific job position and uploaded her resume. In this example, Candidate A has yet to be contacted by the user, and her profile has yet to be saved or archived by the user. Window 700 may further include links to Candidate A's web presence 704 (e.g., through LinkedIn™, Github™, Twitter™, etc.). As shown in FIG. 8, a link 802 may be provided for the user (who may be a recruiter) to contact Candidate A.

When a user clicks on a Contact button 706 in window 700, window 900 of FIG. 9 may be generated. Window 900 may display the correspondence 902 between the user and Candidate A regarding a specific job position. When a user clicks on a Resume button 708 in window 700, a copy of Candidate A's resume may be displayed in the window.

Figure 10:
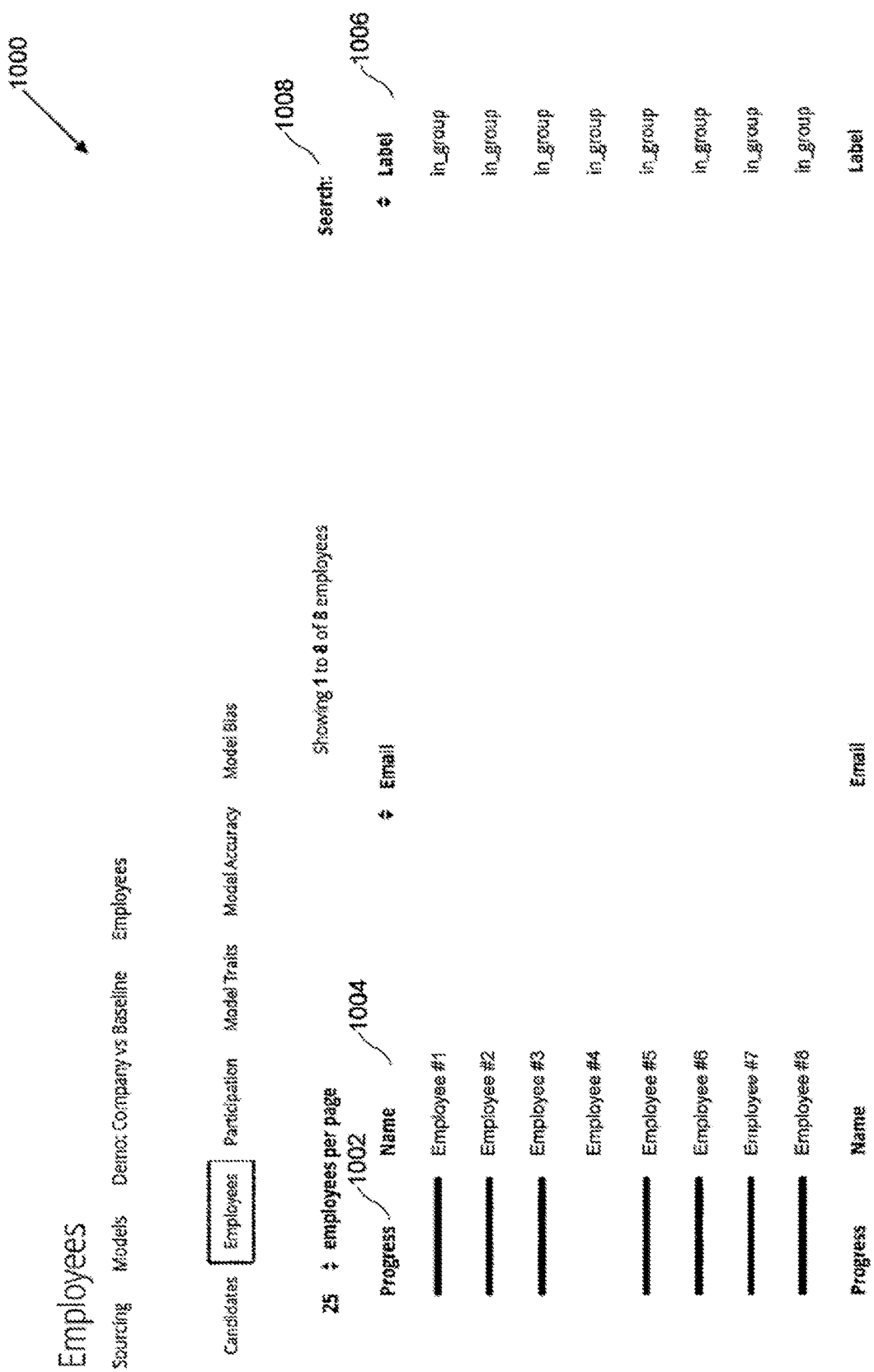
FIG. 10 illustrates an exemplary employees dashboard window, in accordance with some embodiments.

Referring back to FIG. 4, when a user selects Employees 416 in window 400, window 1000 of FIG. 10 may be generated. Alternatively, a user may access window 1000 by clicking on the Employees link 522 in window 500 of FIG. 5. FIG. 10 illustrates an exemplary employees dashboard window, in accordance with some embodiments. Window 1000 may illustrate the progress 1002 of each employee 1004 in completing the neuroscience-based games, and whether each employee is 'in-group' or 'out-of-group' 1006 based on the employee's gameplay data. In the example of FIG. 10, all of the employees may have completed the games except for Employee #4, as indicated by the progress bar in 1002. Additionally, all of the employees may be determined to be in-group 1006 based on their gameplay data. In some embodiments, a user may search whether a user is in-group or out-of-group by entering a search input 1008.

Figure 11:
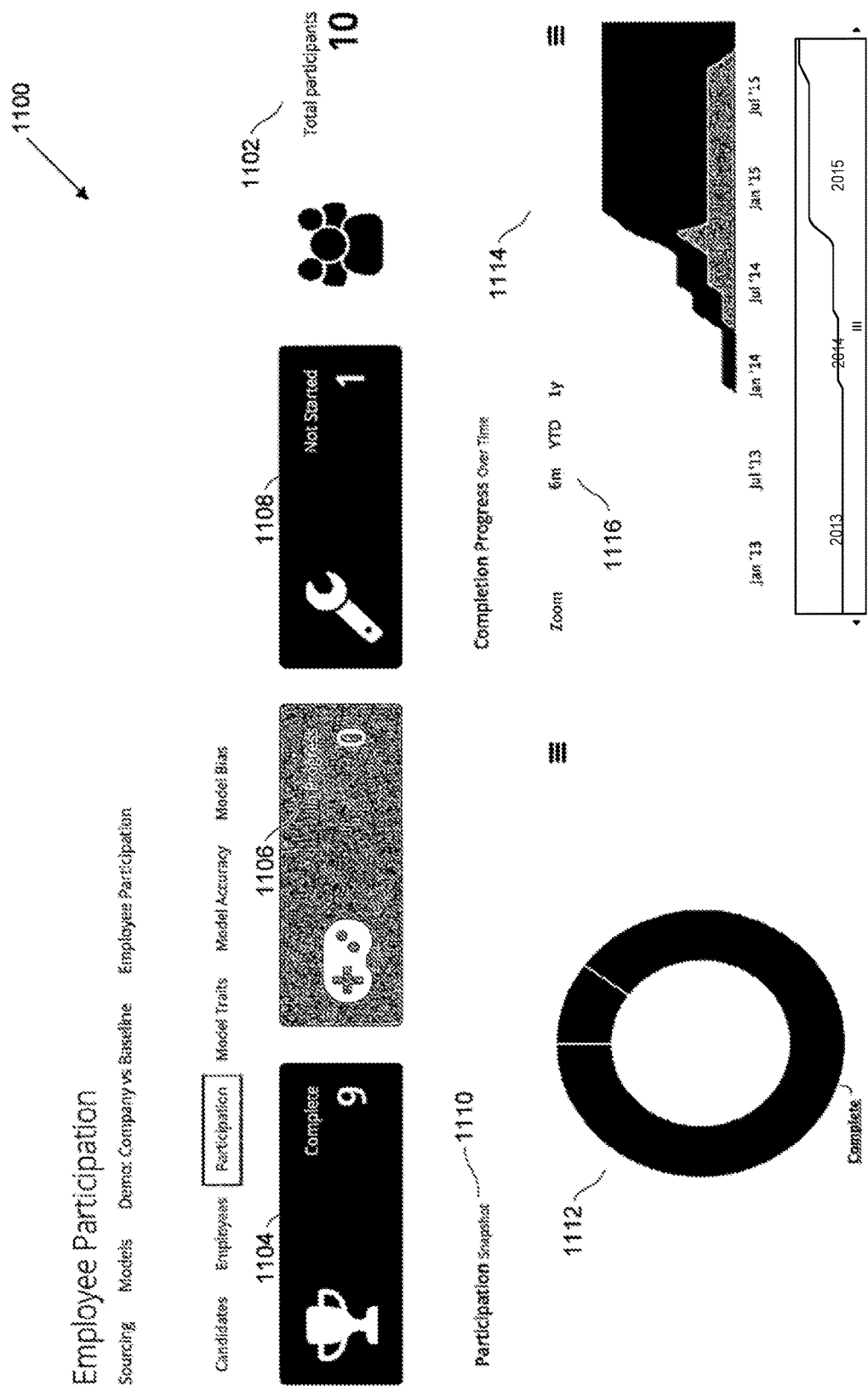
FIG. 11 illustrates an exemplary employees participation window, in accordance with some embodiments.

When a user selects the Participation link 524 in window 500, window 1100 of FIG. 11 may be generated. As shown in FIG. 11, the neuroscience-based games may be provided to ten employees (total participants 1102). Nine employees have completed the games 1104, none are in progress 1106, and one employee has not started playing the games 1108. A participation snapshot 1110 may be shown on the left portion of window 1100. The participation snapshot may include a piechart 1112 visual representation of the employees' participation rate in the games. The right portion of window 1100 may display a graph 1114 of the employees' game completion progress over different time periods 1116 (e.g., 1 month, 3 months, 6 months, year-to-date, 1 year, etc.).

When a user moves a cursor over the piechart 1112 visual representation of the participation rate, different information may be displayed. For example, Part A of FIG. 12 shows that one employee has not started playing the games 1202, and part B of FIG. 12 shows that nine employees have completed the games 1204. Charts of the employees' gameplay data may be downloaded in different formats (e.g., PNG, JPEG, PDF, SVG vector image, CSV, or XLS) 1206, as shown in part C of FIG. 12.

A user may manipulate the graph 1114 in window 1100 to view the employees' game completion progress at different points in time. For example, as shown in part A of FIG. 13, none of the employees have completed the games and there are no games in progress 1302 at a first time instance 1304. Part B of FIG. 13 shows that two employees have completed the games and two employees are presently in progress 1306 at a second time instance 1308. Part C of FIG. 13 shows that six employees have completed the games and two employees are presently in progress 1310 at a third time instance 1312. Part D of FIG. 13 shows that seven employees have completed the games and two employees are presently in progress 1314 at a fourth time instance 1316.

Figure 14:
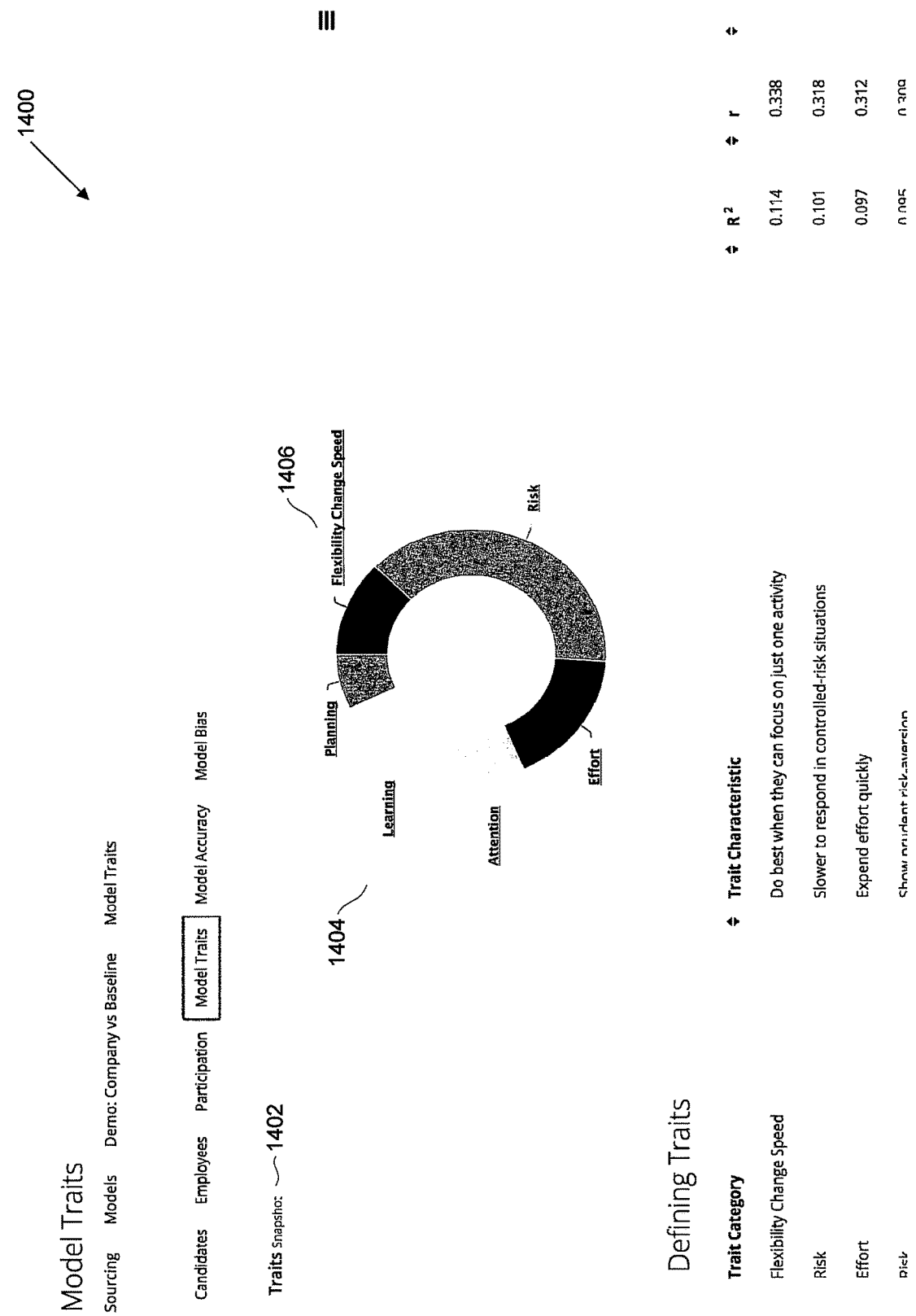
FIGS. 14 and 15 illustrate an exemplary model traits window, in accordance with some embodiments.

When a user selects the Model Traits link 526 in window 500 of FIG. 5, window 1400 of FIG. 14 may be generated.

Window 1400 may include a snapshot of the traits 1402 of the employees. The traits snapshot may include a piechart 1404 visual representation of different trait categories 1406. As previously described, the traits may be extracted from the employees' gameplay data (neuroscience behavioral data) using, for example the traits extraction engine in the screening system. As shown in the traits snapshot, the trait categories may include planning, learning, attention, effort, risk, and flexibility change speed. When a user scrolls down window 1400, window 1500 of FIG. 15 may be generated.

A description of each trait category and associated trait characteristic(s) may be provided in a traits table 1502 located below the traits snapshot 1402. Each trait category 1406 may comprise one or more trait characteristics 1408. For example, a risk category 1410 may comprise a plurality of trait characteristics such as a subject's response speed in controlled-risk situations, display of prudent risk-aversion, and a subject's ability to learn well under high-risk conditions and under moderate-risk conditions. A learning category 1412 may comprise a plurality of trait characteristics such as a subject's ability to recover from learning setbacks easily, and whether the subject is faster at procedural learning. An effort category 1414 may also comprise a plurality of trait characteristics such as a subject's ability to expend effort quickly, and ability to work hard to achieve goals.

Different colors and shading may be used to differentiate sections in piechart 1404 from one another. In some embodiments, different color schemes may be used for each trait category. Any color scheme or any other visual differentiation scheme (such as shapes, font sizes, shading, etc.) may be contemplated.

The neuroscience-based tests (games) described herein can be assessed for their precision of measurements of emotional and cognitive traits. The precision of the tests can be important for determining whether the neuroscience-based tests are accurate predictors of those traits. To ascertain the precision of the neuroscience-based tests, reliability assessments can be performed. One output that can be measured for test reliability is the Pearson's correlation coefficient (r). The Pearson's correlation coefficient can describe the linear relationship between two results and is between −1 and +1. The correlation coefficient for a sample, r, can be calculated using the following formula:

$$r = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}},$$

where n is the sample size; i=1, 2, . . . , n; $\overline{X}$ and $\overline{Y}$ are the variables, and X and Y are the means for the variables. The square of the Pearson's correlation coefficient is known as the coefficient of determination and can be used to explain the fraction of variance in Y as a function of X in a simple linear regression. The Pearson's correlation coefficient can also be used to describe effect size, which can be defined as the magnitude of the relationship between two groups. When the Pearson's correlation coefficient is used as a measure for effect size, the square of the result can estimate the amount of the variance within an experiment that is explained by the experimental model.

Figure 15:
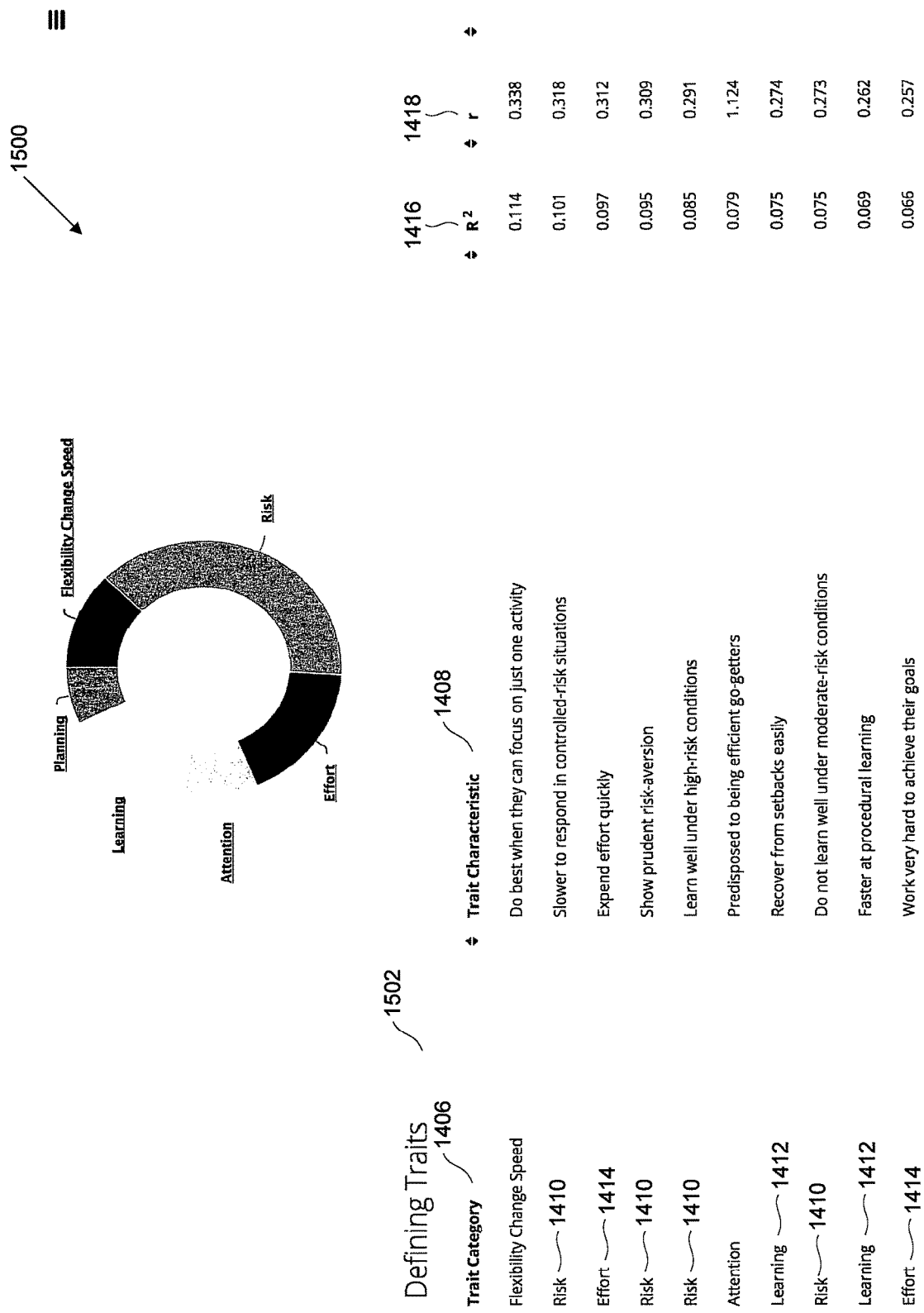

As shown in window 1500 of FIG. 15, each trait category and corresponding trait characteristic may have an r value 1416 and an $R^2$ value 1418. The r value for each trait characteristic may be indicative of the correlation between the respective trait characteristic and a predictive equation in the employee model. The $R^2$ value for each trait characteristic may be indicative of the variance in the employee model as denoted by the respective trait characteristic.

The $R^2$ values for the trait characteristic(s) in each trait category may be summed up and used to generate the piechart in the traits snapshot. A user can view the $R^2$ values for each trait category by moving a cursor over each trait category on the piechart. For example, when a user moves the cursor over the 'flexibility change speed' category on the piechart, a pop-up window 1602 may be generated showing the total $R^2$ value for that category to be 0.114 (as shown in part A of FIG. 16). Similarly, when a user moves the cursor over the risk category on the piechart, a pop-up window 1604 may be generated showing the total $R^2$ value for that category to be 0.356 (as shown in part B of FIG. 16). The total $R^2$ value for the risk category may be obtained by summing the $R^2$ values for the trait characteristics 'slower to respond in controlled-risk situations' (0.101), 'show prudent risk-aversion' (0.095), 'learn well under high-risk conditions') (0.085), and 'do not learn well under moderate-risk conditions' (0.075).

Reliability can be an indicator of the extent to which measurements are consistent over time and free from random error. Reliability can measure whether the test results are stable and internally consistent. The test-retest method is one measure that can also be used to test for reliability. A test-retest reliability test can measure a change in a sample's results when a subject is administered the same test at two different times. If the results from the test given at two different times are similar, then the test can be considered reliable. The relationship between the two results can be described using the Pearson's correlation coefficient; the higher the value of the correlation coefficient, the higher the reliability of the test.

The value of the correlation coefficient for test-retest reliability can be, for example, about −1.0, about −0.95, about −0.9, about −0.85, about −0.8, about −0.75, about −0.7, about −0.65, about −0.6, about −0.55, about −0.5, about −0.45, about −0.4, about −0.35, about −0.3, about −0.25, about −0.2, about −0.15, about −0.1, about −0.05, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

Another test that can be used for measuring reliability of a test is the split-half reliability test. The split-half reliability test divides a test into two portions, provided that the two portions contain similar subject matter, and the test is administered to a subject. Then, scores of each half of the test from the sample are compared to each other. The correlation, or degree of similarity, between the scores from the two halves of the test can be described using the Pearson's correlation coefficient, wherein if the correlation is high, the test is reliable.

The value of the correlation coefficient for split-half reliability can be, for example, about −1.0, about −0.95, about −0.9, about −0.85, about −0.8, about −0.75, about −0.7, about −0.65, about −0.6, about −0.55, about −0.5, about −0.45, about −0.4, about −0.35, about −0.3, about −0.25, about −0.2, about −0.15, about −0.1, about −0.05, about 0.05, about 0.1, about 0.15, about 0.2, about 0.25, about 0.3, about 0.35, about 0.4, about 0.45, about 0.5, about 0.55, about 0.6, about 0.65, about 0.7, about 0.75, about 0.8, about 0.85, about 0.9, about 0.95, or about 1.0.

Validity is the extent to which a test measures what is intended. For a test to be valid, a test can demonstrate that the results of the test are contextually supported. Specifically, evidence regarding test validity can be presented via test content, response processes, internal structure, relation to other variables, and the consequences of testing.

A Hotelling's T-squared test is a multivariate test that can be employed by the screening system to determine the differences in the means of the results of different populations of subjects using the system. The test statistic ($T^2$) for the T-squared test is calculated using the formula below:

$$T^2 = (\bar{x}_1 - \bar{x}_2)' \left\{ S_p \left( \frac{1}{n_1} + \frac{1}{n_2} \right) \right\}^{-1} (\bar{x}_1 - \bar{x}_2),$$

where $\bar{x}$ is the sample mean, $S_p$ is the pooled variance-covariance of the samples, and n is the sample size.

To compute the F-statistic, the following formula is used:

$$F = \frac{n_1 + n_2 - p - 1}{p(n_1 + n_2 - 2)} T^2 \sim F_{p, n_1 + n_2 - p - 1},$$

where p is the number of variables being analyzed, and the F-statistic is F-distributed with p and $n_1 + n_2 - p$ degrees of freedom. An F-table can be used to determine the significance of the result at a specified α, or significance, level. If the observed F-statistic is larger than the F-statistic found in the table at the correct degrees of freedom, then the test is significant at the defined α level. The result can be significant at a p-value of less than 0.05 if, for example, the α level was defined as 0.05.

Analysis of variance (ANOVA) is a statistical test that can be used by the screening system to determine a statistically significant difference between the means of two or more groups of data. The F-statistic for ANOVA can be calculated as follows:

$$F = \frac{\frac{n_1(\bar{x}_1 - \bar{x})^2 + n_2(\bar{x}_2 - \bar{x})^2 + \ldots + n_I(\bar{x}_I - \bar{x})^2}{I - 1}}{\frac{(n_1 - 1)s_1^2 + (n_2 - 1)s_2^2 + \ldots + (n_I - 1)s_I^2}{N - I}}$$

where $\bar{x}$ is the sample mean, n is the sample size, s is the standard deviation of the sample, I is the total number of groups, and N is the total sample size. An F-table is then used to determine the significance of the result at a specified α level. If the observed F-statistic is larger than the F-statistic found in the table at the specified degrees of freedom, then the test is significant at the defined α level. The result can be significant at a p-value of less than 0.05 if, for example, the α level was defined as 0.05.

The α level for the Hotelling's T-squared test or ANOVA can be set at, for example, about 0.5, about 0.45, about 0.4, about 0.35, about 0.3, about 0.25, about 0.2, about 0.15, about 0.1, about 0.05, about 0.04, about 0.03, about 0.02, about 0.01, about 0.009, about 0.008, about 0.007, about 0.006, about 0.005, about 0.004, about 0.003, about 0.002, or about 0.001.

Figure 17A:
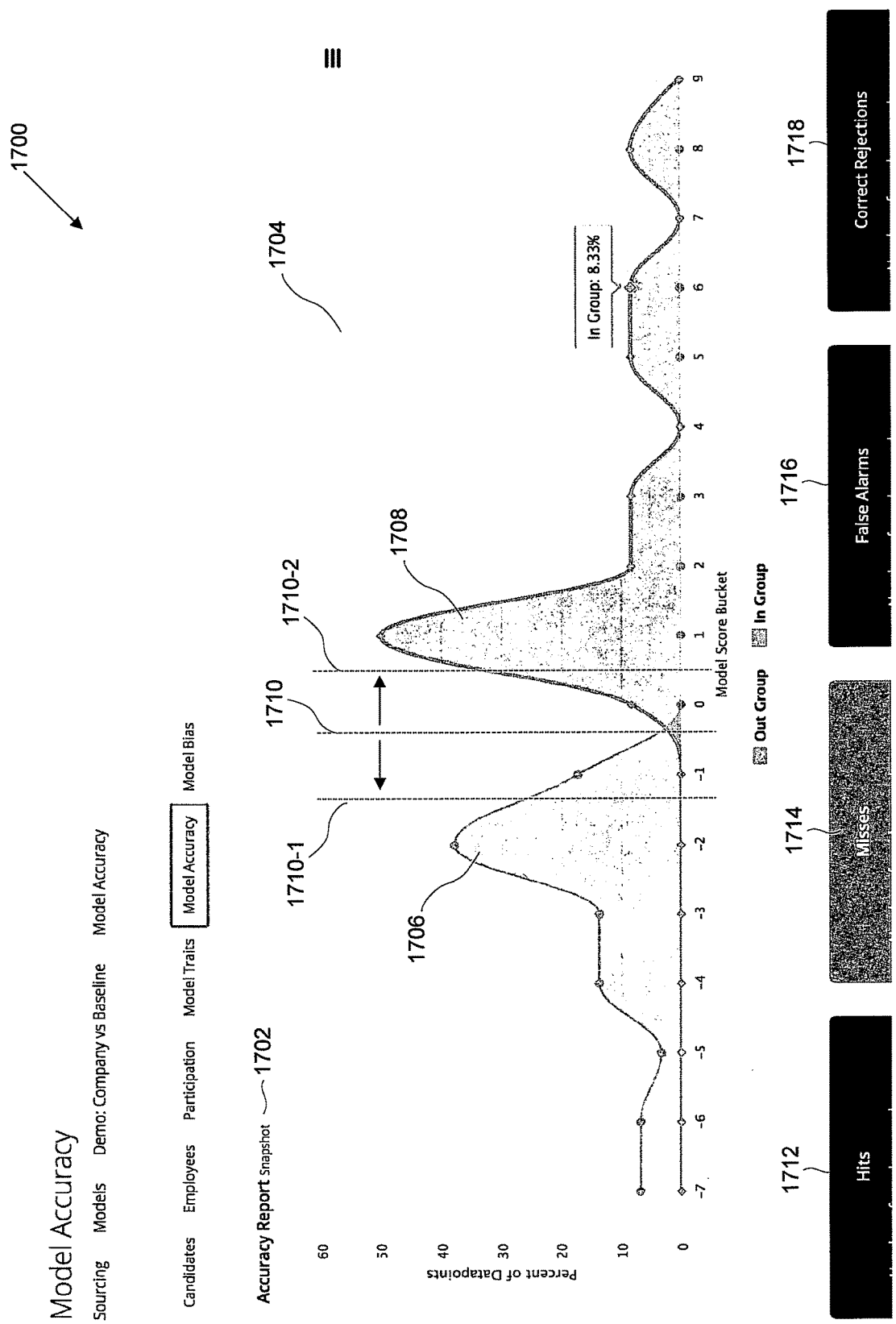
FIG. 17A illustrates an exemplary model accuracy window, in accordance with some embodiments.

Referring back to window 500 of FIG. 5, when a user selects the Model Accuracy link 528, window 1700 of FIG. 17A may be generated. Window 1700 may include an accuracy report snapshot 1702 of the employee model. The accuracy report snapshot may include a graph 1704 showing the proportion of employees who are in-group or out-ofgroup. The graph may comprise a first density plot 1706 corresponding to out-of-group employees, and a second density plot 1708 corresponding to in-group employees. A user may draw a decision boundary 1710 in a region where the curves for the first and second density plots overlap. For example, employees who fall to the left of the decision boundary may be classified as out-of-group, and employees who fall to the right of the decision boundary may be classified as in-group. Employees who fall to the far left of the decision boundary may have a higher probability of being correctly classified as out-of-group, versus employees who fall slightly to the left of the decision boundary. Conversely, employees who fall to the far right of the decision boundary have a higher probability of being correctly classified as in-group, versus employees who fall slightly to the right of the decision boundary. Employees who fall within the overlapping region may be classified as either in-group or out-of-group, and in some cases, may represent a small minority of the total number of employees taking the neuroscience-based tests.

Figure 17B:
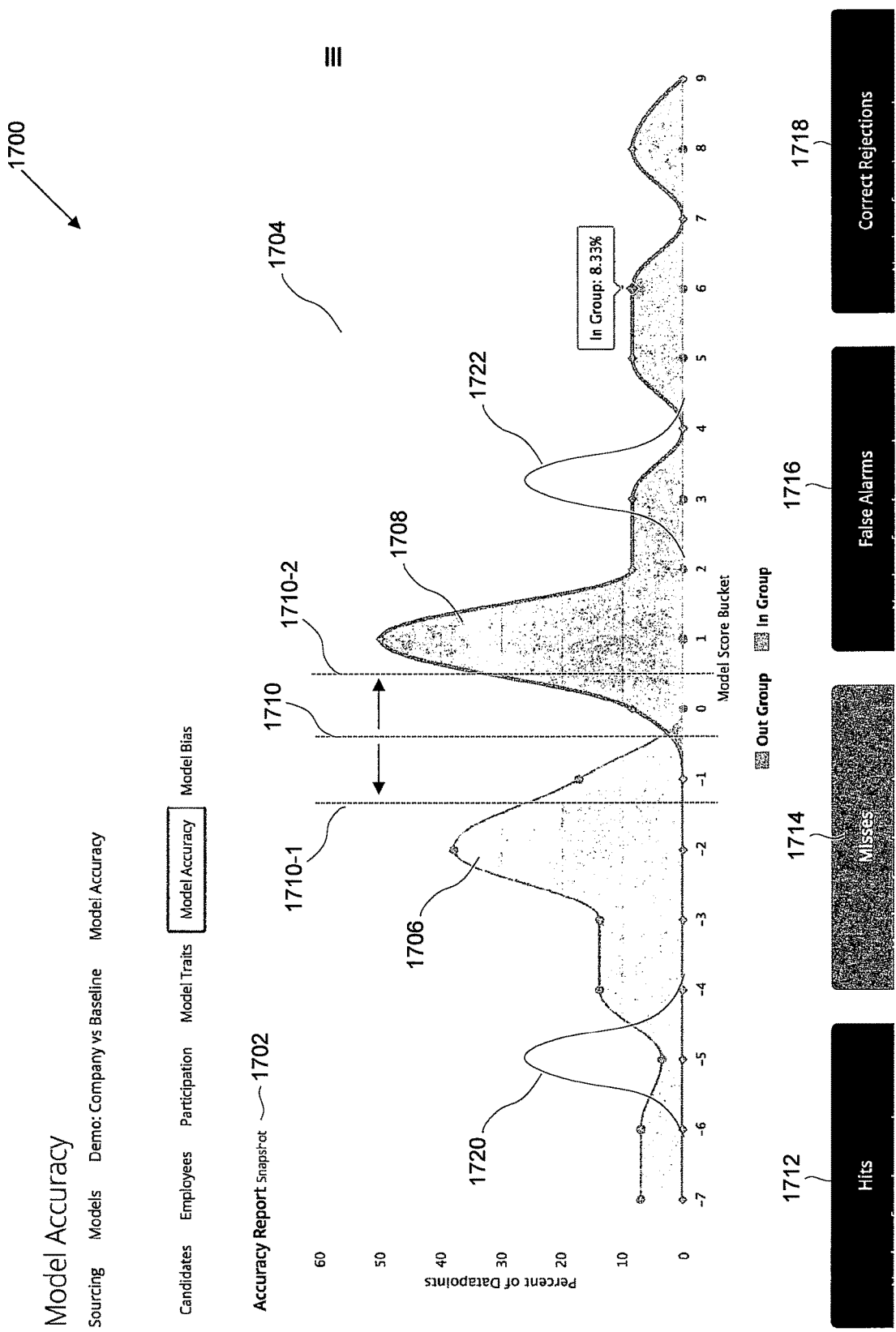
FIG. 17B illustrates the results of comparing the traits of candidates to the employee model of FIG. 17A, in accordance with some embodiments.

A user can use the decision boundary 1710 as a threshold for evaluating the gameplay performance of the candidates. For example, FIG. 17B illustrates the results of comparing the traits of a group of candidates to the employee model of FIG. 17A, in accordance with some embodiments. As shown in window 1750 of FIG. 17B, the comparison results may be depicted in one or more density plots. For example, the comparison results may comprise a third density plot 1720 corresponding to candidates who matches more closely to the in-group employees. Additionally, the comparison results may also include a fourth density plot 1722 corresponding to candidates who matches more closely to the out-of-group employees. A user may determine that candidates who fall to the right of the decision boundary are likely to succeed at a specific job position because they match the in-group employees more closely. Likewise, the user may determine that candidates who fall to the left of the decision boundary are less likely to succeed at a specific job position because they match the out-of-group employees more closely.

In some embodiments, the decision boundary need not lie in a region where the curves for the first and second density plots overlap. A user may adjust the location of the decision boundary depending on whether the user wishes to be more inclusive (i.e., include a larger pool of candidates) or more stringent (i.e., narrow the pool of candidates). For example, when the user moves the decision boundary to the left of the overlapping region into the out-of-group density plots (1710-1), more candidates may be able to satisfy the decision boundary threshold 1710-1. Conversely, when the moves the decision boundary to the right of the overlapping region into the in-group density plots (1710-2), fewer candidates may be able to satisfy the decision boundary threshold 1710-2. Accordingly, a user can adjust the decision boundary depending on the screening and hiring needs of a company (for example, whether the company is willing to accept a larger pool of candidates, or requires only a select number of candidates).

A user can move a cursor over the density plots in window 1700 to view the percentages of employees who are in-group or out-of-group relative to the decision boundary. For example, part A of FIG. 18 shows that 37.9% of the employees may be out-of-group at a selected point 1802 on the first density plot. Part B of FIG. 18 shows that 8.33% of the employees may be in-group at a selected point 1804 on the second density plot.

Referring back to window 1700, the model accuracy report may include hits 1712, misses 1714, false alarms 1716, and correct rejections 1718. Details of the above parameters are illustrated in window 1900 of FIG. 19. Hits 1712 may correspond to employees who are labeled as in-group, and who are predicted and correctly classified as in-group by the model analytics engine. Misses 1714 may correspond to employees who are labeled as out-of-group, incorrectly classified as out-of-group by the model analytics engine, but who should be classified as in-group. False alarms 1716 may correspond to employees who are labeled as in-group, and correctly classified as out-of-group by the model analytics engine. Correction rejections 1718 may correspond to employees who are labeled as out-of-group, and who are predicted and correctly classified as out-of-group by the model analytics engine.

Figure 19:
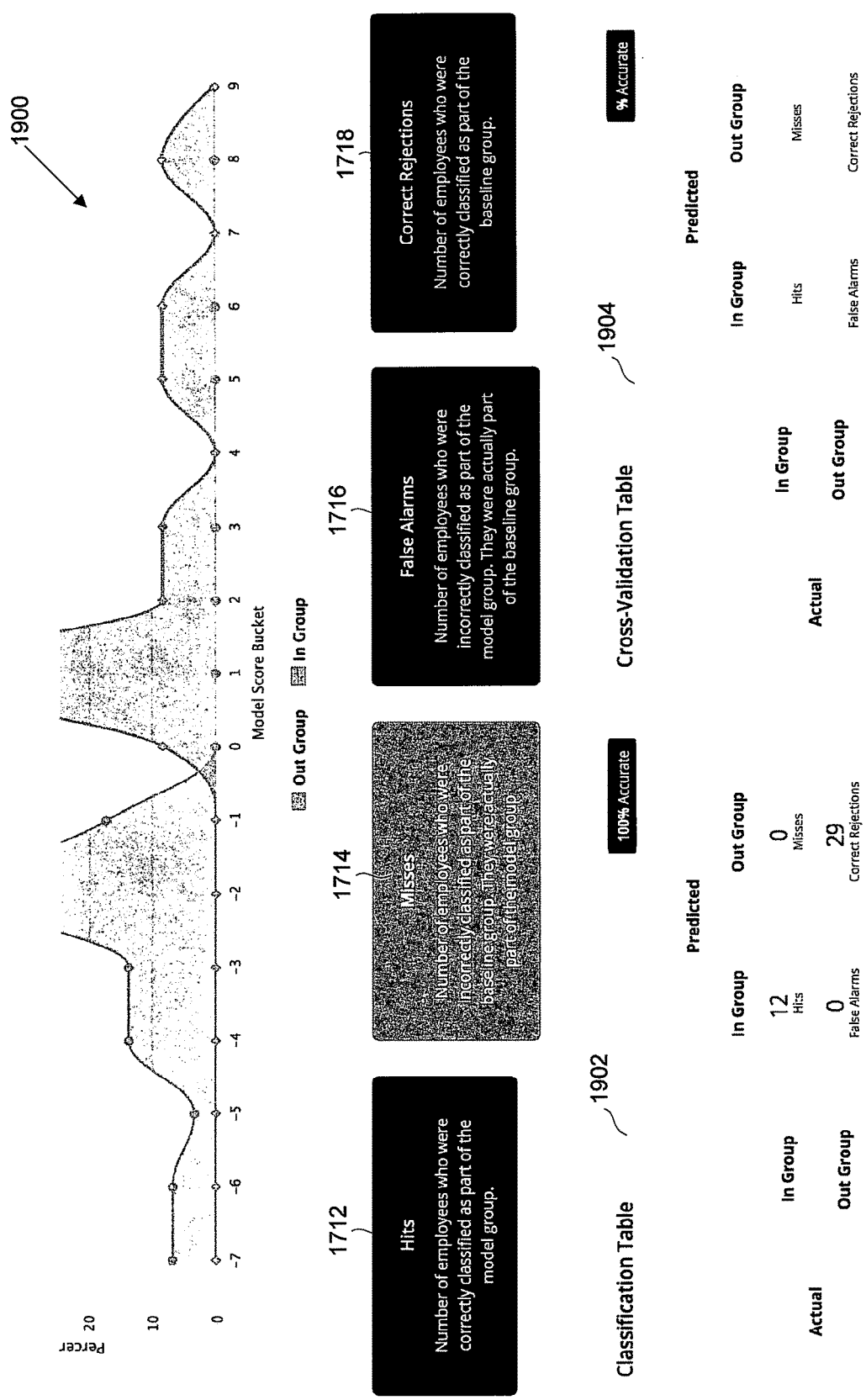
FIG. 19 illustrates exemplary classification and cross-validation tables in the window of FIG. 17A, in accordance with some embodiments.

Window 1900 may include a classification table 1902 summarizing the results of the hits, misses, false alarms, and correction rejections. In the example of FIG. 19, the model analytics engine determined 12 hits and 29 correct regions, resulting in 100% accuracy in the model. The classification table 1902 may be based on a single employee model that is generated based on the gameplay data of a group of employees.

In some embodiments, window 1900 may further include a cross-validation table 1904. For the cross-validation table, a model may be generated for each employee, and the plurality of models may be cross-validated against one another to predict the in-group or out-of-group status of each employee. Unlike the classification table 1902, the cross-validation table 1904 need not require pre-labeling of whether an employee is in-group or out-of-group. Accordingly, the cross-validation table may provide a more accurate analysis of the model compared to the classification table, and may be used to validate the accuracy of the classification table.

Figure 20:
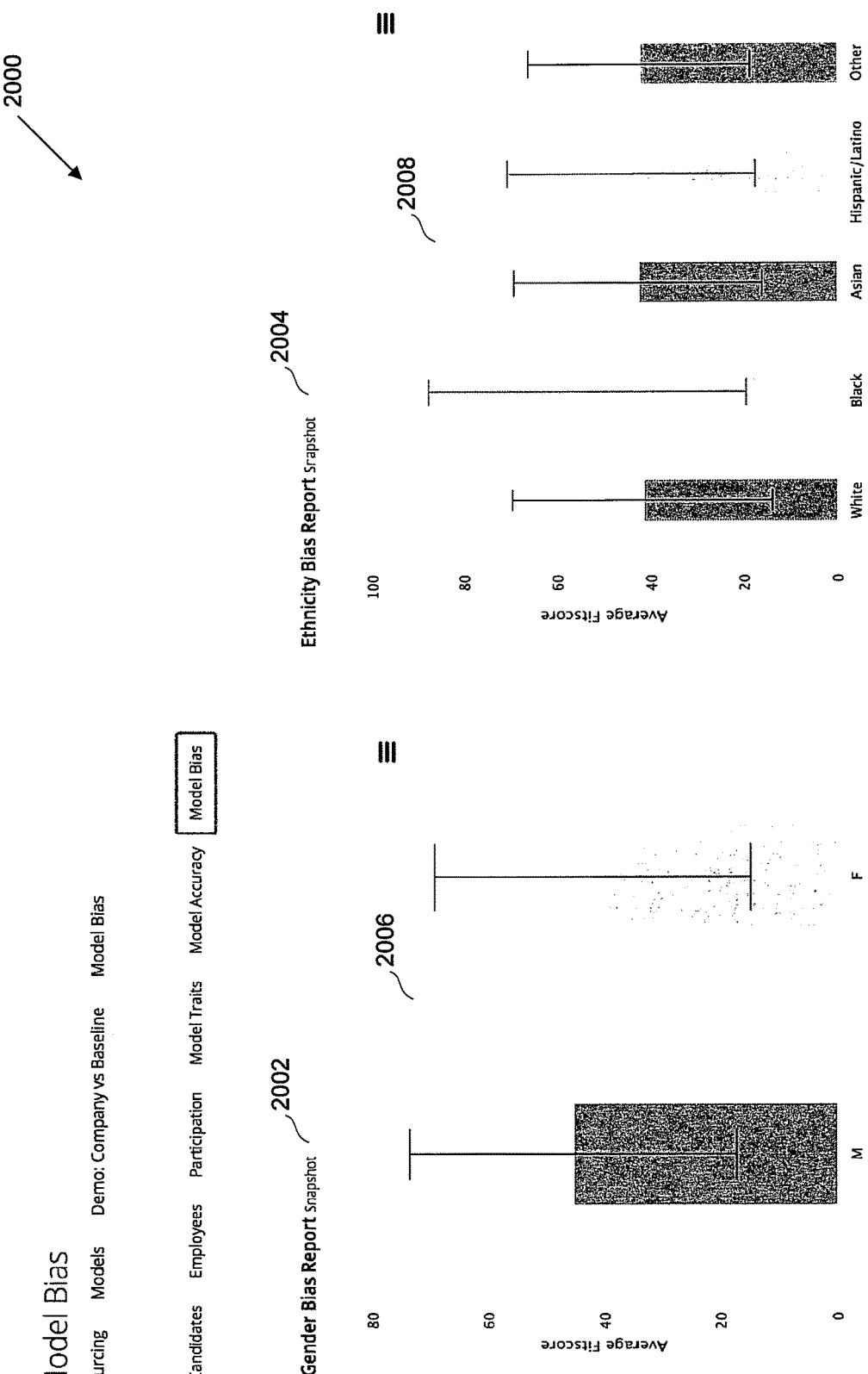
FIG. 20 illustrates an exemplary model bias window, in accordance with some embodiments.
Figure 21:
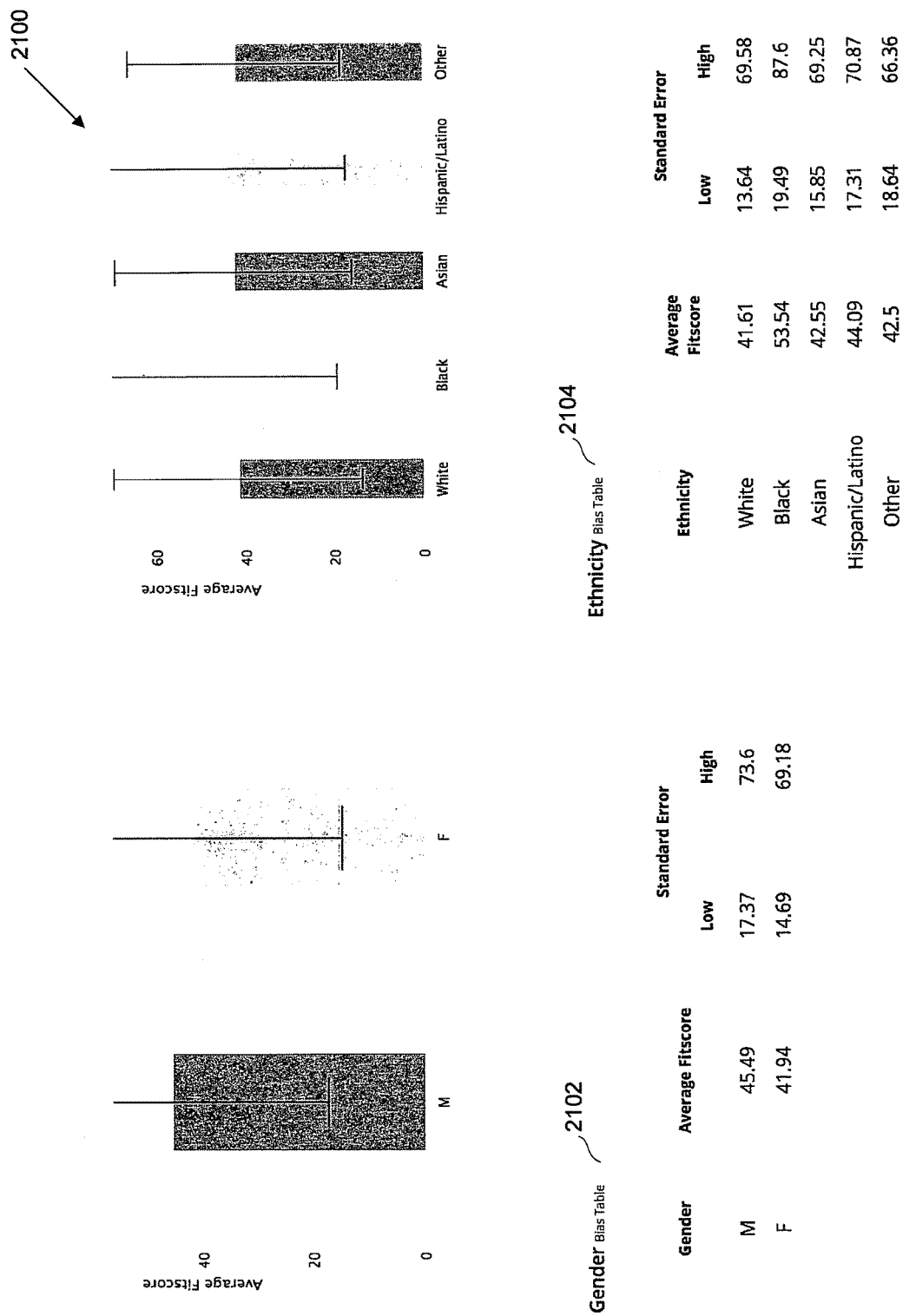
FIG. 21 illustrates scoring tables for different bias factors in the window of FIG. 20, in accordance with some embodiments.

Referring back to of FIG. 17A, when a user clicks on the Model Bias link 530 in window 500, window 2000 of FIG. 20 may be generated. Window 2000 may provide information on whether the model is biased (or skewed) based on different inherent characteristics of the employees. For example, window 2000 may include a gender bias report snapshot 2002 and an ethnicity bias report snapshot 2004. The gender bias report may be classified by gender (male and female), and the ethnicity bias report may be classified by ethnicity (e.g., white, black, asian, hispanic/latino, and other). Each report may show barcharts of the fit scores 2006 and 2008 within each gender or ethnicity group. When a user scrolls down window 2000, window 2100 of FIG. 21 may be generated. Window 2100 may include a gender bias table 2102 summarizing the results of the gender bias tests, and an ethnicity bias table 2104 summarizing the results of the ethnicity bias tests. A user may move a cursor over the barcharts to view the average fit scores for different groups, for example as shown in FIG. 22. In part A of FIG. 22, a pop-up window 2202 may show the average fit score for male employees to be 45.49. In part B of FIG. 22, a pop-window 2204 may show the average fit score for Asian employees to be 42.55.

The fit scores may be an aggregation of the scores of individual neuroscience-based assessments of the employees. A multivariate statistical analysis of the fit scores may be performed to evaluate the impact of demographic factors on the scores. For example, a Hotelling's T-squared test may be used to assess statistically significant differences (if any) between gender groups. A multivariate ANOVA test may be used to assess statistically significant differences (if any)

between the different ethnicity groups. In the example of FIG. 20, the multivariate statistical analyses showed that none of gender or ethnicity was statistically significantly related to the fit scores.

Figure 23:
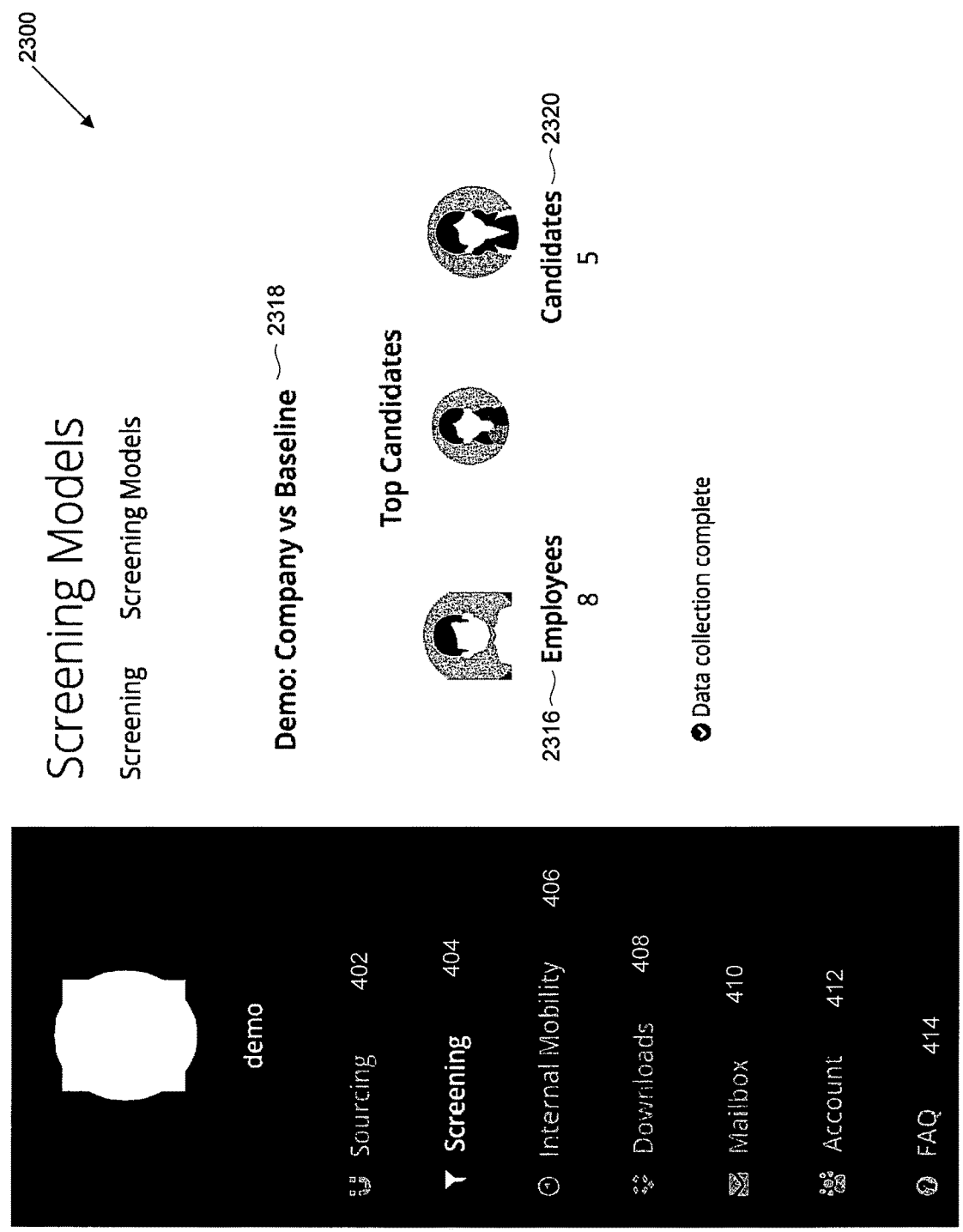
FIG. 23 illustrates an exemplary screening model window, in accordance with some embodiments.

Referring back to FIG. 4, when a user selects the Screening link 404 on the left of window 400, window 2300 of FIG. 23 may be generated. FIG. 23 illustrates an exemplary screening model window, in accordance with some embodiments. A user may access one or more screening models using the screening model window. The difference between the screening models and the sourcing models lies in the use of the employee model and the source of the candidates, and not in the employee model itself. The models for supporting screening and sourcing may be identical. For sourcing, a user (e.g., a recruiter) may use the sourcing models to identify candidates who are most similar to a target group of individuals (i.e., identify candidates who match closely to an employee model), and present those candidates to a company for its hiring needs. For screening, a company may use the screening models to screen a pool of candidates that the company has already selected. In sourcing, a recruiter may present only candidates who pass a threshold cut-off to a company, and need not share data on candidates who do not pass the threshold cut-off. In contrast, a company may receive data on all of the candidates in screening, regardless whether each candidate passes the threshold cut-off.

As previously described, an employee model may be representative of a target group of top employees of the company, and the employee model may be contrasted against a baseline group. The baseline group may be selected from a database comprising of employees from other fields, who may be similar to the target group of employees taking the neuroscience-based tests in terms of demographic factors such as gender, age, ethnicity, educational background, but who do not work in in the same field as the target group of employees. Candidates may be compared to the employee model to determine their match/compatibility for a specific job position with the company.

Referring to window 2300 of FIG. 23, a target group 2316 of top employees of a company may include eight employees, and an employee model of the target group may be matched against a baseline group 2318. A number of candidates 2320 (e.g., five) may be compared against the employee model to determine how well the candidates fit/match the employee model.

Figure 24:
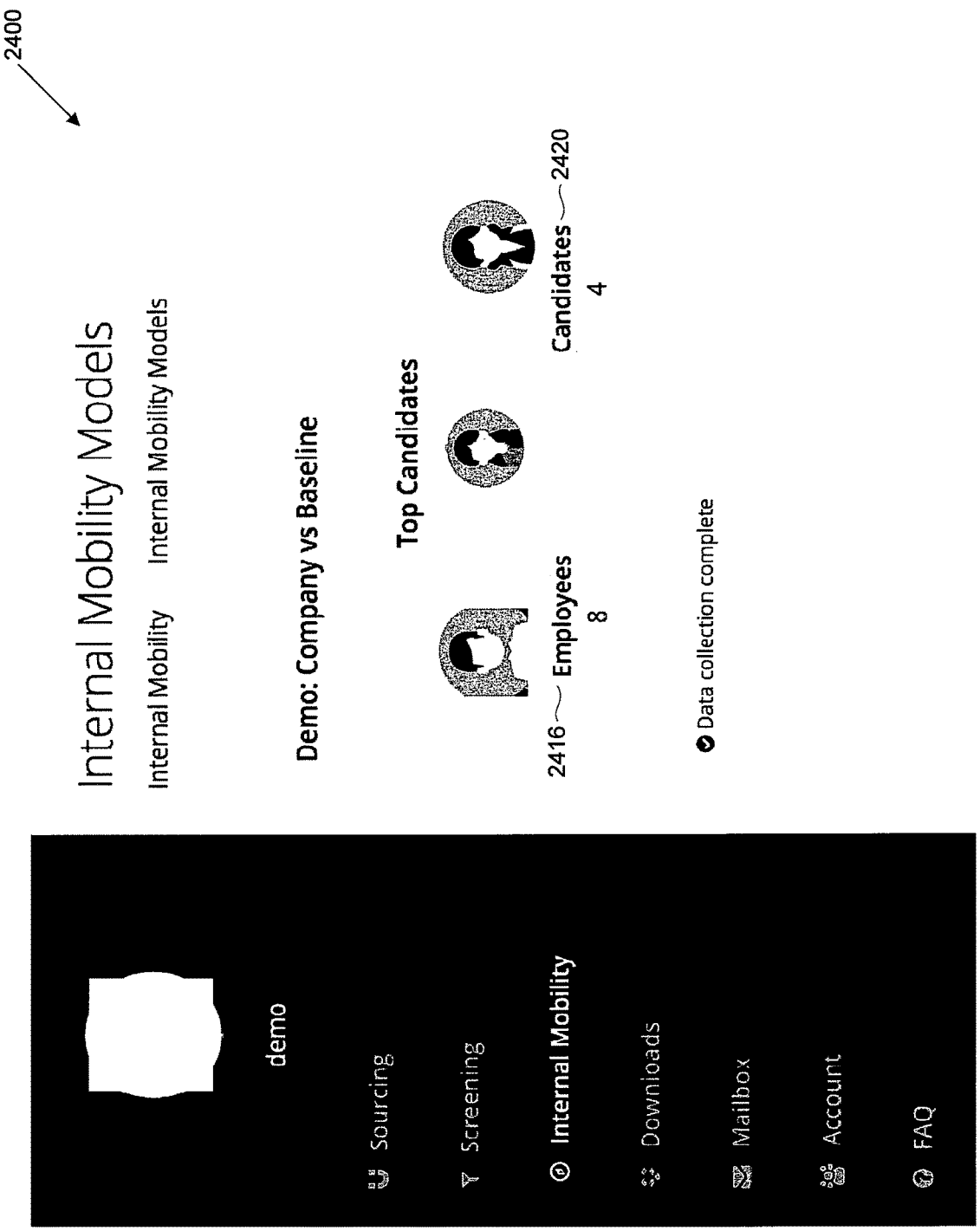
FIG. 24 illustrates an exemplary internal mobility model window, in accordance with some embodiments.

When a user selects the Internal Mobility link 406 on the left of window 2300, window 2400 of FIG. 24 may be generated. FIG. 24 illustrates an exemplary internal mobility model window, in accordance with some embodiments. A user may access one or more internal mobility models using the internal mobility model window. The difference between the internal mobility model window, and the screening models and the sourcing models, lies in the use of the employee model and the source of the candidates, and not in the employee model itself. The models for supporting screening, sourcing, and internal mobility may be identical. A company may use internal mobility models to source for candidates 2420 within the company, so that those candidates can have mobility within the company and assume different functions/roles that maximize their potential. In some embodiments, the candidates may play neuroscience-based games that may be hosted on the company's intranet website. Based on the candidates' gameplay performance, the internal mobility model may recommend matches to the candidates for suitable positions within the company. Similar to the sourcing model and the screening model, the candidates 2420 are also matched against an employee model of a target group 2416 of top employees.

Figure 25:
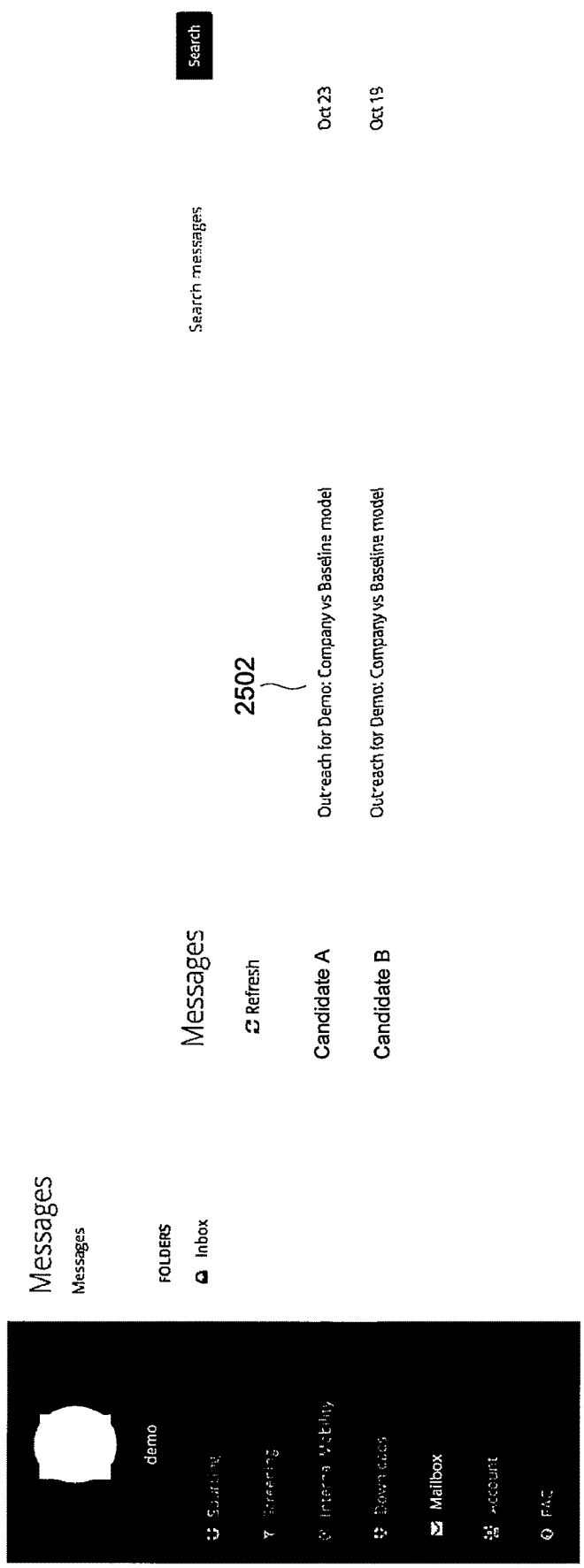
FIG. 25 illustrates an exemplary messages window in a mailbox folder, in accordance with some embodiments.
Figure 26:
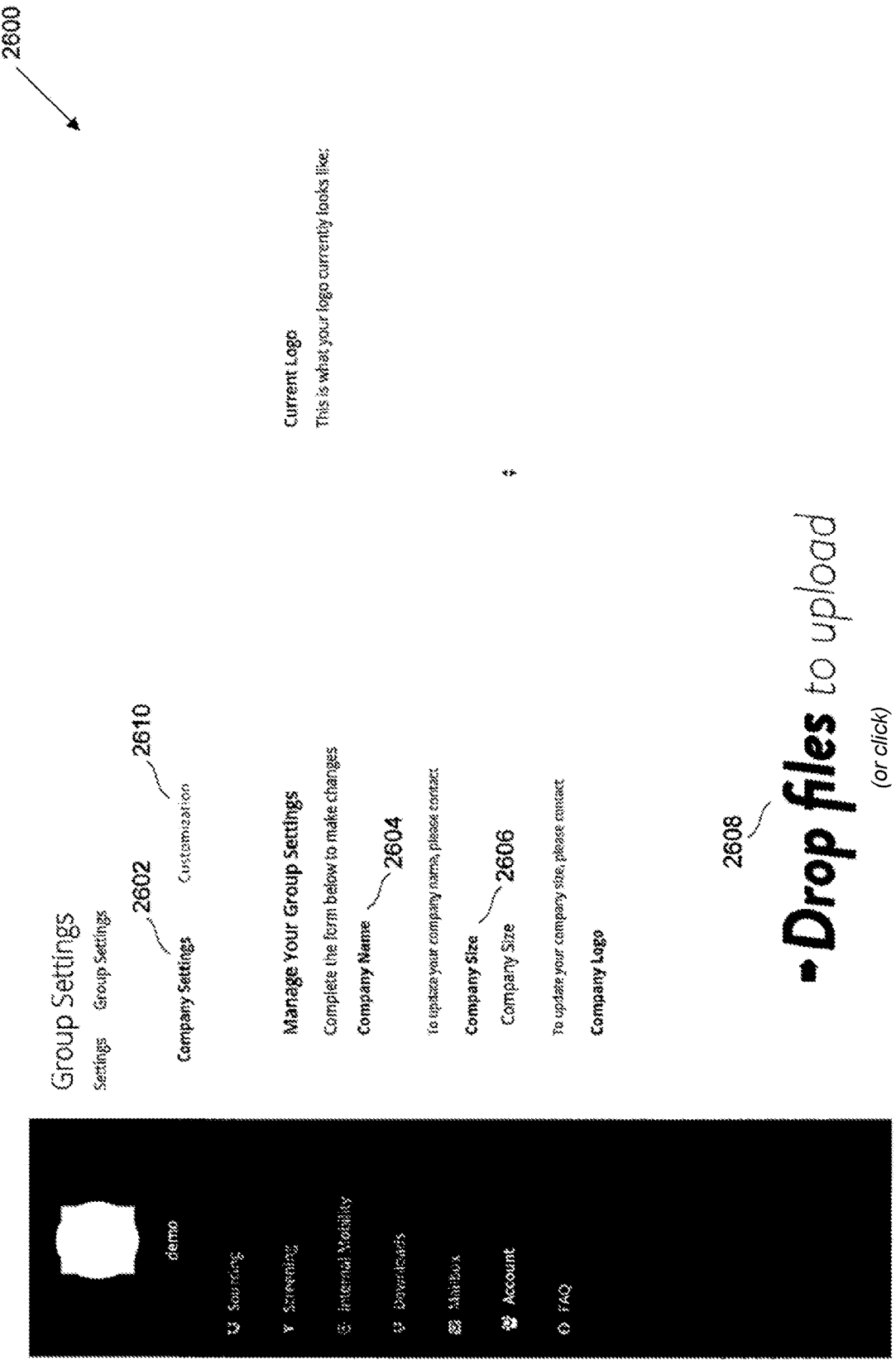
FIG. 26 illustrates an exemplary group settings window in an account folder, in accordance with some embodiments.

When a user selects the Mailbox link 410 on the left of window 2300 of FIG. 23, window 2500 of FIG. 25 may be generated. Window 2500 may include correspondence (messages) 2502 between a user and different candidates (e.g., Candidates A and B) regarding specific job positions.

When a user selects the Account link 412 in window 2300 of FIG. 23, window 2600 may be generated. Window 2600 may allow a user to manage group settings 2602 for groups that the user may be associated with. For example, a user can update a company's name 2604, company size 2606, and company logo 2608 for a particular group.

Figure 27:
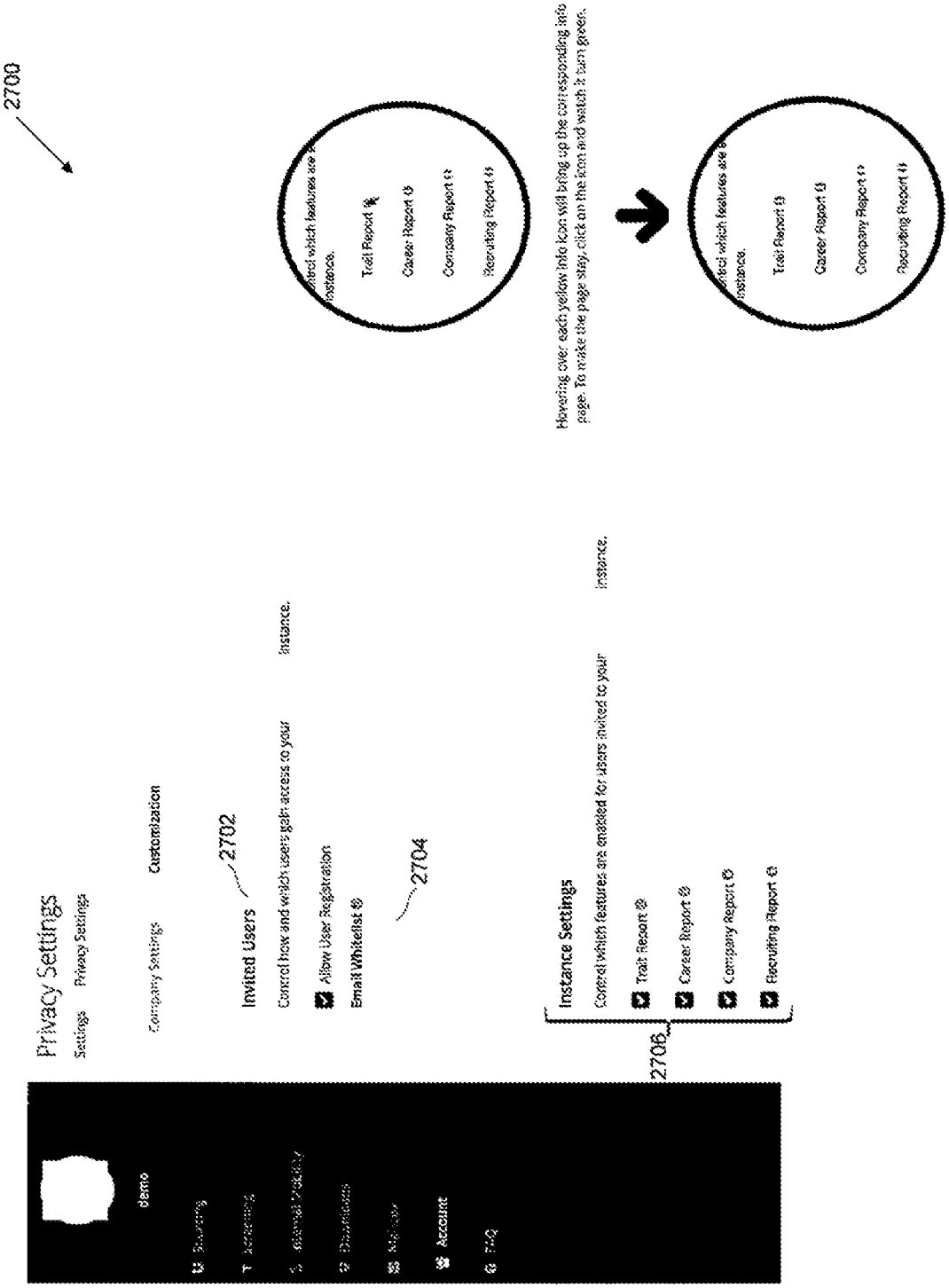
FIGS. 27 and 28 illustrate an exemplary privacy settings window in an account folder, in accordance with some embodiments.
Figure 28:
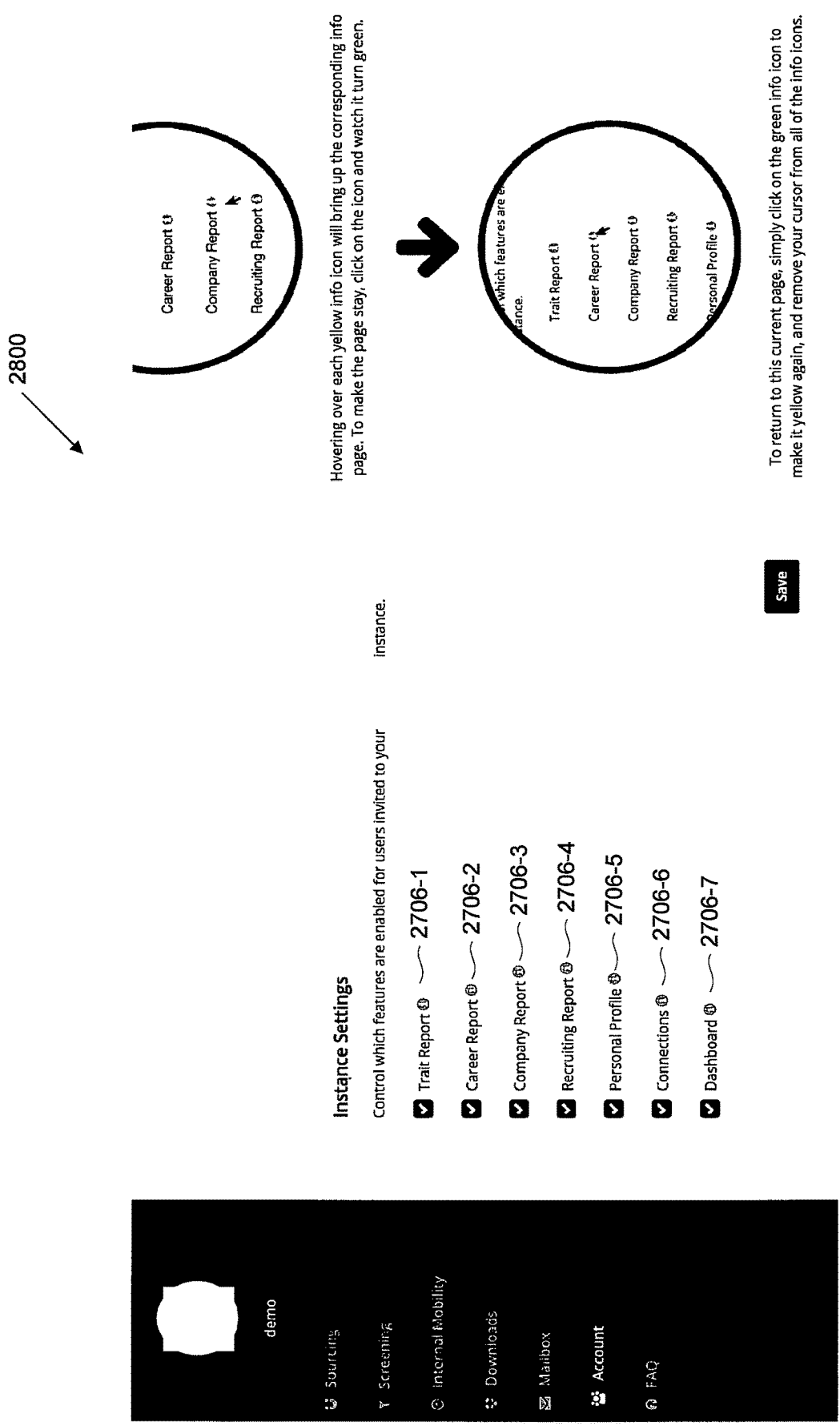

When the user selects the Customization link 2610 in window 2600, window 2700 of FIG. 27 may be generated. A user may invite and grant permission 2702 to other users to access his/her account, by providing their email addresses 2704 in window 2700. A user may also enable or disable certain features 2706 for viewing by other users. For example, as shown in windows 2700 and 2800 of FIGS. 27 and 28, a user may select which features other users may view in the account. Those features may include trait reports 2706-1, career reports 2706-2, company reports 2706-3, recruiting reports 2706-4, personal profiles 2706-5 of candidates or employees, connections 2706-6, dashboard 2706-7, etc.

Figure 30:
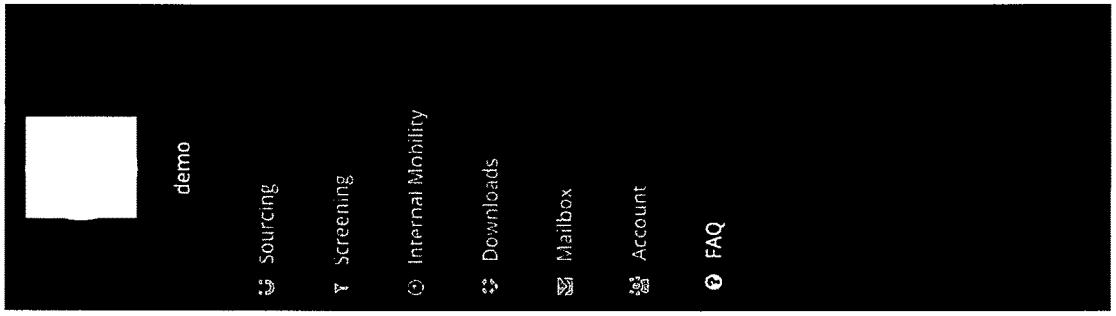
Figure 31:
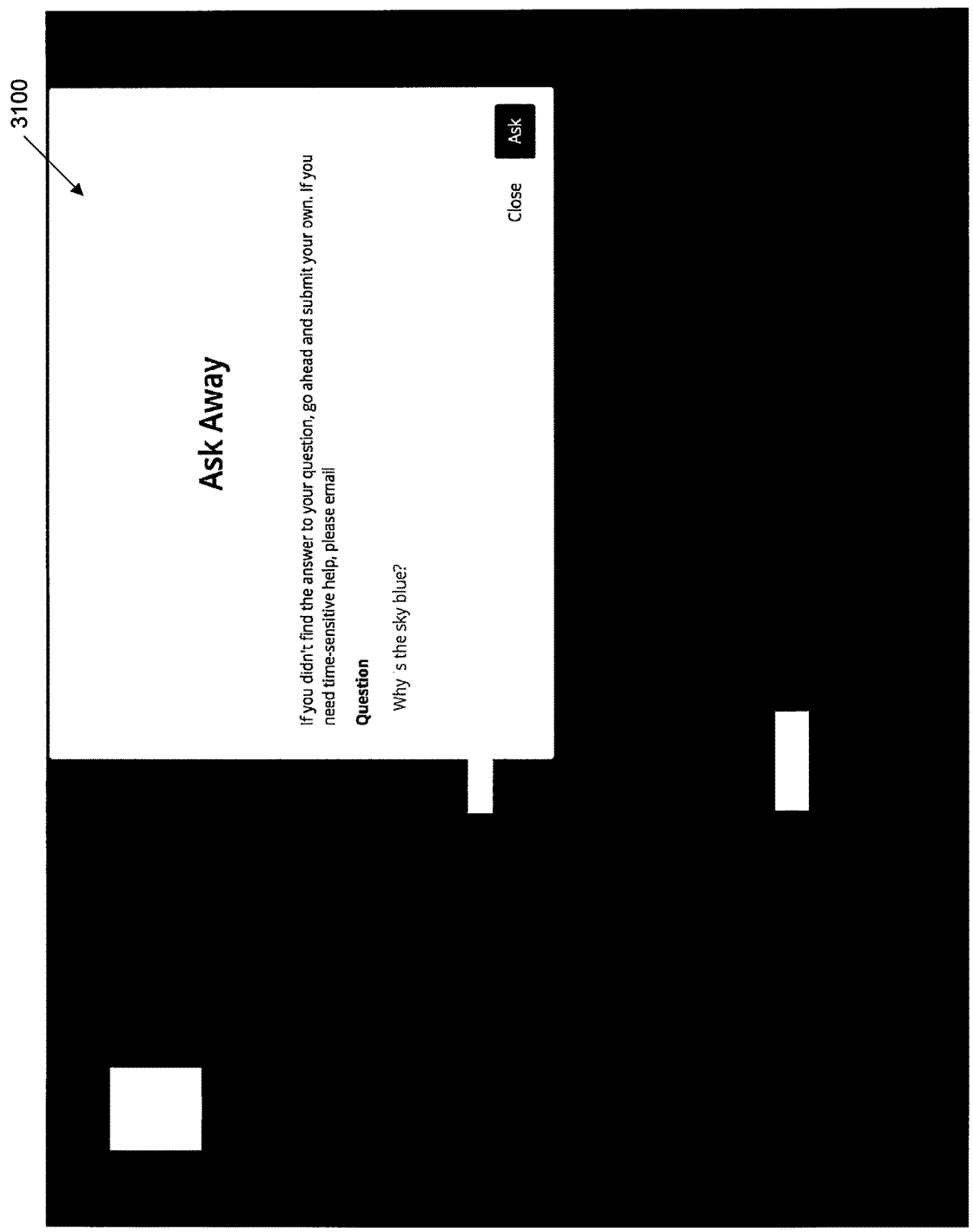
FIG. 31 illustrates an exemplary inquiry window in the FAQ window of FIGS. 29 and 30, in accordance with some embodiments.

When the user selects the FAQ link 414 in window 2300, windows 2900 and 3000 of FIGS. 29 and 30 may be generated. Windows 2900 and 3000 may provide links 2902 to answers to frequently asked questions about how different models work, candidate sourcing/screening, etc. If a user does not find the answer to a question, the user may input the question using window 3100 of FIG. 31.

Figure 32:
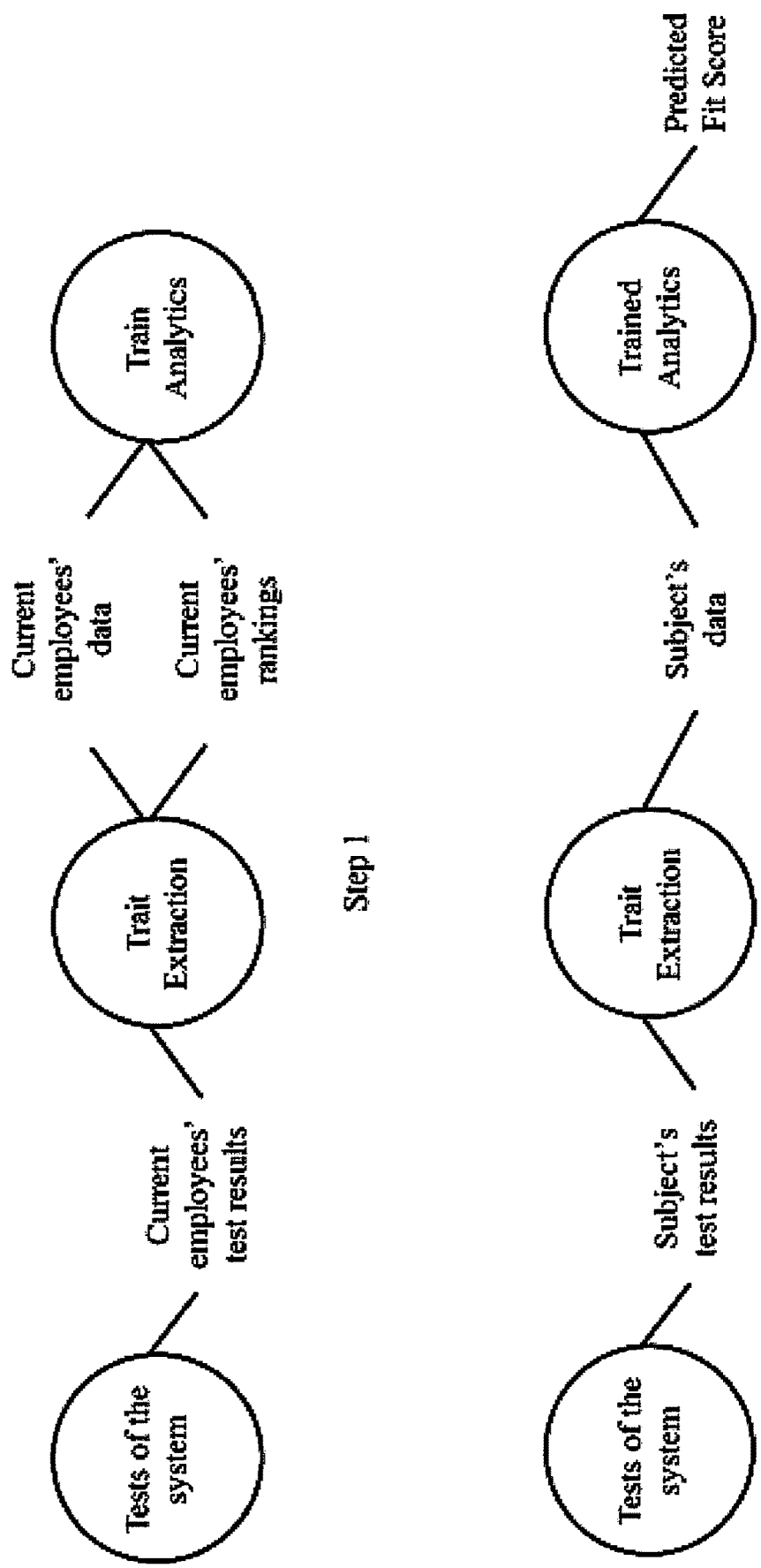
FIG. 32 depicts an overview of a modeling system, in accordance with some embodiments.

FIG. 32 is an overview of how an analytics engine of the system can be used as a predictive model for a business entity attempting to predict how likely a potential hire will succeed as an employee. In the first step, a current employee can complete the tests of the system. Upon completion of the tests, the system can extract cognitive and emotional trait data based on the performance of the employee on the tests. Next, the system can use the employee's rating data and test data to train the analytics engine to determine what characteristics an ideal employee should possess for a specific position at the business entity.

Once the analytics engine is adequately trained, the model can be used in the second step for predictive analysis and forecasting. First, the candidate can complete the system's tests. Upon completion, the system can extract traits about the candidate based upon the candidate's performance on the tests. The data from the tests can then be applied to the trained analytics engine to create a fit score for the candidate. These predictive models can be used to assess factors including, for example, how likely a potential hire would be to succeed in a particular role at the company. Accurate predictive models can detect subtle data patterns to answer questions about an employee's future performance in order to guide employers to optimize their human capital.

A system of the invention can provide a method of providing a computerized task to a subject. The task can be a neuroscience-based assessment of emotion or cognition. Upon completion of the tasks, the system can measure a performance value of the subject based on the subject's performance on the task. A specific trait can then be assessed based on the performance value, wherein the assessed trait can be used to create a profile for the subject. The trait can then be compared by a processor of a computer system with a database of test subjects. Comparison of the traits of the subject with a database of test subject can be used to create a model specific to the tested subject. The model can be then used to score the subjects, which can assist in creating a quantitative assessment of the subject's emotion or cognition. The test subjects can work for a business entity. The comparison of the trait of the subject with the database of test subjects can be used to determine whether the subject is suitable for hiring.

A system of the invention can provide a method of providing a computerized task to a subject. The task can be a neuroscience-based assessment of emotion or cognition. Upon completion of the tasks, the system can measure a performance value of the subject based on the subject's performance on the task. A specific trait can then be assessed based on the performance value, wherein the assessed trait can be used to create a profile for the subject. The assessed trait can further be used to generate a model of the subject based on assessment of more than one trait of the subject and comparison of the subject's model and a reference model. A processor of a computer system can then be used to identify the subject's career propensity based on a comparison of the subject's trait with a database of test subjects. The comparison of the subject's trait with a database of test subjects can also be used to generate a model of the subject. The results of the comparison can be outputted to a hiring officer. The results of the comparison can further be used to recommend careers for the subject.

The following are examples of neuroscience-based tasks in the games that may be provided to employees, candidates, and subjects, and the results obtained from completing those tasks.

Example 1: Analogical Reasoning

The Analogical Reasoning Task can measure the ability of a subject to discern connections between concepts or events that are seemingly unrelated. Analogical reasoning can further refer to tasks using analogies to model novel connections between situations or representations that do not seem similar on the surface. Analogical reasoning has frequently been linked to creative problem-solving as both require individuals to generate innovative ideas within the constraints of a particular task. The more disparate two situations appear, the more creative the analogical reasoning process can be. The likeness between two situations, concepts, events, or representations can be described by semantic distance. The greater the semantic distance, the less similarity exists between the two presented situations. In the analogical reasoning task, the semantic distance can be highly correlated with independent raters' evaluations of creativity, as in the subject can be perceived as more creative when the subject forms a connection between situations that seem highly dissimilar. Functional magnetic resonance imaging (fMRI) can be used to measure brain activity during an analogical reasoning task, and the semantic distance between the items in the analogies can be parametrically varied. Critically, semantic distance of analogical mapping, and not task difficulty, as assayed by response time, correctness, and rated difficulty, can modulate brain activity.

In the present invention, a subject was presented with two sets of word pairs and then asked to determine whether the second set was analogous to the relationship between the first set. A system of the present invention performed a test-retest study using an undergraduate sample (N=38) with a two-week interval between testing sessions. The test-retest reliability of the analogical reasoning task was found acceptable at about r=0.63.

Example 2: Balloon Analogue Risk Task (BART)

In the BART, subjects earned money in a computer game wherein with each click on a cartoon pump, a simulated balloon inflated and a small amount of money was deposited into a temporary bank account. The subjects were allowed to collect the money at any point. However, if the balloon popped, the temporary bank account accrued no money and the trial ended. The number of clicks by the subject served as a measure of risk-taking, and the task lasted for about 80 trials.

Performance on a BART can be correlated with several other risk-related constructs including the Barratt Impulsivity Scale, the Sensation Seeking Scale, and the Behavioral Constraint scale.

The validity of the BART can be determined by looking at how performance on the BART correlates to self-report measures completed by the test subjects. To demonstrate the incremental validity of the BART in predicting risky behavior, a step-wise regression analysis can be done using age, gender, impulsivity, and sensation seeking in step one, and factoring in the BART results in step two. Regression analysis of steps one and two can show that even while controlling for other factors, higher BART scores can be linked to a higher propensity for risky behavior. The BART can be significantly correlated to impulsivity, sensation seeking, and a risk score, while not having a significant correlation with other demographic factors.

A test-retest study was done by a system of the invention using an undergraduate sample (N=40) with a two-week interval in between testing sessions. The test-retest reliability was found to range from an r of about 0.65 to about 0.88 depending on the level of risk. Another study conducted on a community sample (N=24) showed that split-half reliability ranged from an r of about 0.88 to about 0.96, depending on the level of risk.

Example 3: Choice Task

The Choice Task can be used as a measure of risk-taking inclinations of a subject. The Choice Task can include a set of scenarios, in which subjects are asked to evaluate based on a series of choice sets. The choice sets can comprise alternatives that are mutually exclusive and independent, and generally one alternative can be considered the riskier of the two options. A study can be conducted wherein subjects are asked to complete a variety of tests that measure personality and behavioral risk measures. Tests that the subjects can complete include Zuckerman's Sensation Seeking Scale, Eysenck's Impulsivity Scale, Retrospective Behavioral Self-Control Scale, Domain Specific Risk Taking Scale, Choice Task, Balloon Analogue Risk Task, Variance Preference Task, Future Discounting I, and Future Discounting II. A principal components analysis can be done to determine which principal components are the underlying measures of risk. For instance, variance preference can be correlated with the Choice Task. Variance preference can be a strong measure for risk, and can be described as a personality tendency for excitement and extroversion.

In a system of the invention, subjects were asked if they would either receive a set amount of money or bet on a chance of receiving a higher amount of money. The amounts of money and the chances of receiving the money were varied to make the options seem more or less risky. Two studies were undertaken by the system to establish the test-retest reliability of the Choice Task. One study was conducted with an undergraduate sample (N=40) with a two-week interval between testing sessions. The measured test-retest reliability was found to be about r=0.62. The second study was a split-half reliability study using a community sample (N=24). The split-half reliability was found to be about r=0.82.

Example 4: Dictator Task

The Dictator Task can be used in behavioral economics as a measure of generosity and altruism. To determine the validity of this game, the subjects can be asked to report on their philanthropy over the past year. For example, subjects that donated their fictional earnings during the task can be found to have, in reality, donated more to philanthropic causes in the past year than those who did not donate their fictional earnings during the task.

In the present invention, subjects were paired with random participants where both the subject and the random participant initially received the same amount of money. Subsequently, the subject was given an additional amount of money and instructed to give the random participant none, some, or all of the money. The amount of money donated to the random participant was used as a measure of altruism. A test-retest study was conducted by a system of the invention using an undergraduate sample (N=40) with a two-week interval in between testing sessions. The test-retest reliability was found acceptable at about r=0.62. The split-half reliability was also measured using a community sample (N=24) and the reliability was found acceptable at about r=0.65.

Example 5: Digit Span

The Digit Span task can be used to measure a subject's working memory number storage capacity. In a system of the invention, subjects were presented with a series of digits and, when prompted, asked to repeat the sequence of digits by entering the digits on a keyboard. If the subject successfully recited the numbers, then the subject was given a longer sequence to remember and recite. The length of the longest list a subject can remember is the subject's digit span.

Digit Span can be positively correlated with all measures of working memory, including measures used to represent capacity and processing, and Digit Span can be negatively correlated with age. The Digit Span task can have adequate reliability for healthy adults over a one-month interval.

Digit Span tests were conducted. In a community sample (N=23), the split-half reliability for the Digit Span task was found acceptable at r=0.63. A test-retest study with a two-week interval between testing sessions on an undergraduate sample (N=39) also showed acceptable reliability where r=0.68.

Example 6: EEfRT (Easy or Hard)

The Effort-Expenditure for Rewards Task (EEfRT) can be used to explore effort-based decision-making in humans. The EEfRT can measure how much effort a person is willing to expend for a reward. Across multiple analyses, a significant inverse relationship can be observed between anhedonia and willingness to expend effort for rewards. Increased trait anhedonia can significantly predict an overall reduced likelihood of expending effort for a reward, indicating that the EEfRT task can be an effective proxy for motivation and effort-based decision-making.

In a system of the invention, subjects were presented with a choice to complete an easy or a hard task. The easy task involved pressing the space bar of a keyboard fewer times than did the hard task. Completion of the easy task guaranteed the same reward every time, whereas completion of the hard task provided a chance of receiving a much higher reward. Subjects who were more inclined to pick the harder task were assessed as being more motivated by reward, even when more effort was required.

The system conducted tests on reliability for the EEfRT. In a community sample (N=24), the split-half reliability for the EEfRT was found to be above average at r=0.76. A second study was conducted using an undergraduate sample (N=40) with a two-week interval between testing sessions. The test-retest reliability was found acceptable at r=0.68.

Example 7: Facial Affect Test

Situational factors can have a strong influence on a subject's interpretation of emotional expression if a facial expression provides relevant, but unclear information. Within this limited context, most subjects can judge the expresser to feel an emotion that matches the situation, rather than their actual facial expression. Situational information can be especially influential when suggesting a non-basic emotion, for example, a person can be in a painful situation, but display an expression of fear. Often, a subject judging the expression of the person concludes that the person's expression is that of pain, not of fear.

In a system of the invention, subjects were presented with photographs of men and women displaying different emotions. In some instances, the photographs were presented with a story describing the situation, while other photographs were presented alone. The subjects were instructed to choose from a set of four emotions that best described the expression of the person in the photograph. Subject who could correctly identify the emotion without being presented with story were described as having an acute ability to read facial expressions.

The system conducted reliability tests on the Facial Affect Task. The split-half reliability of the Facial Affect task was measured using a community sample (N=24). The split-half reliabilities were found above average, with r values ranging from about 0.73-0.79. An undergraduate sample (N=40) was measured twice, with a two-week interval between sessions. The test-retest reliability was found acceptable, with r values of about 0.57-0.61.

Example 8: Finger Tapping (Keypresses)

The Finger-Tapping test (FTT) is a psychological test that can assess the integrity of the neuromuscular system and examine motor control. The task can have good reliability over a one-month interval.

A simple motor tapping task can be conducted on healthy subjects. The subjects can be required to tap a stationary circle on a touch-screen monitor with the index finger of their dominant hand as fast as possible for 60 seconds. The test-retest interval can be about four weeks, and can have a significantly high reliability correlation.

In a system of the invention, subjects were asked to hit the space bar of a keyboard repeatedly using the dominant hand for a specified amount of time. The split-half reliability of the FTT was assessed using a community sample (N=24).

Key measures were found reliable with r values of about 0.68-0.96. A test-retest study used an undergraduate sample (N=40) with an interval of two weeks between testing sessions. Reliabilities for relevant measures were found acceptable, with r values between about 0.58-0.77.

Example 9: Future Discounting

Temporal future discounting can refer to the extent to which individuals prefer immediate, but modest, rewards to future, but sizeable, rewards. Temporal discounting can be modeled as an exponential function leading to a monotonic decrease in preference with increased time delay, wherein individuals discount the value of a future reward by a factor that increases with the delay of the reward. Hyperbolic discounting can refer to a time-inconsistent model of future discounting. When a hyperbolic model is used to model future discounting, the model can suggest that valuations fall very rapidly for small delay periods, but then fall slowly for longer delay periods. A hyperbolic curve can show a better fit than other models, providing evidence that individuals discount delayed rewards.

In a system of the invention, subjects were presented with questions, wherein the subjects had to choose between receiving a certain amount of money now, or more money at a specified time in the future. The amount of money and time when the money would be given to the subject was varied to increase or decrease the delay and size of the reward.

The system conducted reliability tests of the Future Discounting Task. The split-half reliability of the future discounting task was assessed using a community sample (N=24). The split-half reliability for log-transformed data was found acceptable at about r=0.65. A test-rest study assessed the reliability of the future discounting task using a sample of undergraduates (N=40), with a two-week interval between testing sessions. The reliability of the log-transformed data was found acceptable at about r=0.72.

Example 10: Flanker Task

The Flanker Task can be used to examine task switching capabilities in a subject. The Flanker Task can refer to a set of response inhibition tests used to assess the ability to suppress responses that are inappropriate in a particular context. The Flanker Task can be used to assess selective attention and information processing capabilities. A target can be flanked by non-target stimuli, which correspond either to the same directional response (congruent stimuli) as the target, to the opposite response (incongruent stimuli), or to neither (neutral stimuli). Different rules are given to the subject as to how the subject should react to what they see.

Consistently poor performance can be observed when subjects are asked to switch tasks versus repeat a task, showing validity for the task-switching effects of the flanker task. The anterior cingulate cortex (ACC), which can be more active in response to incongruent stimuli compared to congruent stimuli, can be activated during the Flanker Task and can monitor the amount of conflict in the task. The level of conflict measured by the ACC can provide more control to the subject on the next trial, indicating that the more conflict presented in trial n, the more control can be presented by the subject in trial n+1.

The Flanker Task and transcranial magnetic function (TMS) can be used to find the time course of a post-error adjustment leading to a post-error slowing (PES). Some results can show that the excitability of the active motor cortex can decrease after an erroneous response.

In a system of the invention, subjects were instructed to press specific arrow keys on a keyboard depending upon the direction and color of five presented arrows. If a red arrow was the central arrow among five red arrows, then the direction of the central red arrow dictated which key to press. If a red arrow was the central arrow among four blue arrows that all pointed in the same direction, then the direction of the blue arrows dictated which key the subject should press. For example, if the subject was shown a sequence of five red arrows pointing to the right, then the subject should have pressed the right arrow key. If the next image showed the red, central arrow pointing to the right, but the rest of the red arrows pointed to the left, then the subject should have pressed the right arrow key again. However, if the next image showed the red, central arrow pointing to the right surrounded by blue arrows pointing to the left, then the subject should have pressed the left arrow key. The ability to push the correct arrow key based upon the "flankers," or arrows surrounding the central arrow, was used to measure the task switching abilities in the subject.

The system conducted reliability tests for the Flanker Task. The split-half reliability of the Flanker Task was assessed using a community sample (N=14). Key measures were found reliable with r values of about 0.70-0.76. In a second study, an undergraduate sample (N=34) was used to assess test-retest reliability. Results for relevant measures were found acceptable, with r values of about 0.51-0.69.

Example 11: Go/No-Go

A Go/No-Go test can be used to assess a subject's attention span and response control. An example of a Go/No-Go test can include having a subject press a button when a specific stimulus is present ("Go"), and not pressing the same button when a different stimulus is presented ("No-Go"). Performance on the Go/No-Go task, especially for inhibition trials, can be related to complex executive functions measured by the Wisconsin Card Sorting Task, Stroop Color-Word Test, and Trail Making Test.

In a system of the invention, subjects were presented with either a red circle or a green circle and instructed to press the space bar when shown the red circle, but press nothing when shown the green circle. The split-half reliability of the Go/No-Go task was studied using a community sample (N=23). The split-half reliabilities for relevant measures were found acceptable, with r values of about 0.56. A test-retest study was also conducted on a sample of undergraduates (N=33) with a two-week interval between sessions. The reliability on a key measure was found strong of about r=0.82.

Example 12: Mind in the Eyes

The Mind in the Eyes test can evaluate social cognition in subjects by assessing the subject's ability to recognize the mental state of others using just the expressions around the eyes. A series of experiments varying the type of emotion, amount of face used as stimuli, and gender of stimuli can be conducted to determine how subjects perceive basic and complex emotions. Healthy controls can perceive both basic and complex emotions well from the whole face, but for complex mental states, the subjects' scores can be higher looking at just the eyes. This finding suggests that the eyes can hold more information than the whole face.

In a system of the invention, subjects were presented with a series of photographs revealing only the eyes of the individuals in the photographs. The subjects were then instructed to choose the emotion that they felt was best represented by the eyes. The choices of emotion ranged from basic, for example, sad, happy, angry, and surprised, to complex, for example, arrogant, regretful, judgmental, and nervous. Subjects who were able to read emotions correctly from the eyes were described as more emotionally perceptive.

The system conducted reliability tests on the Mind in the Eyes task. The split-half reliability of the Mind in the Eyes task was assessed in a community sample (N=23), and the split-half reliability had an above average correlation of about r=0.74. A test-retest study on an undergraduate sample (N=38) with a two-week interval between testing sessions had acceptable reliability of about r=0.67.

Example 13: N-Back (Letters)

The N-back task is a continuous performance task that can be used to measure working memory in a subject. For example, a subject can be presented with a sequence of stimuli, and the subject must indicate when the current stimulus matched the stimulus from n steps earlier in the sequence. The value of n can be adjusted to make the task more or less difficult. An N-back task at two levels of complexity can be compared to performance on the Digit Span Test on the Wechsler Adult Intelligence Scale Revised (WAIS-R). Accuracy scores for the N-back task can be positively correlated with performance on the Digit Span subtest of the WAIS-R. The Digit Span subscale of the WAIS-R can reflect certain cognitive processes, which can overlap with working memory capacity, indicating that accuracy scores on the N-back task can be associated with individual differences in working memory capacity.

In a system of the invention, subjects were presented with letters and instructed to press the space bar when the same letter was shown two frames earlier. Subjects who were able to identify the second instance of the letter correctly were assessed as having a high working memory.

The system conducted reliability tests for the N-Back task. The split-half reliability of the N-back test was assessed in a community sample (N=24), and was found to have above average reliability at about r=0.83. A test-retest study used an undergraduate sample (N=38) with a two-week interval between testing sessions. The reliability was found acceptable of about r=0.73.

Example 14: Pattern Recognition

The Pattern Recognition task can measure the ability of a subject to discern patterns and similarities from a sequence of stimuli or objects.

The Raven's Progressive Matrices (RPM) test is similar to the Pattern Recognition Task. The Advanced Progressive Matrices (APM) test, which is one form of the Raven's Progressive Matrices test, can have very good test-retest reliability. The reliability coefficient can range from about 0.76 to about 0.91.

In a system of the invention, the subjects were presented with a grid of colored squares with one corner missing. The subjects had to choose an image from six images that would correctly complete the pattern in the grid, and the subjects who were able to identify the image correctly were assessed as having high pattern recognition abilities.

The system conducted reliability tests for the Pattern Recognition Task. To assess test-retest reliability, the task was administered to a sample of undergraduates (N=36) with a two-week interval between sessions. The reliability was found acceptable at about r=0.55.

Example 15: Reward Learning Task

To assess the relationship between a subject's ability to adjust behavior as a function of reward, a reward-learning task can be developed wherein subjects earn an amount of money determined by a differential reinforcement schedule. A subject can be presented with a choice, wherein one choice can be associated with a reward, but receipt of the reward is dependent on picking the correct choice. As a subject learns which choice is correct, the reward can increase.

In a system of the inventions, subjects were presented with digital faces that either had a short mouth or a long mouth. The difference in lengths of the mouth was minimal, but perceptible by the human eye. The subjects were asked to press the right arrow key when presented with the face with the long mouth, and the left arrow key when presented with the face with the short mouth. The subjects were additionally told that they could receive money if they picked the correct choice. The Reward Learning Task was used to determine whether the subjects were able to learn which stimulus was correct based upon the receipt of a reward.

The system conducted reliability tests on the Reward Learning Task. The split-half reliability of the reward task was assessed in a community sample (N=24), and was found to have an above average reliability on a key measure where r=0.78. An undergraduate sample (N=40) was used in a test-retest study with a two-week interval between sessions. The test-retest reliability of a key measure was found above average at about r=0.66.

Example 16: Tower of London (TOL)

The TOL task can be used to assess executive function and planning capabilities. The mean number of moves and mean initial thinking time (ITT) can be computed for different difficulty levels of the task. The ITT can correspond to elapsed time between the presentation of the puzzle and the moment when a subject begins solving the puzzle Negative correlations can exist between total mean ITT score and total mean move score, suggesting that a longer ITT score helps to reduce the number of moves, in other words, ITT can reflect planning. Variables measuring the number of moves, accurate performance, and time before making the first move on Tower of London tasks can have effect sizes of between 0.61 and 1.43.

A series of TOL tasks for use in research and clinical settings can be assessed to show a clear and nearly-perfect linear increase of task difficulty across minimum moves. In other words, low-, medium-, and high-performing subjects can attain correct solutions in problems up to a level of low-, medium-, and high-minimum moves, respectively, but not above. Accuracy on the task can differ by the number of minimum moves.

In a system of the invention, subjects were presented with two sets of three pegs. The target set of pegs had five colored discs around one peg, while the experimental set of pegs had the five colored discs distributed across the three pegs. The object of the task was to match the arrangement of the colored discs in the experimental set with that of the target set. Subjects who could complete the task within the specified time period with the minimum number of moves were assessed as having high planning abilities.

The system conducted reliability tests on the TOL task. The split-half reliability of the TOL task was assessed in a community sample (N=24), and the TOL task was found to have a good reliability for time, a key measure, of about r=0.77. A test-retest study using a sample of undergraduates (N=39) was conducted with a two-week interval between test sessions. The reliability for time using this method was found above average at about r=0.69.

Example 17: Trust Task

The Trust Task can be used to study trust and reciprocity while controlling for reputation, contractual obligations, or punishment. The Trust Task can have two stages. First, subjects can be given money and then the subjects can decide how much, if any, of the money they will send to an unknown person in a different location. Subjects can be told that the amount of money they send will double by the time it reaches the other person. Then, the other person has the option to send money back to the subject.

Performance on the Trust Task can be associated with personality measures including Machiavellianism, and relational motives, for example, high concern for others and low concern for self. Participation in trust tasks can influence neurophysiological responses, for example, the production of oxytocin, and can be associated with the location, magnitude, and timing of neural responses in areas of the brain related to trust and social relationships.

In a system of the invention, subjects were paired with a random participant. The subject received money while the random participant received no money. The subjects were instructed to send some, or all, of their money to the random participant while knowing that the money would triple by the time the money reached the other person. The other person was then able to send none, some, or all of the money back to the subject. The subjects can then assess the fairness of the random participant based on the amount of money they sent back. Subjects who sent more money were perceived as more trusting than those subjects who sent less money to the random participant.

The system conducted reliability tests for the Trust Task. A split-half reliability study was done with a community sample (N=24) for the Trust Task. The split-half reliability was found reasonable at about r=0.60. The test-retest reliability was measured in a sample of undergraduates (N=40). A key measure was found acceptable at about r=0.59.

TABLE 1 displays a summary of reliability measures calculated in the preceding examples for the illustrative tasks that can be used by a system of the invention.

TABLE 1

| Task | Test-Retest Reliability (N) | Split-Half Reliability (N) |
|---|---|---|
| Analogical Reasoning (Words) | .63 (38) | Not Tested |
| Balloon Analogue Risk Task (Balloons) | .65-.88 (40) | .88-.96 (24) |
| Choice Task (Choices) | .62 (40) | .82 (24) |
| Dictator Task (Money Exchange 2) | .62 (40) | .65 (24) |
| Digit Span (Digits) | .68 (39) | .63 (23) |
| EEfRT (Easy or Hard) | .68 (40) | .76 (24) |
| Facial Affect Test (Faces) | .57 (40) | .73-.79 (24) |
| Finger Tapping (Keypresses) | .58-.77 (40) | .68-.96 (24) |
| Flanker Task (Arrows) | .68-.69 (34) | .71-.76 (14) |
| Future Discounting (Now or Future) | .72 (40) | .51 (24) |
| Go/No-Go (Stop1) | .82 (38) | .56 (23) |

TABLE 1-continued

| Task | Test-Retest Reliability (N) | Split-Half Reliability (N) |
|---|---|---|
| Mind in the Eyes (Eyes) | .67 (38) | .74 (23) |
| N-Back (Letters) | .73 (38) | .83 (24) |
| Reward Learning Task (Lengths) | .66 (40) | .78 (24) |
| Tower of London (Towers) | .69 (39) | .77 (24) |
| Trust Task (Money Exchange 1) | .59 (40) | .60 (24) |

Example 18: Use of a System of Invention to Classify Employees

Company A was a consulting firm with 22 employees. The company identified four of their employees in this group as top performers, while the other 18 were not identified as top performers. The system was able to classify employees as bottom or top performers using behavioral data from the employees' performance on neuroscience tests described herein using integrated algorithms. The system's algorithms transformed each employee's set of behavioral data into a fit score that ranged from 0-100. The fit scores indicated a likelihood of an employee belonging to one group or another. An individual with a 50% fit score can be equally likely to be classified as a bottom performer or a top performer, whereas an employee with a 90% fit score can be much more likely to be a true top performer, and an employee with a 10% fit score can be much more likely to be a bottom performer. The system performed binary classification while maximizing model accuracy, and the decision boundary was adjusted to ensure the minimization of false positives and false negatives.

The system built a model that correctly identified the four top performers. The model also classified two bottom performers as top performers, which means that 16 employees were correctly identified as bottom performers. The system used a decision boundary of 60% to minimize both false positives and false negatives. TABLE 2 displays the results of this analysis, and indicates how the system's classification matched the company's classification. For example, the system classified two employees as top performers, when, in fact, the company classified those employees as bottom performers. Thus, using a sample of 22 individuals, the system built a model that classified the employees with 91% accuracy.

TABLE 2

| | | Company Classification | |
|---|---|---|---|
| | | Top Performer | Bottom Performer |
| System Classification | Top Performer | 4 | 2 |
| | Bottom Performer | 0 | 16 |

Example 19: Use of a System of the Invention to Determine Potential Job Performance During a recruiting effort, Company A had 235 individuals apply. The applicant pool consisted of undergraduate students matriculating from a large university. All applicants were assessed both by Company A's standard resume review process and by the system's battery of tests. The system was used to increase the efficiency of resume review and to reduce the likelihood of missed talent.

Utilizing the predictive model built in EXAMPLE 18, the system attempted to identify applicants who were most likely to receive job offers. To understand whether the system's algorithms can increase the yield of extended offers, the system first compared the number of candidates to whom Company A extended offers versus how many candidates were invited to interview based on Company A's standard resume review process. Subsequently, the system computed a similar ratio of extended offers to interviews, based on the system's algorithms in conjunction with Company A's standard resume review process (TABLE 3). By utilizing the algorithms herein in combination with Company A's standard resume review process, the system increased the yield of extended offers from 5.3% to 22.5%.

TABLE 3

| Total # of applicants | Interview decided by | Selected to interview | Offers | Yield |
|---|---|---|---|---|
| 235 | Company A Resume Review Only | 76 | 4 | 5.3% |
|  | The system + Company A Resume Review | 18 | 4 | 22.5% |

Company A also used the system to help reduce missed talent among applicants. The company asked the system to recommend 10 applicants from the 141 applicants that were rejected by Company A's standard resume review process. The system was able to match, and slightly exceed, the yield of the company's standard resume review process when evaluating candidates that the company rejected by identifying one candidate that was offer-worthy among 10 candidates that the system recommended (TABLE 4).

TABLE 4

| Total # of applicants | Company resume review outcome | Selected to interview | Offers | Yield |
|---|---|---|---|---|
| 235 | Interview 94 | Company A 94 | 8 | 8.5% |
|  | No Interview 141 | Systems of the Invention 10 | 1 | 10% |

Company A also used the system as a service for replacing resume review. The system's algorithms identified 28 of the 235 applicants as being worthy of an interview. The company interviewed those 28 individuals and extended offers to five of them (TABLE 5). Thus, the system was able to increase the yield of applicants who were extended offers from 8.5% to 17.9%.

TABLE 5

| Total # of applicants | Interview decided by | Selected to interview | Offers | Yield |
|---|---|---|---|---|
| 235 | Company A Resume Review Only | 94 | 84 | 8.5% |
|  | Systems of the invention | 28 | 5 | 17.9% |

The system can be utilized for three distinct purposes. The system can increase the efficiency of resume review by increasing the yield of applicants to whom offers are extended. The system can reduce missed talent by assessing candidates that the company's resume review process did not otherwise consider. Lastly, the system can be used to replace resume review in situations when the company does not have the budget to support a recruiting team.

Example 20: Use of a System of the Invention to Provide Career Feedback

Company B asked the system to build models to classify employees across a range of sales positions as top performers using data from their performance on the battery of neuroscience-based tests from a group of 782 employees measured over one month. The goal of the analysis was to provide career development feedback and re-staffing advice, if necessary.

The system built models using algorithms to classify employees within each of the employee positions as either a top performer or a bottom employee. These models allowed the system to report the traits that delineated top from bottom performers. The trait identification feature of the system allowed the system to provide career development advice by quantitatively comparing an individual employee's profile to a model employee profile for the company's position and then reporting on the employee's strengths and areas that need improvement.

Figure 33:
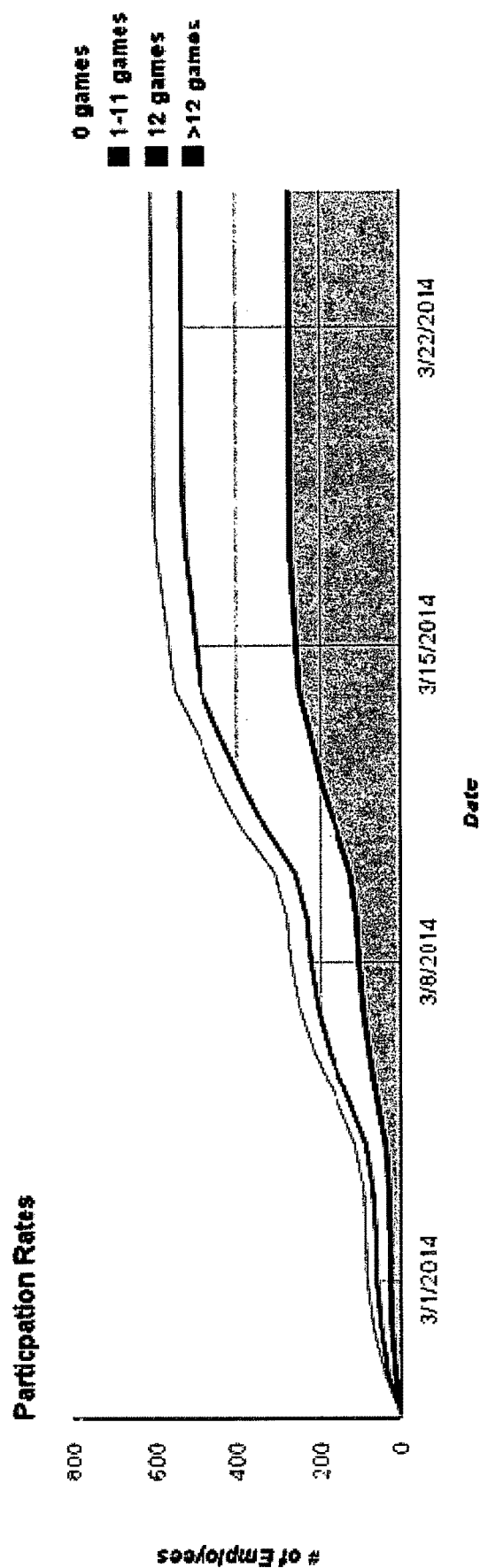
FIG. 33 is a graphical representation of employee participation in an example of the invention, in accordance with some embodiments.

Details concerning the number of employees who participated across time at select intervals are listed in TABLE 6 and represented in FIG. 33. The final group size for top performers from each of the four employee positions is detailed in TABLE 7.

TABLE 6

| Games Completed | Day 4 | Day 11 | Day 18 | Day 25 | Day 28 |
|---|---|---|---|---|---|
| 0 | 699 | 511 | 230 | 175 | 173 |
| 1-11 | 23 | 49 | 64 | 71 | 71 |
| 12 | 33 | 120 | 238 | 263 | 265 |
| More than 12 | 27 | 102 | 250 | 273 | 273 |
| Total | 782 | 782 | 782 | 782 | 782 |

TABLE 7

| Employee Position | Employees classified as top performers by a system of the invention |
|---|---|
| Position 1 | 24 |
| Position 2 | 37 |
| Position 3 | 30 |
| Position 4 | 30 |
| Total | 121 |

The model accuracy was determined as follows: Correct Classification/Total N, where N was the group size and the correct classification of the employee was determined by the overlap of group classification between the system and the company.

Figure 34:
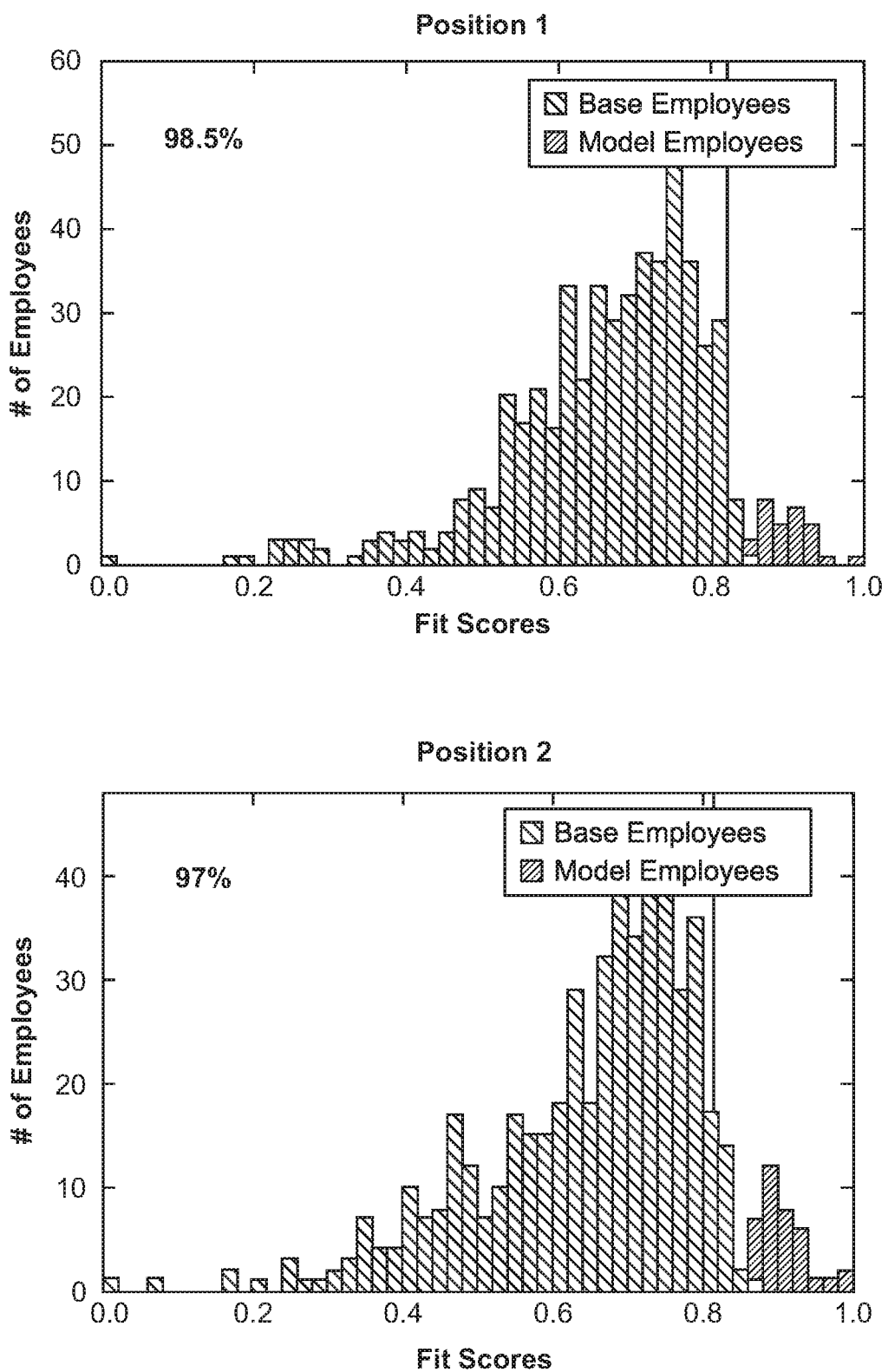
FIG. 34 shows the accuracy of models generated by a system of the invention, in accordance with some embodiments.

Model accuracy results, based on the training data, for the four positions examined were all greater than 95% as shown in FIG. 34. FIG. 34 depicts a set of 4 histograms, one for each position modeled, and each histogram displays the number of employees on the Y-axis and fit scores on the X-axis. Employees in dark gray whose fit scores were less than 0.8 were accurately classified according to the invention's metrics as not being top performers. Employees depicted in light gray whose fit scores were greater than or equal to 0.8 were accurately classified by the invention as being top performers. Employees depicted in dark gray whose fit scores were greater than or equal to 0.8 were inaccurately classified as top performers (false positives), while those depicted in light gray whose scores were less than 0.8 were inaccurately classified as not being top performers (false negatives). False positives and false negatives were described in section [00115] and depicted in TABLE 2. Company B received a profile analysis by trait for each of the four models built by the system. These profiles suggested traits characteristic of a model employee for a specific position.

The system also provided Company B's employees with career development feedback. The system specifically provided each employee with a list of the top three traits that make the employee an ideal fit for their position, and a list of the top three traits upon which the employee could improve. In addition, the system provided recommendations as to how the employee could improve for each trait.

The system classified employees as top performers or bottom performers across four different sales positions with greater than 95% accuracy. The system was available for re-staffing at Company B because Company B was interested in utilizing the results from the system to help transfer employees between departments, if necessary. Furthermore, employees received career development feedback that was directly based on the assessment. The system's assessment specifically identified the traits of successful employees in a position at the company. The system then gave feedback to the bottom-performing employees about how the employee compared to the model employee, and ways that the bottom-performing employee can improve performance.

Example 21: Use of a System of the Invention to Increase the Conversion Rate of Temporary Employees Company C and Company D were consulting firms that recruited heavily from major business schools for summer associates. In 2012 and 2013, Company C employed 57 MBA summer associates, while Company D employed 106 student summer associates. A system of the invention assessed students that the companies interviewed over the course of two summers and determined whether the system's algorithms could accurately identify students who would continue in the consulting field better than the company could identify those students. The system built culture fit models from students who worked at Company C and Company D, regardless of the position held. The goal of the study was to increase the conversion rate of summer associates to full-time employees.

Following the summer associate program, Company C extended eight offers, and six of those individuals continued to work in the consulting industry after finishing school. Company D extended 16 offers, and 11 of those individuals continued to work in the consulting industry after school ended. The system built models for both Company C and Company D and generated fit scores to predict to whom the companies should extend offers. The system suggested that Company C extend offers to 11 students, 10 of whom continued to work in the consulting industry. The system also suggested that Company D extend offers to 10 individuals, 9 of whom continued to work in the consulting industry (TABLE 8).

TABLE 8

| Company | Offers | Offers Accepted | Acceptance Rate | Combined Acceptance Rate |
| --- | --- | --- | --- | --- |
| Company C | 8 | 6 | 75% | 71% |
| Company D | 16 | 11 | 70% | |
| System C | 10 | 9 | 90% | 90% |
| System D | 11 | 10 | 91% | |

Example 22: Use of a System of the Invention to Increase Yield of Applicant Acceptance of Offers Company C worked with 57 summer associates over 2012 and 2013. Company C extended offers to 13 of the associates. Ten of the 13 associates accepted the offer from Company C. Company C asked the system to test whether the algorithms could predict who was more likely to accept an offer from a firm. Using the model previously built for Company C in EXAMPLE 21, the system compared average fit scores for those individuals who accepted an offer from the company to fit scores of those individuals who rejected an offer from the company.

The average fit score of the ten summer associates who accepted a full-time offer from Company C was 69%. The average fit score of the three individuals who did not accept an offer from Company C was 35%. Thus, the system's fit scores can track individuals who are more likely to accept an offer from a company. For Company C, individuals who accepted Company C's offer had higher culture fit scores than those individuals who rejected Company C's offer.

Example 23: Assessment of Adverse Impact in a System of the Invention

The fit scores created by a system of the invention can be an aggregation of the scores of the individual assessments that are part of the system. A multivariate statistical analysis of the fit scores was done to evaluate the impact of demographic factors on the scores. To investigate the impact of age on the system's scores, two age groups from the population (N=179), 39-years-old and younger and 40-years-old and older, were analyzed. The Hotelling's T-squared test was used to assess any statistically significant difference between the age groups. A difference in the groups based on age was not observed. The impact of age was further analyzed by breaking down the population into four age groups: a) 29-years-old and younger b) 30-34 c) 35-39, and d) 40-years-old or older. A multivariate one-way ANOVA test was employed, which also showed no differences among age groups ($p>0.05$). Using the same data set and a Hotelling's T-squared test, the variation between females and males was not statistically significant ($p>0.05$). In a multivariate ANOVA test, no significant differences were observed across the race categories ($p>>0.1$), which included Asian, Black, Hispanic, Middle Eastern, Native American, White, other, and mixed race.

The multivariate statistical analyses demonstrated that none of age, gender, and race was statistically significantly related to the fit scores.

The system can examine the tests for adverse impact by testing for bias in each individual test for differences in results based on age, race, or gender. Results on the system's tests were examined at the individual assessment level. The system examined each task for differences by age, gender, or race groups and the analysis included between one and ten separate measures for each task. Significant results from the statistical analysis are given in TABLE 9. None of the tasks showed differences by race, and a subset of the tasks showed differences based on age and gender. For those tasks that showed significant differences between groups, the effect size of those differences was reported. A correlation coefficient (r) for the effect size of 0.1 can be considered small; 0.3 can be considered moderate; and 0.5 can be considered large. Sixteen of 17 significant results fell in the small to moderate range, and a single measure from the Tower of London task (time per correct move) achieved an r of 0.32, in the moderate range.

TABLE 9

| Task | Results by Age, Gender, or Race | Effect size, r (p) |
| --- | --- | --- |
| Analogical Reasoning | No difference by Age, $p > 0.14$ | ns |
| | No difference in Gender, $p > 0.06$ | ns |
| | No difference in Race, $p > 0.85$ | ns |
| Balloon Analogue Risk Task | No difference by Age, p's $> .17$ | ns |
| | Risk Taking differed by Gender, $F(1, 331) = 6.02, p = 0.01$ | −0.18 (<.001) |
| | No difference by Race, p's $> 0.38$ | ns |
| Choice Task | Percentage Gamble differed by Age, $F(1, 345) = 8.25, p = 0.004$ | −0.16 (0.003) |
| | Percentage Gamble differed by Gender, $F(1, 344) = 6.77, p = 0.009$ | −0.14 (0.01) |
| | No difference by Race, $p = 0.80$ | ns |
| Dictator Task | No difference by Age, p's $> 0.06$ | ns |
| | Amount 2 differed by Gender, $F(1, 338) = 3.91, p < 0.05$ | −0.11 (0.05) |
| | No difference by Race, p's $> 0.28$ | ns |
| Digit Span | No differences by Age, $p = 0.54$ | ns |
| | No difference by Gender, $p = 0.15$ | ns |
| | No difference by Race, $p = 0.74$ | ns |
| EEfRT | No difference by Age, p's $> 0.11$ | ns |
| | Med-High Slope differed by Gender, $F(1, 336) = 6.89, p = 0.009$ | 0.14 (0.009) |
| | No difference by Race, p's $> 0.06$ | ns |
| Facial Affect Test | Accuracy differed by Age, $F(1, 334) = 12.70, p < 0.001$ | 0.19 (<0.001) |
| | No difference by Gender, p's $> 0.12$ | ns |
| | No difference by Race, p's $> 0.24$ | ns |
| Finger Tapping | Reaction Time differed by Age, $F(1, 342) = 12.12, p < 0.001$ | 0.20 (<0.001) |
| | Reaction Time differed by Gender, $F(1, 340) = 21.33, p < 0.001$ | −0.25 (< .001) |
| | No difference by Race, p's $> 0.99$ | ns |
| Flanker Task | No difference by Age, p's $> 0.07$ | ns |
| | All Switching, Accuracy differed by Gender, $F(1, 284) = 6.71, p = 0.01$ | 0.15 (0.01) |
| | No difference by Race, p's $> 0.19$ | ns |
| Future Discounting | Discount Rate differed by Age, $F(1, 330) = 4.07, p = .04$ | 0.14 (0.008) |
| | Discount Rate differed by Gender, $F(1, 330) = 6.24, p = 0.01$ | −0.25 (< .001) |
| | No difference by Race, $p > 0.79$ | ns |
| Go/No-Go | No difference by Age, p's $> 0.59$ | ns |
| | No difference by Gender, p's $> 0.17$ | ns |
| | No difference by Race, p's $> 0.78$ | ns |
| Mind in the Eyes | No difference by Age, $p > 0.44$ | ns |
| | No difference by Gender, $p > 0.60$ | ns |
| | No difference by Race, $p > 0.85$ | ns |
| N-Back | No difference by Age, $p = 0.23$ | ns |
| | Accuracy differed by Gender, $F(1, 332) = 9.65, p = 0.002$ | 0.17 (0.002) |
| | No difference by Race, $p > 0.48$ | ns |
| Pattern Recognition | No difference by Age, $p = 0.12$ | ns |
| | Number Correct differed by Gender, $F(1, 338) = 9.13, p = 0.003$ | 0.16 (0.003) |
| | No difference by Race, $p > 0.34$ | ns |
| Reward Learning Task | No difference by Age, p's $> 0.41$ | ns |
| | No difference by Gender, p's $> 0.13$ | ns |
| | No difference by Race, p's $> 0.18$ | ns |
| Tower of London | Time per correct move differed by Age, $F(1, 335) = 39.83, p < 0.001$ | 0.32 (< 0.001) |
| | No difference by Gender, p's $> 0.64$ | ns |
| | No difference by Race, p's $> 0.24$ | ns |
| Trust Task | No difference by Age, p's $> 0.12$ | ns |
| | Amount differed by Gender, $F(1, 344) = 10.17, p = 0.001$ | 0.17 (0.002) |
| | Fairness differed by Gender, $F(1, 344) = 7.84, p = 0.005$ | −0.15 (0.006) |
| | No difference by Race, p's $> 0.06$ | ns |

TABLE 9-continued

| Task | Results by Age, Gender, or Race | Effect size, r (p) |
|---|---|---|
| N-Back | No difference by Age, p = .23 | ns |
| | Accuracy differed by Gender, F(1, 332) = 9.65, p = 0.002 | 0.17 (0.002) |
| | No difference by Race, p > 0.48 | ns |

Balloon Analogue Risk Task (BART)

One measure of the BART showed a significant difference between genders; specifically, women were more risk-averse than men. This difference represented 3% of the observed variance explained by gender.

Choice Task

The results differed by both age and gender for the Choice Task. Younger participants had higher percentage gamble scores than participants over the age of 40. This difference represented 2.6% of the variance for the sample. Examination of percentage gamble by gender revealed that men had higher scores than women, and this difference represented 1.96% of the variance for the sample.

Dictator Task

The amount of money given to the random participant differed by gender, and women gave more in the task than men. This difference represented 1.2% of the variance for the sample.

EEfRT

The inflection point after which the more difficult task was chosen more frequently differed by gender, and men had higher scores than women. The gender difference explained 1.96% of variance in the data.

Facial Affect Test

The results for the Facial Affect Test differed by age in that older participants were more accurate in identifying emotions from facial expressions than were younger participants. The age difference explained 3.61% of the variance in the data.

Finger Tapping Task

The reaction time for Finger Tapping Task differed by both age and gender. Older participants were slower on the reaction time measure than younger participants, and women were slower than men. These effects accounted for 4 and 6.25% of variance in the data, respectively.

Flanker Task

One measure of the Flanker Task showed a significant difference between men and women. Men scored higher on switching accuracy, and this difference accounted for 2.25% of variance in the data.

Future Discounting

The system identified differences by both age and gender in the Future Discounting Task. Older participants were more likely to wait for opportunities in the future than younger participants. This effect accounted for 1.96% of the variance in the data. The discount rate also differed by gender, in that women were more likely than men to wait for opportunities in the future.

N-Back Test

A measure of accuracy in the N-Back Test differed by gender. Men had higher accuracy scores than women, a result that accounted for 2.89% of the variance in the data.

Trust Task

The system identified differences in both amount and fairness by gender. Men gave a higher amount than women, an effect that accounted for 2.89% of the variance in the data. Women gave higher fairness ratings, an effect that accounted for 2.25% of variance in the data.

Pattern Recognition

The system identified a significant difference based on gender in the Pattern Recognition Task. Men had higher pattern recognition scores than women, an effect that accounted for 2.56% of variance in the data.

Towers of London

The system identified a significant effect of age in the Towers of London Task. Older participants took more time per correct move than younger participants, an effect that accounted for 10.24% of variance.

Example 24: Fit Score Examination

The system examined sample data for evidence of adverse impact present within the fit scores the system generated for a sample from Company B. TABLE 10 reports the sample demographics, including a breakdown of the sample by position.

The system tested for adverse impact on the total sample (N=464) for each position. 514 employees from Company B across 4 positions completed the battery of tests. Individual models were built by the system for each position from a total sample of 538 employees. The system had gender data on 464 of the 538 employees. No difference in fit scores was found between genders within a position, or across positions.

TABLE 10

| Position | N | Males | Females | p-value for adverse impact |
|---|---|---|---|---|
| Position 1 | 29 | 12 | 17 | 0.41 |
| Position 2 | 280 | 154 | 126 | 0.79 |
| Position 3 | 127 | 53 | 74 | 0.13 |
| Position 4 | 28 | 14 | 14 | 0.89 |
| Total | 464 | 233 | 231 | All > 0.2 |

The system did not have access to ethnicity data for the employees of Company B reported above. However, the system tested a sample from an internal database for bias in ethnicity using the models generated above. The system generated fit scores for a sample of 962 individual from an internal database (TABLE 11). The population consisted of a mixture of undergraduate students, MBA students, and industry professionals.

TABLE 11

| Ethnicity | N |
|---|---|
| Caucasian | 513 |
| Asian | 312 |

TABLE 11-continued

| Ethnicity | N |
|---|---|
| African American | 52 |
| Hispanic/Latino | 85 |
| Total | 962 |

A difference in fit scores between ethnicities was not observed for the sample reported in TABLE 12 (TABLE 12).

TABLE 12

| Position | F$^a$-statistic | p-value |
|---|---|---|
| Position 1 | 0.59 | 0.62 |
| Position 2 | 1.85 | 0.14 |
| Position 3 | 2.52 | 0.06 |
| Position 4 | 2.45 | 0.06 |

$^a$One-way ANOVA.

Example 25: Fit Score Examination: Industry Fit Models

The system further examined all of the system's industry models for gender and ethnicity bias. The system generated fit scores for a sample of 962 individuals from an internal database (TABLES 11 and 13). The population consisted of a mixture of undergraduate students, MBA students, and industry professionals. A bias in gender or ethnicity was not observed in any of the industry models the system considers stable (TABLE 14).

TABLE 13

| Gender | N |
|---|---|
| Male | 496 |
| Female | 496 |
| Total | 962 |

TABLE 14

| Model | Group | t-statistic (gender) or F-statistic (ethnicity) | p-value |
|---|---|---|---|
| Consulting | Gender | 0.88 | 0.35 |
| Consulting | Ethnicity | 1.55 | 0.20 |
| Education | Gender | 1.05 | 0.31 |
| Education | Ethnicity | 0.62 | 0.60 |
| Entertainment | Gender | 0.34 | 0.56 |
| Entertainment | Ethnicity | 1.34 | 0.26 |
| Entrepreneurship | Gender | 2.05 | 0.15 |
| Entrepreneurship | Ethnicity | 0.64 | 0.59 |
| Finance | Gender | 0.14 | 0.70 |
| Finance | Ethnicity | 0.50 | 0.69 |
| Healthcare | Gender | 0.62 | 0.43 |
| Healthcare | Ethnicity | 1.04 | 0.37 |
| Marketing | Gender | 0.14 | 0.70 |
| Marketing | Ethnicity | 1.80 | 0.15 |
| Product Development | Gender | 3.23 | 0.07 |
| Product Development | Ethnicity | 0.59 | 0.62 |
| Project Management | Gender | 0.86 | 0.35 |
| Project Management | Ethnicity | 2.31 | 0.07 |
| Retail | Gender | 0.49 | 0.48 |
| Retail | Ethnicity | 1.35 | 0.26 |
| Hedge Fund | Gender | 2.41 | 0.12 |
| Hedge Fund | Ethnicity | 1.85 | 0.14 |
| Investment Management | Gender | 0.15 | 0.70 |
| Investment Management | Ethnicity | 1.66 | 0.17 |
| Private Equity | Gender | 0.14 | 0.71 |
| Private Equity | Ethnicity | 1.70 | 0.16 |
| Venture Capital | Gender | 0.30 | 0.58 |
| Venture Capital | Ethnicity | 1.88 | 0.13 |
| Investment Banking | Gender | 1.64 | 0.20 |
| Investment Banking | Ethnicity | 1.19 | 0.31 |

Any tool, interface, engine, application, program, service, command, or other executable item can be provided as a module encoded on a computer-readable medium in computer executable code. In some embodiments, the invention provides a computer-readable medium encoded therein computer-executable code that encodes a method for performing any action described herein, wherein the method comprises providing a system comprising any number of modules described herein, each module performing any function described herein to provide a result, such as an output, to a user.

Example 26: Computer Architectures

Figure 35:
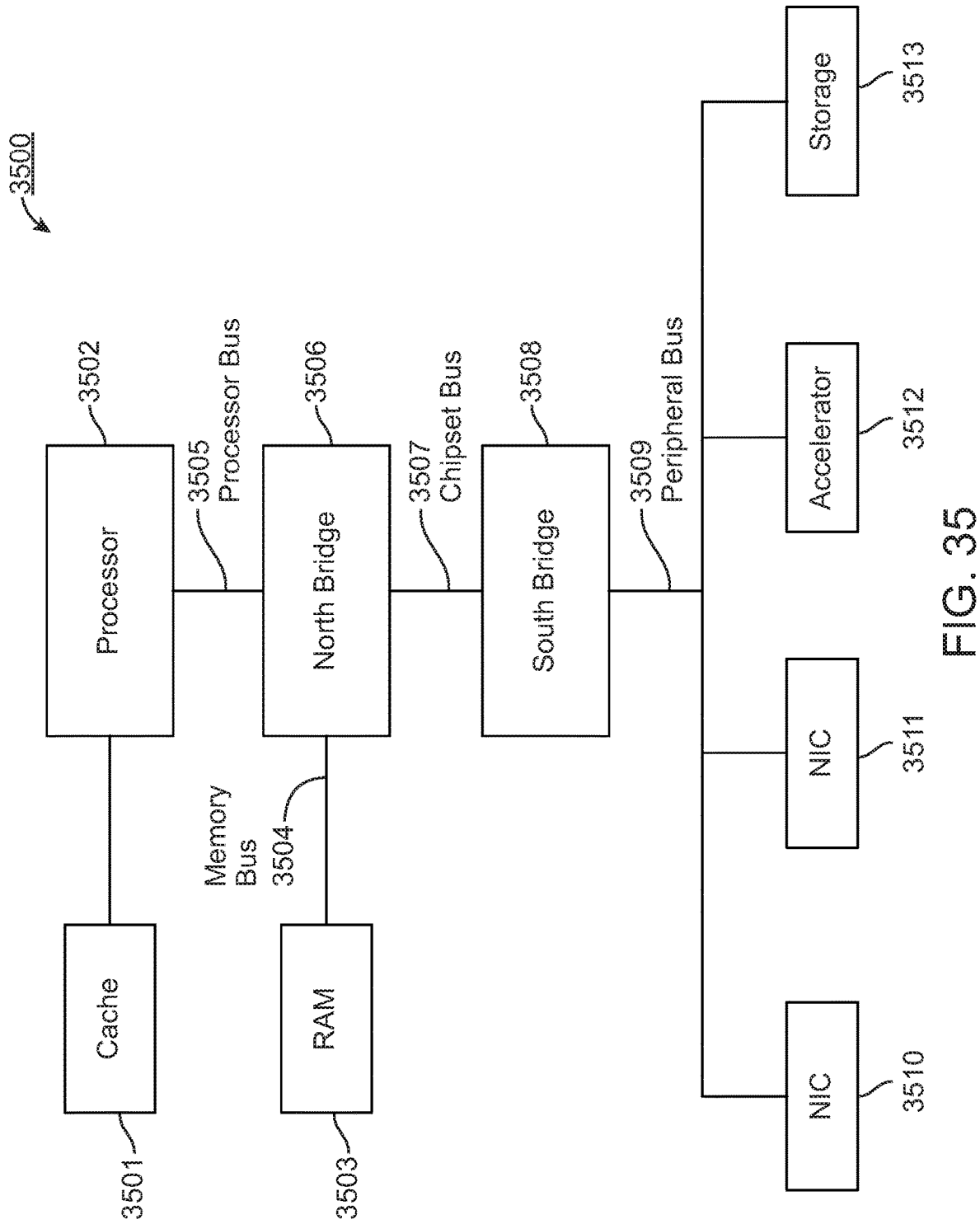
FIG. 35 is a block diagram illustrating a first example architecture of a computer system that can be used in connection with example embodiments of the present invention.

Various computer architectures are suitable for use with the invention. FIG. 35 is a block diagram illustrating a first example architecture of a computer system 3500 that can be used in connection with example embodiments of the present invention. As depicted in FIG. 35, the example computer system can include a processor 3502 for processing instructions. Non-limiting examples of processors include: Intel Core i7™ processor, Intel Core i5™ processor, Intel Core i3™ processor, Intel Xeon™ processor, AMD Opteron™ processor, Samsung 32-bit RISC ARM 1176JZ(F)-S v1.0™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some embodiments, multiple processors or processors with multiple cores can be used, whether in a single computer system, in a cluster, or distributed across systems over a network comprising a plurality of computers, cell phones, and/or personal data assistant devices.

Data Acquisition, Processing and Storage.

As illustrated in FIG. 35, a high speed cache 3501 can be connected to, or incorporated in, the processor 3502 to provide a high speed memory for instructions or data that have been recently, or are frequently, used by processor 3502. The processor 3502 is connected to a north bridge 3506 by a processor bus 3505. The north bridge 3506 is connected to random access memory (RAM) 3503 by a memory bus 3504 and manages access to the RAM 3503 by the processor 3502. The north bridge 3506 is also connected to a south bridge 3508 by a chipset bus 3507. The south bridge 3508 is, in turn, connected to a peripheral bus 3509. The peripheral bus can be, for example, PCI, PCI-X, PCI Express, or other peripheral bus. The north bridge and south bridge are often referred to as a processor chipset and manage data transfer between the processor, RAM, and peripheral components on the peripheral bus 3509. In some architectures, the functionality of the north bridge can be incorporated into the processor instead of using a separate north bridge chip.

In some embodiments, system 3500 can include an accelerator card 3512 attached to the peripheral bus 3509. The accelerator can include field programmable gate arrays (FPGAs) or other hardware for accelerating certain processing.

Software Interface(s).

Software and data are stored in external storage 3513 and can be loaded into RAM 3503 and/or cache 3501 for use by the processor. The system 3500 includes an operating system for managing system resources; non-limiting examples of operating systems include: Linux, Windows™, MACOS™, BlackBerry OS™, iOS™, and other functionally-equivalent operating systems, as well as application software running on top of the operating system.

In this example, system 3500 also includes network interface cards (NICs) 3510 and 3511 connected to the peripheral bus for providing network interfaces to external storage, such as Network Attached Storage (NAS) and other computer systems that can be used for distributed parallel processing.

Computer Systems.

Figure 36:
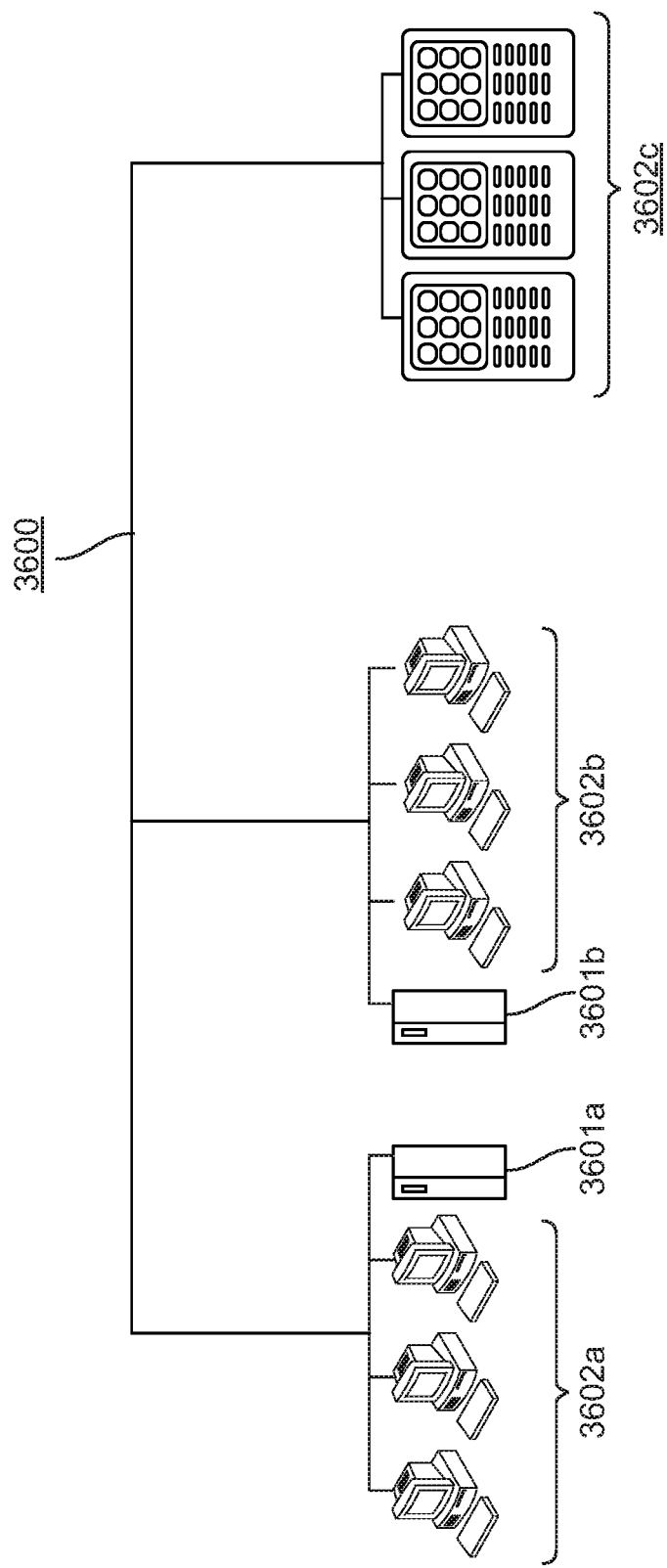
FIG. 36 is a diagram illustrating a computer network that can be used in connection with example embodiments of the present invention.

FIG. 36 is a diagram showing a network 3600 with a plurality of computer systems 3602a, and 3602b, a plurality of cell phones and personal data assistants 3602c, and Network Attached Storage (NAS) 3601a, and 3601b. In some embodiments, systems 3602a, 3602b, and 3602c can manage data storage and optimize data access for data stored in Network Attached Storage (NAS) 3601a and 3602b. A mathematical model can be used for the data and be evaluated using distributed parallel processing across computer systems 3602a, and 3602b, and cell phone and personal data assistant systems 3602c. Computer systems 3602a, and 3602b, and cell phone and personal data assistant systems 3602c can also provide parallel processing for adaptive data restructuring of the data stored in Network Attached Storage (NAS) 3601a and 3601b. FIG. 36 illustrates an example only, and a wide variety of other computer architectures and systems can be used in conjunction with the various embodiments of the present invention. For example, a blade server can be used to provide parallel processing. Processor blades can be connected through a back plane to provide parallel processing. Storage can also be connected to the back plane or as Network Attached Storage (NAS) through a separate network interface.

In some embodiments, processors can maintain separate memory spaces and transmit data through network interfaces, back plane, or other connectors for parallel processing by other processors. In some embodiments, some or all of the processors can use a shared virtual address memory space.

Virtual Systems.

Figure 37:
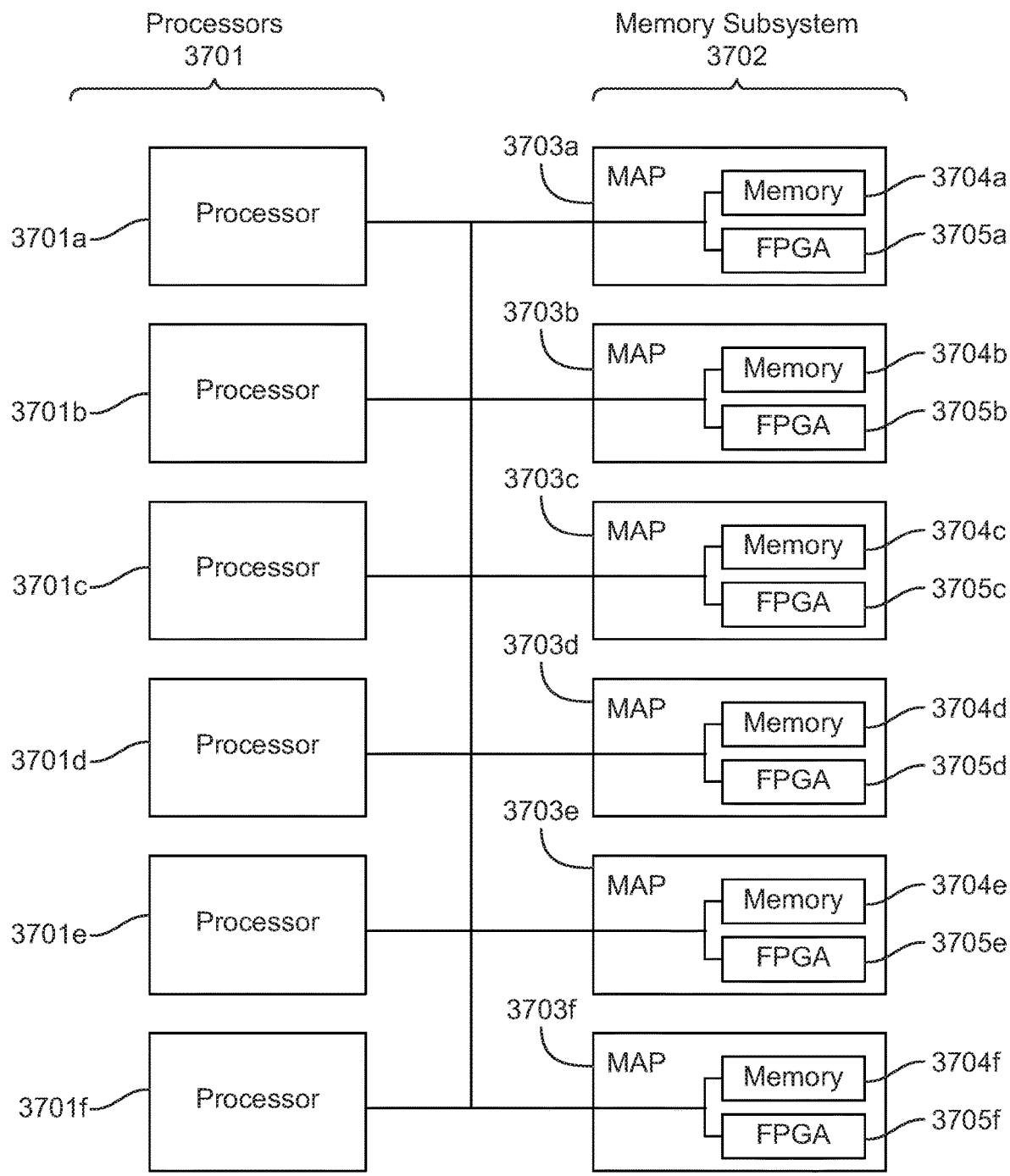
FIG. 37 is a block diagram illustrating a second example architecture of a computer system that can be used in connection with example embodiments of the present invention.
Figure 38:
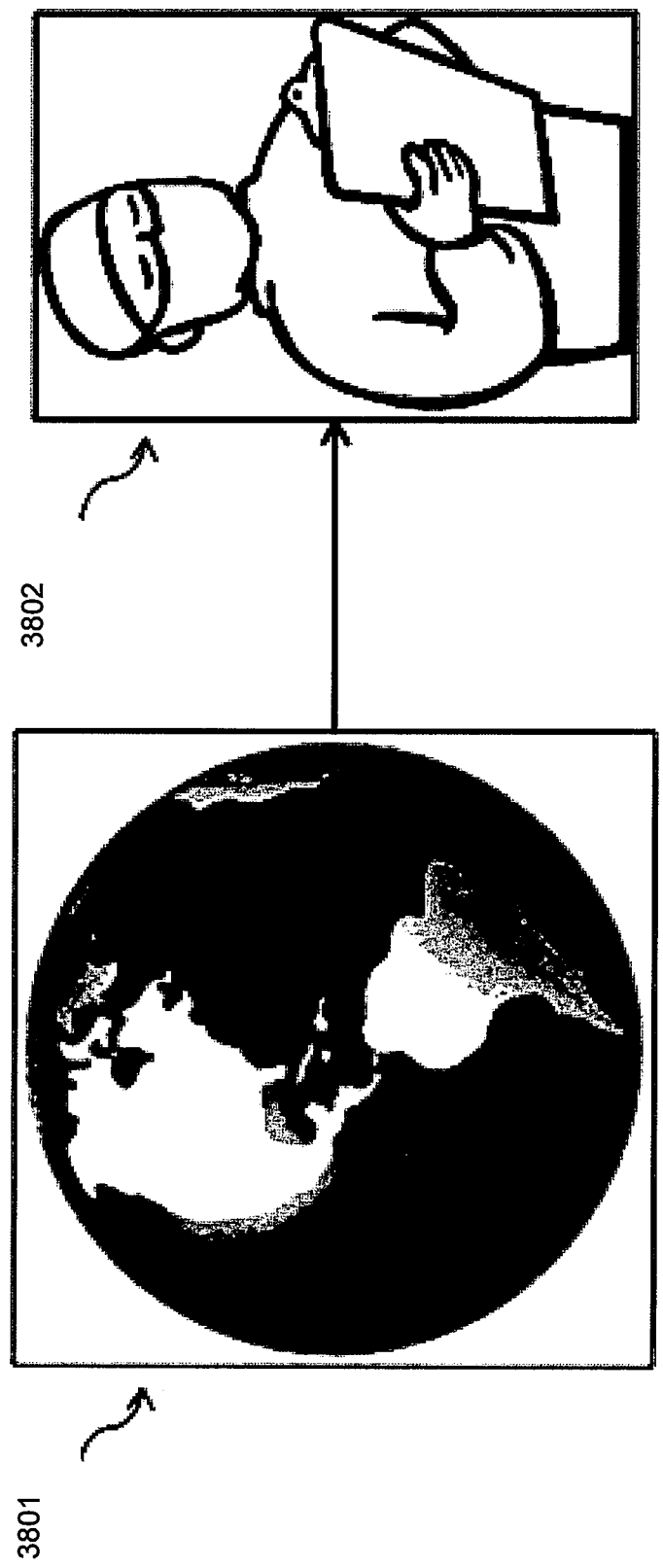
FIG. 38 illustrates a global network that can transmit a product of the invention.

FIG. 37 is a block diagram of a multiprocessor computer system using a shared virtual address memory space. The system includes a plurality of processors 3701a-f that can access a shared memory subsystem 3702. The system incorporates a plurality of programmable hardware memory algorithm processors (MAPs) 3703a-f in the memory subsystem 3702. Each MAP 3703a-f can comprise a memory 3704a-f and one or more field programmable gate arrays (FPGAs) 3705a-f. The MAP provides a configurable functional unit and particular algorithms or portions of algorithms can be provided to the FPGAs 3705a-f for processing in close coordination with a respective processor. In this example, each MAP is globally accessible by all of the processors for these purposes. In one configuration, each MAP can use Direct Memory Access (DMA) to access an associated memory 3704a-f, allowing it to execute tasks independently of, and asynchronously from, the respective microprocessor 3701a-f. In this configuration, a MAP can feed results directly to another MAP for pipelining and parallel execution of algorithms.

The above computer architectures and systems are examples only, and a wide variety of other computer, cell phone, and personal data assistant architectures and systems can be used in connection with example embodiments, including systems using any combination of general processors, co-processors, FPGAs and other programmable logic devices, system on chips (SOCs), application specific integrated circuits (ASICs), and other processing and logic elements. Any variety of data storage media can be used in connection with example embodiments, including random access memory, hard drives, flash memory, tape drives, disk arrays, Network Attached Storage (NAS) and other local or distributed data storage devices and systems.

In example embodiments, the computer system can be implemented using software modules executing on any of the above or other computer architectures and systems. In other embodiments, the functions of the system can be implemented partially or completely in firmware, programmable logic devices such as field programmable gate arrays (FPGAs) as referenced in FIG. 37, system on chips (SOCs), application specific integrated circuits (ASICs), or other processing and logic elements. For example, the Set Processor and Optimizer can be implemented with hardware acceleration through the use of a hardware accelerator card, such as accelerator card 3512 illustrated in FIG. 35.

Any embodiment of the invention described herein can be, for example, produced and transmitted by a user within the same geographical location. A product of the invention can be, for example, produced and/or transmitted from a geographic location in one country and a user of the invention can be present in a different country. In some embodiments, the data accessed by a system of the invention is a computer program product that can be transmitted from one of a plurality of geographic locations 3801 to a user 3802 (FIG. 8). Data generated by a computer program product of the invention can be transmitted back and forth among a plurality of geographic locations, for example, by a network, a secure network, an insecure network, an internet, or an intranet. In some embodiments, an ontological hierarchy provided by the invention is encoded on a physical and tangible product.

Figure 39:
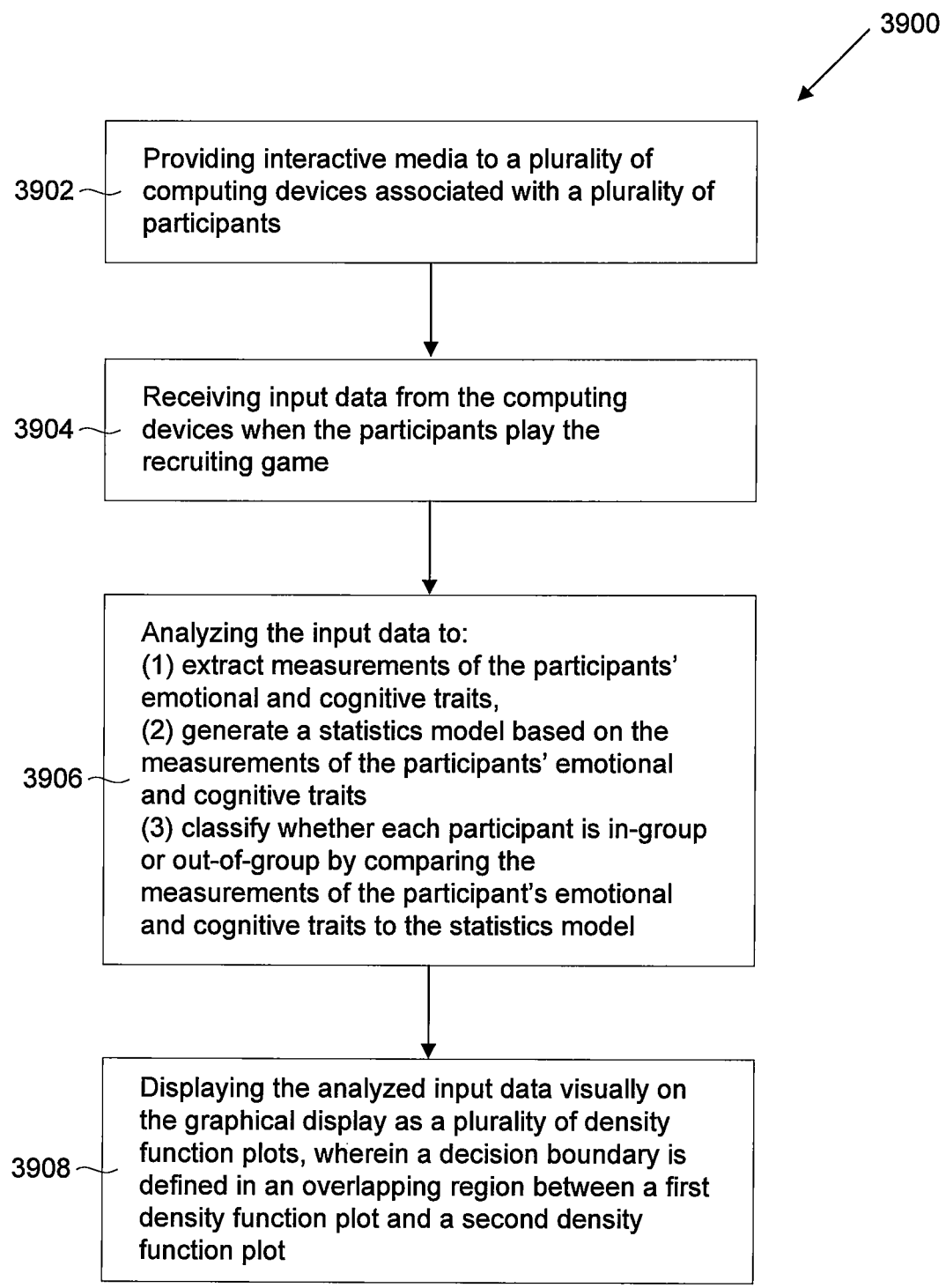
FIG. 39 illustrates a flowchart of an exemplary method for generating an employee statistics model, in accordance with some embodiments.

FIG. 39 illustrates a flowchart of an exemplary method for generating an employee statistics model, in accordance with some embodiments. Referring to FIG. 39, method 3900 may comprise one or more of the following steps. It should be noted that the invention is not limited thereto, and that additional steps may be added. Alternatively, one or more steps may be omitted.

First, interactive media may be provided to a plurality of computing devices associated with a plurality of participants (3902). The interactive media may be provided by, for example screening system 110 and/or server 104 described in FIG. 1. The interactive media may be stored in one or more databases 108. The plurality of computing devices may correspond to the user devices 102 shown in FIG. 1. The interactive media may comprise at least one recruiting game created with a set of selected neuroscience-based tasks that are designed to measure a plurality of emotional and cognitive traits of the participants. The recruiting game may include a predefined set of visual objects associated with the set of selected neuroscience-based tasks, as described elsewhere herein the specification. The predefined set of visual objects may be presented on graphical displays of the computing devices.

Next, input data may be received from the computing devices when the participants play the recruiting game on the graphical displays of the computing devices (3904). The input data may be received by, for example screening system 110. In some cases, the input data may be received by traits extraction engine 112 shown in FIG. 2. In some cases, the input data may also be stored in one or more databases 108. The participants may play the recruiting game by interacting with the predefined set of visual objects to complete the set of selected neuroscience-based tasks, as described elsewhere in the specification.

Next, the input data derived from the participants' interaction with the predefined set of visual objects within the recruiting game may be analyzed (3906). The input data may be analyzed using, for example, screening system 110. For example, the traits extraction engine 112 may extract measurements of the participants' emotional and cognitive traits. The model analytics engine 114 may generate a statistics model based on the measurements of the participants' emotional and cognitive traits. The statistics model may be representative of a select group of participants. In some cases, the select group of participants may correspond to a group of top employees of a company. Next, the screening system 110 may classify whether each participant is in-group or out-of-group, by comparing the measurements of the participants' emotional and cognitive traits to the statistics model.

Next, the analyzed input data may be displayed visually on the graphical display as a plurality of density function plots (3908). The plurality of density function plots may comprise a first density function plot corresponding to the participants classified to be out-of-group and a second density function plot corresponding to the participants classified to be in-group. A decision boundary is defined in an overlapping region between the first density function plot and the second density function plot, for example as shown in FIG. 17A.

Figure 40:
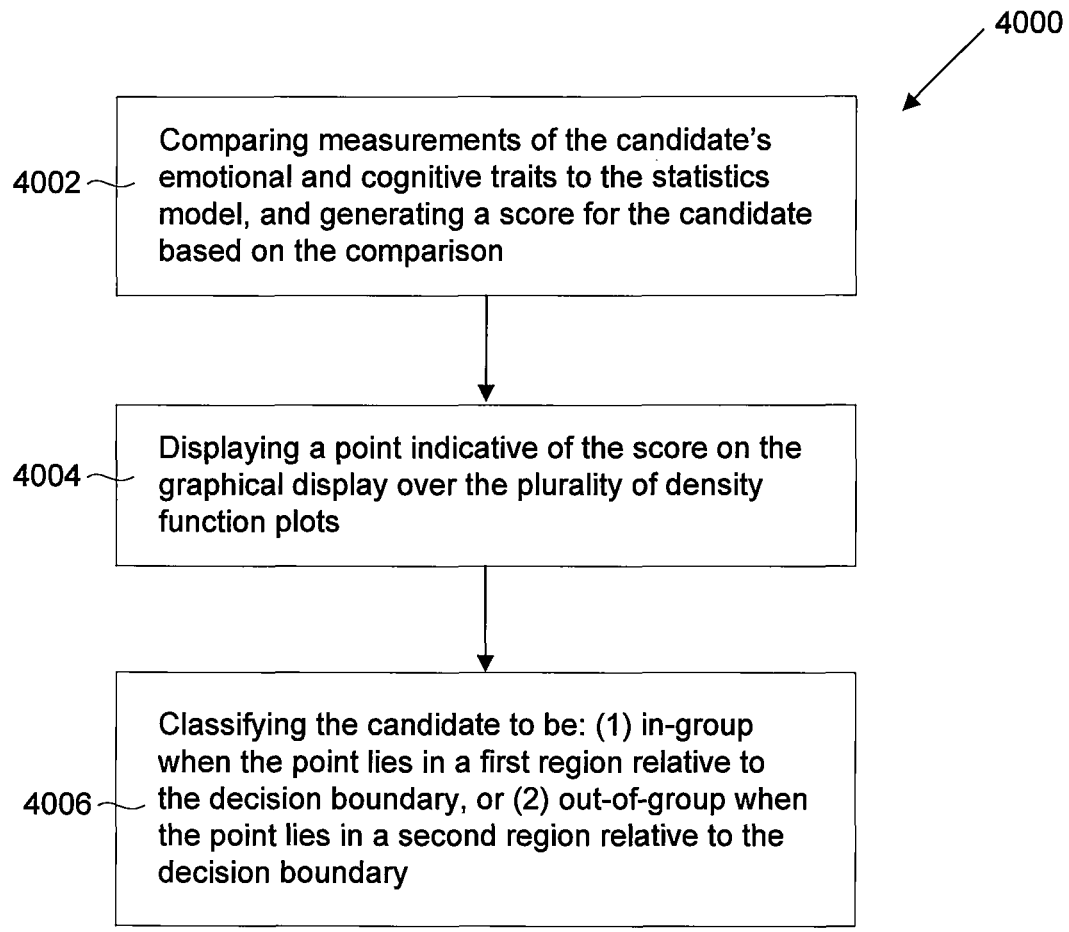
FIG. 40 illustrates a flowchart of an exemplary method for comparing a candidate to the employee statistics model of FIG. 39, in accordance with some embodiments.

FIG. 40 illustrates a flowchart of an exemplary method for comparing a candidate to the employee statistics model of FIG. 39, in accordance with some embodiments. Referring to FIG. 40, method 4000 may comprise one or more of the following steps. It should be noted that the invention is not limited thereto, and that additional steps may be added. Alternatively, one or more steps may be omitted.

As shown in FIG. 40, measurements of a candidate's emotional and cognitive traits may be compared to the statistics model, and a score may be generated for the candidate based on the comparison (4002). The candidate's emotional and cognitive traits may be measured to determine whether the candidate's traits match those of the in-group employees of a company. Next, a point indicative of the score may be displayed on the graphical display over the plurality of density function plots (4004). In some embodiments, a plurality of candidates may be compared to the statistics model, and accordingly a plurality of points may be generated. The plurality of points may be provided in the form of density function plots, for example denoted by 1720 and 1722 shown in FIG. 17B. Next, the candidate may be classified to be: (1) in-group when the point lies in a first region relative to the decision boundary, or (2) out-of-group when the point lies in a second region relative to the decision boundary (4006). For example, referring to FIG. 17B, when the point for the candidate lies to the left of the decision boundary, the candidate may be classified to be out-of-group. Conversely, when the point for the candidate lies to the right of the decision boundary, the candidate may be classified to be in-group. Accordingly, an end user (e.g., a recruiter or human resource personnel) can view the points associated with different candidates, and determine whether each candidate matches more closely to the in-group employees or the out-of-group employees. This determination may be performed quickly (at a glance) by seeing where the points for the candidates lie relative to the decision boundary. Additionally, for candidates that fall within each group (in-group or out-of-group), the end user can see where the point for each candidate lies relative to the decision boundary. For example, if the point for a candidate lies to the far right of the decision boundary, the candidate may be determined to match very closely to the in-group employees, compared to a point for another candidate that lies only slightly to the right of the decision boundary.

EMBODIMENTS

The following non-limiting embodiments provide illustrative examples of the invention, but do not limit the scope of the invention.

Embodiment 1

A computer program product comprising a computer-readable medium having computer-executable code encoded therein, the computer-executable code adapted to be executed to implement a method comprising: a) providing a recruitment system, wherein the recruitment system comprises: i) a task module; ii) a measurement module; iii) an assessment module; and iv) an identification module; b) providing by the task module a computerized task to a subject; c) measuring by the measurement module a performance value demonstrated by the subject in performance of the task; d) assessing by the assessment module a trait of the subject based on the measured performance value; and e) identifying to a hiring officer by the identification module based on the assessed trait that the subject is suitable for hiring by an entity.

Embodiment 2

The computer program product of embodiment 1, wherein the recruitment system further comprises a profile module, wherein the method further comprises creating by the profile module a profile for the subject based on the assessment of the trait of the subject.

Embodiment 3

The computer program product of any one of embodiments 1-2, wherein the recruitment system further comprises a model module, a reference model, and a comparison module, and wherein the method further comprises generating by the model module a model of the subject based on the assessment of more than one trait of the subject, wherein the method further comprises comparing by the comparison module the model of the subject and the reference model.

Embodiment 4

The computer program product of any one of embodiments 1-2, wherein the recruitment system further comprises a model module and a comparison module, and wherein the method further comprises generating by the model module a model of the subject based on the assessment of more than one trait of the subject, wherein the method further comprises comparing by the comparison module the model of the subject and a database of test subjects.

Embodiment 5

The computer program product of embodiment 4, wherein the test subjects work for the entity.

Embodiment 6

The computer program product of any one of embodiments 1-5, wherein the hiring officer works for the entity.

Embodiment 7

The computer program product of embodiment 4, wherein the recruitment system further comprises an aggregation module, wherein the method further comprises collecting by the aggregation module data from the subject and aggregating the data from the subject into the database of the test subjects.

Embodiment 8

The computer program product of embodiment 3, wherein the recruitment system further comprises a scoring module, wherein the method further comprises scoring by the scoring module the subject based on the comparison of the model of the subject and the reference model.

Embodiment 9

The computer program product of embodiment 4, wherein the recruitment system further comprises a scoring module, wherein the method further comprises scoring by the scoring module the subject based on the comparison of the model of the subject with the database of test subjects.

Embodiment 10

A computer program product comprising a computer-readable medium having computer-executable code encoded therein, the computer-executable code adapted to be executed to implement a method comprising: a) providing a talent identification system, wherein the talent identification system comprises: i) a task module; ii) a measurement module; iii) an assessment module; iv) an identification module; and v) an output module; b) providing by the task module a computerized task to a subject; c) measuring by the measurement module a performance value demonstrated by the subject in performance of a task; d) assessing by the assessment module a trait of the subject based on the measured performance value; e) identifying by the identification module a career propensity based on the assessing of the trait of subject; and f) outputting by the output module the identified career propensity to a hiring officer.

Embodiment 11

The computer program product of embodiment 10, wherein the talent identification system further comprises a recommendation module, wherein the method further comprises recommending by the recommendation module a career based on the career propensity of the subject.

Embodiment 12

The computer program product of any one of embodiments 10-11, wherein the talent identification system further comprises a model module, a reference model, and a comparison module, and wherein the method further comprises generating by the model module a model of the subject based on the assessment of more than one trait of the subject, wherein the method further comprises comparing by the comparison module the model of the subject and the reference model.

Embodiment 13

The computer program product of any one of embodiments 10-11, wherein the talent identification system further comprises a model module and a comparison module, and wherein the method further comprises generating by the model module a model of the subject based on the assessment of more than one trait of the subject, wherein the method further comprises comparing by the comparison module the model of the subject and a database of test subjects.

Embodiment 14

A method comprising: a) providing a computerized task to a subject; b) measuring a performance value demonstrated by the subject in performance of the task; c) assessing a trait of the subject based on the performance value; d) comparing by a processor of a computer system the trait of the subject with a database of test subjects; e) determining based on the comparing that the subject is suitable for hiring by an entity; and f) reporting to a hiring officer at the entity that the subject is suitable for hiring.

Embodiment 15

The method of embodiment 14, further comprising creating a profile for the subject based on the assessing of the trait of the subject.

Embodiment 16

The method of any one of embodiments 14-15, further comprising generating a model of the subject based on the comparison of more than one trait of the subject with the database of test subjects.

Embodiment 17

The method of embodiment 16, further comprising scoring the subject based on the model of the subject.

Embodiment 18

The method of any one of embodiments 14-17, wherein the assessed trait is a cognitive trait.

Embodiment 19

The method of any one of embodiments 14-18, wherein the assessed trait is an emotional trait.

Embodiment 20

The method of any one of embodiments 14-19, wherein the test subjects work for the entity.

Embodiment 21

The method of any one of embodiments 14-20, wherein the computerized task has an acceptable level of reliability as determined by a test-retest assessment.

Embodiment 22

The method of any one of embodiments 14-21, wherein the computerized task has an acceptable level of reliability as determined by a split-half reliability assessment.

Embodiment 23

A method comprising: a) providing a computerized task to a subject; b) measuring a performance value demonstrated by the subject in performance of the task; c) assessing a trait of the subject based on the performance value; d) identifying by a processor of a computer system a career propensity of the subject based on a comparison of the assessed trait of the subject with a database of test subjects; and e) outputting a result of the comparison to a hiring officer.

Embodiment 24

The method of embodiment 23, further comprising creating a profile for the subject based on the assessing of the trait of the subject.

Embodiment 25

The method of any one of embodiments 23-24, further comprising generating a model for the subject based on comparing more than one trait of the subject with the database of test subjects.

Embodiment 26

The method of any one of embodiments 23-25, further comprising recommending to the subject a career based on the subject's career propensity.

Embodiment 27

The method of any one of embodiments 23-26, wherein the computerized task has an acceptable level of reliability as determined by a test-retest assessment.

Embodiment 28

The method of any one of embodiments 23-27, wherein the computerized task has an acceptable level of reliability as determined by a split-half reliability assessment.

Embodiment 29

The method of any one of embodiments 23-28, wherein the assessed trait is a cognitive trait.

Embodiment 30

The method of any one of embodiments 23-29, wherein the assessed trait is an emotional trait.

This disclosure incorporates by reference U.S. patent application Ser. No. 14/751,943 entitled "Systems and Methods for Data-Driven Identification of Talent" filed on Jun. 26, 2015.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for implementing a game-based personnel recruitment method, comprising:
    a server in communication with a plurality of computing devices associated with a plurality of participants, wherein the server comprises a memory for storing interactive media and a first set of software instructions, and one or more processors configured to execute the first set of software instructions to:
        provide interactive media to the plurality of computing devices associated with the plurality of participants, wherein the interactive media comprises at least one recruiting game that is designed to measure one or more emotional and cognitive traits of the participants, wherein the recruiting game includes a plurality of predefined sets of graphical visual objects associated with a plurality of selected neuroscience-based computerized tasks, and wherein the plurality of predefined sets of visual objects are displayed to the participants on graphical displays of the computing devices;
        receive input data from the computing devices when the participants play the recruiting game on the graphical displays of the computing devices by manipulating one or more of the graphical visual objects on the graphical displays using one or more input devices to complete the plurality of selected neuroscience-based computerized tasks; and
        analyze the input data derived from the participants' manipulation of the one or more graphical visual objects within the recruiting game to (1) extract measurements of the participants' emotional and cognitive traits based on a degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model; and
    at least one computing device comprising a memory for storing a second set of software instructions, and one or more processors configured to execute the second set of software instructions to:
        receive the analyzed input data from the server; and
        display the analyzed input data visually as a set of graphical visual objects on a graphical display of the at least one computing device, wherein the set of graphical visual objects comprise: (i) a first density function plot corresponding to participants that are classified to be out-of-group, (ii) a second density function plot corresponding to participants that are classified to be in-group, and (iii) a decision boundary defined relative to each of the first density function plot and the second density function plot, and wherein the decision boundary is usable by an entity to determine a candidate's suitability for recruitment into a target position based on the candidate's measured performance in the recruiting game.

2. The system of claim 1, wherein the one or more processors of the server are further configured to execute software instructions to measure the candidate's performance in the recruiting game by comparing measurements of the candidate's emotional and cognitive traits to the statistical model.

3. The system of claim 1, wherein the one or more processors of the server are further configured to execute software instructions to:
generate a fit score for the candidate based on the comparison of the measurements of the candidate's emotional and cognitive traits to the statistical model, wherein the fit score is indicative of a level of match of the candidate with a select group of the participants;
effect display a point indicative of the fit score on a graphical display of at least one computing device, wherein the point is displayed by superimposing the point over the first and second density function plots; and
classify the candidate to be: (1) out-of-group when the point lies in a first region relative to the decision boundary, or (2) in-group when the point lies in a second region relative to the decision boundary.

4. The system of claim 3, wherein the decision boundary is defined in an overlapping region between the first and second density function plots, and wherein the first region overlaps with the first density function plot and the second region overlaps with the second density function plot.

5. The system of claim 3, wherein the candidate is determined to be more similar to the participants that are classified to be out-of-group, and less similar to the participants that are classified to be in-group, when the point lies in the first region; and
wherein the candidate is determined to be more similar to the participants that are classified to be in-group, and less similar to the participants that are classified to be out-of-group, when the point lies in the second region.

6. The system of claim 3, wherein a probability of the candidate being correctly classified to be out-of-group increases as a distance of the point from the decision boundary into the first region increases, and wherein a probability of the candidate being correctly classified to be in-group increases as a distance of the point from the decision boundary into the second region increases.

7. The system of claim 3, wherein the candidate is determined to be less suitable for the target position when the point lies in the first region, and wherein the candidate is determined to be more suitable for the target position when the point lies in the second region.

8. The system of claim 7, wherein a suitability of the candidate for the target position is determined to decrease as a distance of the point from the decision boundary into the first region increases, and wherein a suitability of the candidate for the target position is determined to increase as a distance of the point from the decision boundary into the second region increases.

9. The system of claim 3, wherein a position of the decision boundary relative to the first and second density plots on the graphical display of the at least one computing device is adjustable by the entity, and wherein the number of participants that are classified to be in-group or out-of-group changes when the position of the decision boundary is adjusted.

10. The system of claim 9, wherein the position of the decision boundary is adjustable in a first direction on the graphical display of the at least one computing device such that a higher number of participants are classified to be out-of-group and a lower number of participants are classified to be in-group,
wherein the position of the decision boundary is adjustable in a second direction on the graphical display of the at least one computing device such that a higher number of participants are classified to be in-group and a lower number of participants are classified to be out-of-group, and
wherein the second direction is opposite to the first direction.

11. The system of claim 10, wherein the one or more processors of the server are further configured to execute software instructions to:
generate a plurality of fit scores for a plurality of candidates based on comparisons of measurements of the candidates's emotional and cognitive traits to the statistical model, wherein the fit scores are indicative of a level of match of the candidates with the select group of the participants; and
effect display of a plurality of points indicative of the plurality of fit scores on the graphical display of the at least one computing device, wherein the plurality of points are displayed by superimposing the points over the first and second density function plots.

12. The system of claim 11, wherein a higher number of candidates are classified to be out-of-group and a lower number of candidates are classified to be in-group when the position of the decision boundary is adjusted in the first direction, and
wherein a higher number of candidates are classified to be in-group and a lower number of candidates are classified to be out-of-group when the position of the decision boundary is adjusted in the second direction.

13. The system of claim 1, wherein the plurality of computing devices are in communication with one another, and in communication with the server configured to provide the interactive media, as the recruiting game is being played by the plurality of participants on the plurality of computing devices.

14. The system of claim 1, wherein the input data is stored in the memory of the server, and wherein the input data comprises each participant's historical and/or current performance data in performing the plurality of selected neuroscience-based computerized tasks in the recruiting game.

15. The system of claim 14, wherein the one or more processors of the server are further configured to execute software instructions to:
predict each participant's future performance in performing the plurality of selected neuroscience-based computerized tasks in the recruiting game, based on each participant's historical and/or current performance data.

16. The system of claim 14, wherein the historical and/or current performance data includes: (1) an amount of time each participant spends on one or more of the selected neuroscience-based computerized tasks, (2) a number of attempts each participant takes to complete one or more of the selected neuroscience-based computerized tasks, (3) different actions that each participant takes to complete one or more of the selected neuroscience-based computerized tasks, (4) an amount of time each participant takes to perform one or more of the different actions, (5) each participant's accuracy in performing one or more of the different actions, and/or (6) weights that each participant applies when making certain decisions or judgment to complete one or more of the selected neuroscience-based computerized tasks.

17. The system of claim 1, wherein the one or more processors of the server are further configured to execute software instructions to:
analyze the input data to determine whether each participant has correctly selected, placed, and/or used different visual objects to complete the plurality of selected neuroscience-based computerized tasks in the recruiting game.

18. The system of claim 17, wherein the one or more processors of the server are further configured to execute software instructions to:
analyze the input data to assess each participant's learning, cognitive skills, and ability to learn from previous mistakes made in playing the recruiting game.

19. The system of claim 1, wherein the one or more processors of the server are further configured to execute software instructions to:
pair two or more participants of the plurality of participants in a random manner in the recruiting game such that each participant does not know an identity of the other paired participant(s), and wherein at least one of the plurality of selected neuroscience-based computerized tasks is designed to test a trust level and/or generosity level between the paired participants.

20. The system of claim 1, wherein the statistical model is configured to dynamically factor in changes in the measurements of the participants' emotional and cognitive traits as the plurality of participants play multiple rounds of a same recruiting game, and/or as the plurality of participants play a plurality of different recruiting games.

21. The system of claim 1, wherein the one or more processors of the server are further configured to execute software instructions to:
de-identify the input data by masking identities of the participants that are playing the recruiting game; and
store the de-identified input data in the memory of the server prior to the analyzing of the input data.

22. The system of claim 1, wherein the plurality of participants are employed by the entity, wherein the select group of participants correspond to a group of employees of the entity who at least meet a set of job-performance metrics that are predefined by the entity, and wherein the statistical model is correlated with the set of job-performance metrics.

23. The system of claim 1, wherein the manipulation of the one or more graphical visual objects is effected by the participants selecting and/or spatially manipulating the one or more graphical visual objects on the graphical displays using one or more input devices to complete the plurality of selected neuroscience-based computerized tasks.

24. The system of claim 1, wherein the plurality of emotional and cognitive traits of the participants are measured based on the participants' speed, accuracy, and/or judgment in completing the plurality of selected neuroscience-based computerized tasks.

25. The system of claim 1, wherein the recruiting game is configured to allow the plurality of participants to interact with one another through the one or more graphical visual objects on the graphical displays, in order to complete the plurality of selected neuroscience-based computerized tasks.

26. The system of claim 1, wherein different statistical models are generated for a plurality of different fields, functions, industries and/or entities.

27. A computer-implemented game-based personnel recruitment method, comprising:
providing interactive media to a plurality of computing devices associated with a plurality of participants, wherein the interactive media comprises at least one recruiting game that is designed to measure one or more emotional and cognitive traits of the participants, wherein the recruiting game includes a plurality of predefined sets of graphical visual objects associated with a plurality of selected neuroscience-based computerized tasks, and wherein the plurality of predefined sets of visual objects are displayed to the participants on graphical displays of the computing devices;
receiving input data from the computing devices when the participants play the recruiting game on the graphical displays of the computing devices by manipulating one or more of the graphical visual objects on the graphical displays to complete the plurality of selected neuroscience-based computerized tasks;
analyzing the input data derived from the participants' manipulation of the one or more graphical visual objects within the recruiting game to (1) extract measurements of the participants' emotional and cognitive traits based on a degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model; and
displaying the analyzed input data visually as a set of graphical visual objects comprising: (i) a first density function plot corresponding to participants that are classified to be out-of-group, (ii) a second density function plot corresponding to participants that are classified to be in-group, and (iii) a decision boundary defined relative to each of the first density function plot and the second density function plot, wherein the decision boundary is usable by an entity to determine a candidate's suitability for recruitment into a target position based on the candidate's measured performance in the recruiting game.

28. A tangible, non-transitory computer readable medium storing instructions that, when executed by one or more servers, causes the one or more servers to perform a computer-implemented neuroscience-based personnel recruitment method, the method comprising:
providing interactive media to a plurality of computing devices associated with a plurality of participants, wherein the interactive media comprises at least one recruiting game that is designed to measure one or more emotional and cognitive traits of the participants, wherein the recruiting game includes a plurality of predefined sets of graphical visual objects associated with a plurality of selected neuroscience-based computerized tasks, and wherein the plurality of predefined sets of visual objects are displayed to the participants on graphical displays of the computing devices;

receiving input data from the computing devices when the participants play the recruiting game on the graphical displays of the computing devices by manipulating one or more of the graphical visual objects on the graphical displays using one or more input devices to complete the plurality of selected neuroscience-based computerized tasks;

analyzing the input data derived from the participants' manipulation of the one or more graphical visual objects within the recruiting game to (1) extract measurements of the participants' emotional and cognitive traits based on a degree of manipulation of the graphical visual object(s) by the participants, (2) generate a statistical model based on the measurements of the participants' emotional and cognitive traits, wherein the statistical model is representative of a select group of participants, and (3) classify whether each participant is in-group or out-of-group by comparing the measurements of the participants' emotional and cognitive traits to the statistical model; and storing the analyzed input data for use by an entity, wherein the analyzed input data comprises a set of graphical visual objects configured to be visually displayed on a graphical display of at least one computing device, wherein the set of graphical visual objects comprise: (i) a first density function plot corresponding to participants that are classified to be out-of-group, (ii) a second density function plot corresponding to participants that are classified to be in-group, and (iii) a decision boundary defined in an overlapping region between the first density function plot and the second density function plot, and wherein the decision boundary is usable by the entity to determine a candidate's suitability for recruitment into a target position based on the candidate's measured performance in the recruiting game.

* * * * *

UNITED STATES PATENT AND TRADEMARK OFFICE
CERTIFICATE OF CORRECTION

PATENT NO. : 11,030,554 B2
APPLICATION NO. : 16/013784
DATED : June 8, 2021
INVENTOR(S) : Frida Polli et al.

It is certified that error appears in the above-identified patent and that said Letters Patent is hereby corrected as shown below:

On the Title Page

On the page 2, in Column 2, Item (56) under "Other Publications", Line 4, delete "Comunion," and insert -- Communion, --.

On the page 2, in Column 2, Item (56) under "Other Publications", Line 24, delete "Administerd" and insert -- Administered --.

On the page 3, in Column 2, Item (56) under "Other Publications", Line 12, delete "Pssychiatry," and insert -- Psychiatry, --.

On the page 3, in Column 2, Item (56) under "Other Publications", Line 24, delete "Valididty" and insert -- Validity --.

On the page 3, in Column 2, Item (56) under "Other Publications", Line 25, delete "Taks" and insert -- Task --.

On the page 3, in Column 2, Item (56) under "Other Publications", Line 31, delete "Nueropsychologist," and insert -- Neuropsychologist, --.

On the page 3, in Column 2, Item (56) under "Other Publications", Line 54, delete "Probalistic" and insert -- Probabilistic --.

On the page 3, in Column 2, Item (56) under "Other Publications", Line 56, delete "Dopaine" and insert -- Dopamine --.

On the page 4, in Column 1, Item (56) under "Other Publications", Line 14, delete "Pyschological" and insert -- Psychological --.

Signed and Sealed this
Twenty-seventh Day of December, 2022

Katherine Kelly Vidal
*Director of the United States Patent and Trademark Office*

In the Specification

In Column 17, Line 47, delete "system" and insert -- system. --.

In Column 19, Line 29, delete "in in" and insert -- in --.

In Column 27, Line 42, delete "in in" and insert -- in --.

In Column 35, Line 36, delete "in in" and insert -- in --.